United States Patent
Schmidt et al.

(10) Patent No.: US 7,934,659 B2
(45) Date of Patent: *May 3, 2011

(54) WIRELESS BAR CODE SYMBOL DRIVEN PORTABLE DATA TERMINAL (PDT) SYSTEM FOR RUNNING APPLICATION PROGRAMS ON AN OPERATING SYSTEM EMULATED ON A VIRTUAL MACHINE

(75) Inventors: Mark Schmidt, Williamstown, NJ (US); Garrett K. Russell, Wilmington, DE (US); C. Harry Knowles, Moorestown, NJ (US); Xiaoxun Zhu, Marlton, NJ (US); Ka Man Au, Philadelphia, PA (US); Congwei Xu, Suzhou (CN); Liang Liu, Suzhou (CN); Kai Ji, Suzhou (CN); Wuqing Zhang, Rudong (CN)

(73) Assignee: Metrologic Instruments, Inc., Blackwood, NJ (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/543,266

(22) Filed: Oct. 4, 2006

(65) Prior Publication Data

US 2007/0090192 A1 Apr. 26, 2007

Related U.S. Application Data

(63) Continuation of application No. 10/758,603, filed on Jan. 15, 2004, now Pat. No. 7,121,468, which is a continuation of application No. 10/342,441, filed on Jan. 12, 2003, now Pat. No. 6,976,626, which is a continuation-in-part of application No. 09/452,976, filed on Dec. 2, 1999, now Pat. No. 6,595,420, and a continuation-in-part of application No. 09/204,176, filed on Dec. 3, 1998, now Pat. No. 6,283,375.

(51) Int. Cl.
*G06K 7/10* (2006.01)
(52) U.S. Cl. .............. 235/472.01; 235/462.01
(58) Field of Classification Search ........... 235/472.01–472.03, 470, 462.01–462.45
See application file for complete search history.

(56) References Cited

U.S. PATENT DOCUMENTS 4,072,859 A 2/1978 McWaters
(Continued)

FOREIGN PATENT DOCUMENTS

EP 0 323 848 7/1989
(Continued)

OTHER PUBLICATIONS

The web-based publication entitled "Pocket-Sized Computing for Mobile Industry Professionals" by Symbol Technologies, Inc., http://www.smbol.com/wp/stwp0006.htm, 1998, pp. 1-3.

(Continued)

*Primary Examiner* — Thien M Le
(74) *Attorney, Agent, or Firm* — Thomas J. Perkowski, Esq., P.C.

(57) ABSTRACT

The wireless PDT of the present invention employs a "display-on bottom" design which places the unit perfectly centered in the hand of the operator, allowing for the best possible viewing as well as providing comfortable single-handed operation. The high-resolution LCD display allows the PCT to show sharp, clear bitmap images while supporting all Windows-recognized font types and sizes. With the auto back-lit feature, the brightness adjusts automatically making the screen easy to read in all light conditions. The PDT is designed for support within the download/charger cradle of a base station which interfaces with a host system using either USB or RS232 interface. Two standard 'AA' or rechargeable Li-Ion batteries provide more than 100 hours of operation. In addition, the PDT comes standard with 2 MB of RAM providing enough memory to store over 100,000 records. Applications for the PDT can be developed using a novel integrated development and deployment environment (IDE) which contains an easy-to-use Windows-based application generator and download utilities. For advanced programming, developers can choose to write software using an advanced application generator or 'C' programming application generator which provides the developer with simple programming and fast setup. Further enhancements available in the application generator include drag and drop icons, time/datestamp, battery level indicator and variable fonts, giving the developer the ability to create custom screen layouts.

11 Claims, 54 Drawing Sheets

U.S. PATENT DOCUMENTS

| | | |
|---|---|---|
| 4,086,476 A | 4/1978 | King |
| 4,240,064 A | 12/1980 | DevChoudhury |
| 4,279,021 A | 7/1981 | See et al. |
| 4,282,425 A | 8/1981 | Chadima |
| 4,387,297 A | 6/1983 | Swartz et al. |
| 4,409,470 A | 10/1983 | Shepard et al. |
| 4,420,682 A | 12/1983 | Huber |
| 4,431,912 A | 2/1984 | Dickson et al. |
| 4,460,120 A | 7/1984 | Shepard et al. |
| 4,465,926 A | 8/1984 | Apitz et al. |
| 4,496,831 A | 1/1985 | Swartz et al. |
| 4,521,678 A | 6/1985 | Winter |
| 4,570,057 A | 2/1986 | Chadima, Jr. et al. |
| 4,575,625 A | 3/1986 | Knowles |
| 4,621,189 A | 11/1986 | Kumar et al. |
| 4,639,606 A | 1/1987 | Boles et al. |
| 4,647,143 A | 3/1987 | Yamazaki et al. |
| 4,673,805 A | 6/1987 | Shepard et al. |
| 4,713,785 A | 12/1987 | Antonelli et al. |
| 4,736,095 A | 4/1988 | Shepard et al. |
| 4,760,248 A | 7/1988 | Swartz et al. |
| 4,766,297 A | 8/1988 | McMillan |
| 4,766,299 A | 8/1988 | Tierney et al. |
| 4,816,660 A | 3/1989 | Swartz et al. |
| 4,825,057 A | 4/1989 | Swartz et al. |
| 4,825,058 A | 4/1989 | Poland |
| 4,831,610 A | 5/1989 | Hoda et al. |
| 4,845,349 A | 7/1989 | Cherry |
| 4,877,949 A | 10/1989 | Danielson et al. |
| 4,897,532 A | 1/1990 | Swartz et al. |
| D305,885 S | 2/1990 | Barkan et al. |
| 4,930,848 A | 6/1990 | Knowles |
| 4,933,538 A | 6/1990 | Heiman et al. |
| 4,935,610 A | 6/1990 | Wike, Jr. |
| 4,958,894 A | 9/1990 | Knowles |
| 4,962,980 A | 10/1990 | Knowles |
| 4,970,379 A | 11/1990 | Danstrom |
| 5,015,833 A | 5/1991 | Shepard et al. |
| 5,017,765 A | 5/1991 | Shepart et al. |
| 5,019,698 A | 5/1991 | Eastman |
| 5,023,438 A | 6/1991 | Wakatsuki et al. |
| 5,059,777 A | 10/1991 | Wittensoldner et al. |
| 5,065,003 A | 11/1991 | Wakatsuki et al. |
| 5,075,538 A | 12/1991 | Swartz et al. |
| 5,086,215 A | 2/1992 | Carsner et al. |
| 5,107,100 A | 4/1992 | Shepard et al. |
| 5,132,523 A | 7/1992 | Bassett |
| 5,153,417 A | 10/1992 | Sakai et al. |
| 5,155,346 A | 10/1992 | Doing et al. |
| 5,180,904 A | 1/1993 | Shepart et al. |
| 5,185,514 A | 2/1993 | Wike, Jr. et al. |
| 5,191,197 A | 3/1993 | Metlitsky et al. |
| 5,198,650 A | 3/1993 | Wike, Jr. |
| 5,212,370 A | 5/1993 | Wittensoldner et al. |
| 5,216,231 A | 6/1993 | Ouchi |
| 5,216,233 A | 6/1993 | Main et al. |
| 5,237,161 A | 8/1993 | Grodevant |
| 5,250,790 A | 10/1993 | Melitsky et al. |
| 5,260,553 A | 11/1993 | Rockstein et al. |
| 5,262,627 A | 11/1993 | Shepard |
| 5,272,323 A | 12/1993 | Martino |
| 5,272,324 A | 12/1993 | Blevins |
| 5,280,162 A | 1/1994 | Marwin |
| 5,294,782 A | 3/1994 | Kumar |
| 5,324,924 A | 6/1994 | Cai et al. |
| 5,334,821 A | 8/1994 | Campo et al. |
| 5,340,971 A | 8/1994 | Rockstein et al. |
| 5,340,973 A | 8/1994 | Knowles et al. |
| 5,347,113 A | 9/1994 | Reddersen et al. |
| 5,354,977 A | 10/1994 | Roustaei |
| 5,371,348 A | 12/1994 | Kumar et al. |
| 5,420,411 A | 5/1995 | Salatto, Jr. et al. |
| 5,424,525 A | 6/1995 | Rockstein et al. |
| 5,468,951 A | 11/1995 | Knowles et al. |
| 5,496,992 A | 3/1996 | Madan et al. |
| 5,600,121 A | 2/1997 | Kahn et al. |
| 5,610,386 A | 3/1997 | Ball et al. |
| 5,616,906 A | 4/1997 | Kumar |
| 5,747,785 A | 5/1998 | Miller et al. |
| 5,756,982 A | 5/1998 | Knowles et al. |
| 5,786,582 A | 7/1998 | Roustaei et al. |
| 5,914,480 A | 6/1999 | Swartz |
| 5,925,873 A | 7/1999 | Kumar |
| 5,945,660 A | 8/1999 | Nakasuji et al. |
| 5,966,230 A | 10/1999 | Swartz et al. |
| 6,021,947 A | 2/2000 | Swartz |
| 6,027,021 A | 2/2000 | Kumar |
| 6,102,294 A | 8/2000 | Swartz et al. |
| 6,105,871 A | 8/2000 | Campo et al. |
| 6,110,226 A | 8/2000 | Bothner |
| 6,115,719 A | 9/2000 | Purdy et al. |
| 6,138,914 A | 10/2000 | Campo et al. |
| 6,158,662 A | 12/2000 | Kahn et al. |
| 6,164,841 A | 12/2000 | Mattson, Jr. et al. |
| 6,164,853 A | 12/2000 | Foote |
| 6,182,898 B1 | 2/2001 | Schmidt et al. |
| 6,298,477 B1 | 10/2001 | Kessler |
| 6,301,626 B1 | 10/2001 | Knox |
| 6,305,607 B1 | 10/2001 | Katz et al. |
| 6,334,573 B1 | 1/2002 | Li et al. |
| 6,347,743 B2 | 2/2002 | Wilz, Sr. et al. |
| 6,398,112 B1 | 6/2002 | Li et al. |
| 6,415,156 B1 | 7/2002 | Stadelmann |
| 6,464,144 B1 | 10/2002 | Swartz et al. |
| 6,513,721 B1 | 2/2003 | Salmre et al. |
| 6,698,952 B1 | 3/2004 | Goddard |
| 6,976,626 B2 * | 12/2005 | Schmidt et al. .......... 235/462.01 |
| 6,978,448 B1 | 12/2005 | Plummer et al. |
| 7,121,468 B2 * | 10/2006 | Schmidt et al. .......... 235/462.45 |
| 7,182,250 B2 | 2/2007 | Kelly et al. |
| 7,370,324 B2 | 5/2008 | Goud et al. |
| 7,478,387 B2 | 1/2009 | Abelite et al. |
| 7,613,599 B2 | 11/2009 | Bade et al. |
| 2001/0007334 A1 | 7/2001 | Wilz, Sr. et al. |
| 2002/0139839 A1 | 10/2002 | Catan |
| 2002/0170970 A1 | 11/2002 | Ehrhart |
| 2004/0020990 A1 | 2/2004 | Havens et al. |
| 2004/0094627 A1 | 5/2004 | Parket et al. |
| 2004/0206825 A1 * | 10/2004 | Schmidt et al. .......... 235/462.46 |

FOREIGN PATENT DOCUMENTS

| | | |
|---|---|---|
| EP | 0 414 452 A1 | 2/1991 |
| EP | 0 424 976 A2 | 5/1991 |
| EP | 460 669 | 11/1991 |

OTHER PUBLICATIONS

The 1998 press release entitled "Symbol Adds Functionality to Palmpilot" by Symbol Technologies, Inc. http://www.symbol.com/press.100pr.htm, Mar. 23, 1998, pp. 1-2.

The product brochure for the MH290 Hand Held Laser Scanner by Metrologic Instruments, Inc., 1987, pp. 1-2.

The technical publication entitled "Hand-Held Holographic Scanner Having Highly Visible Locator Beam" by R.T. Cato, IBM Technical Disclosure Bulletin, vol. 27, No. 4, Sep. 1984, pp. 2021-2022.

Search Report for International Application No. PCT/US99/28530, 1999.

Search Report for International Application No. PCT/US04/00762, 2004.

* cited by examiner

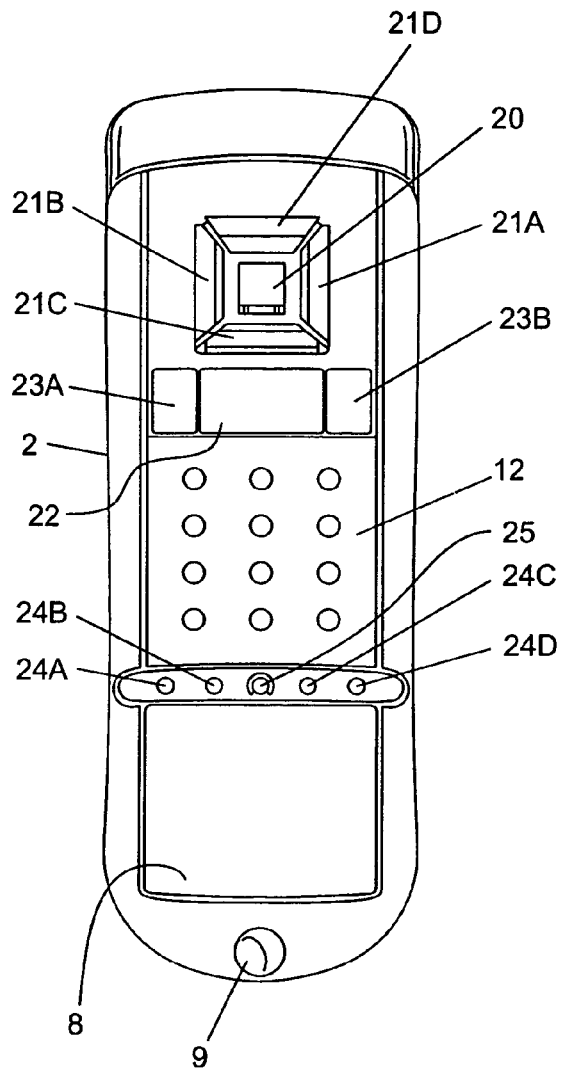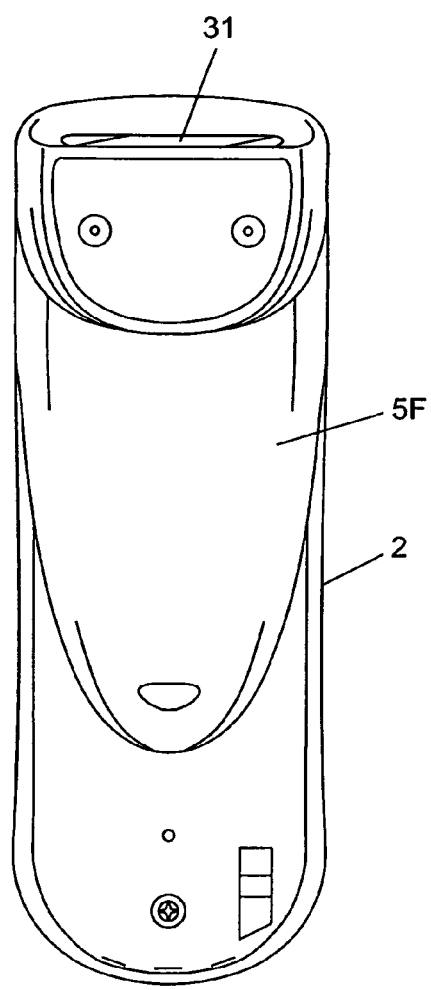
FIG. 2B1
FIG. 2B2

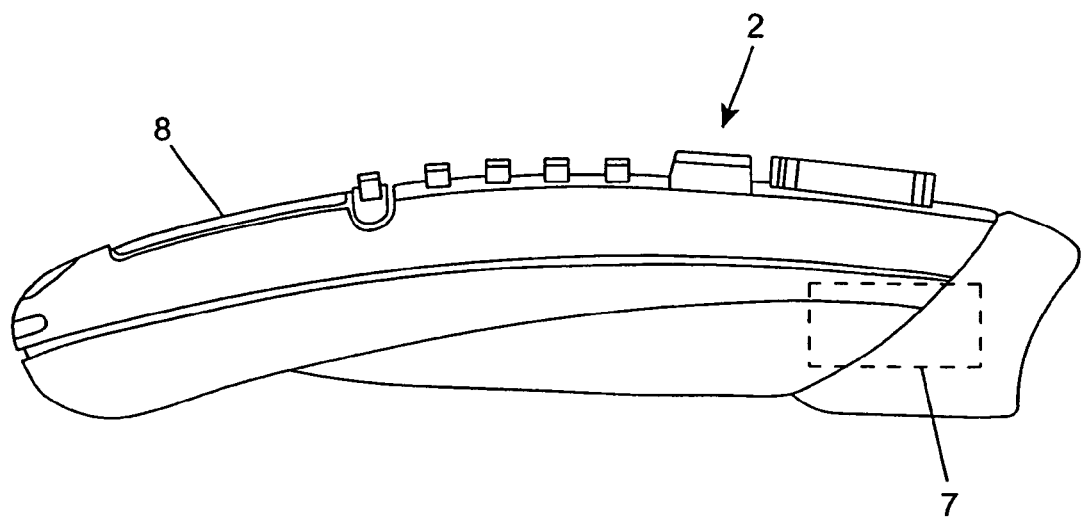
FIG. 2C1
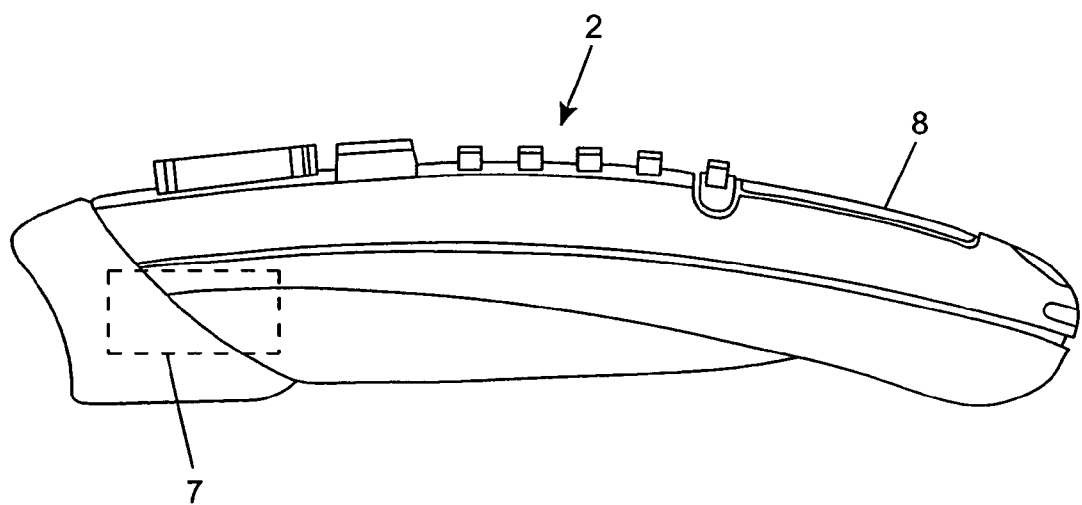
FIG. 2C2

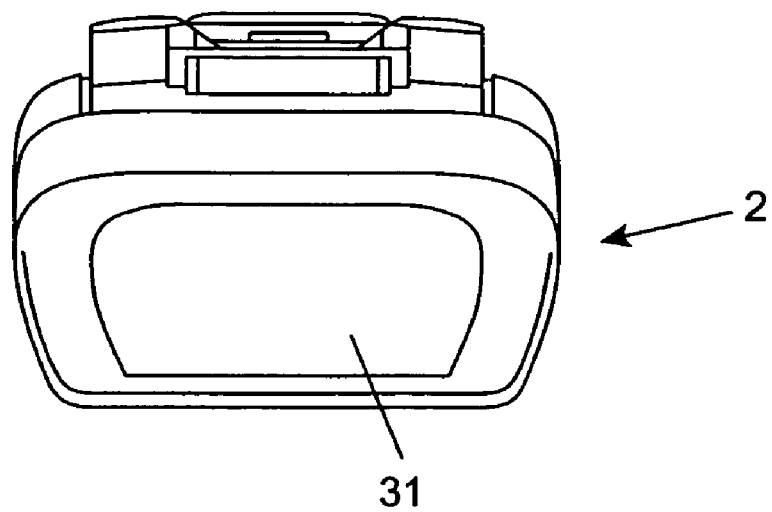
FIG. 2E1
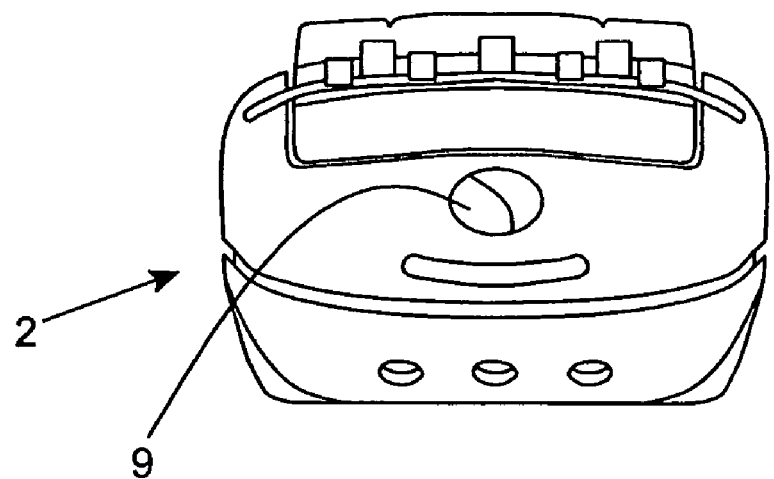
FIG. 2E2

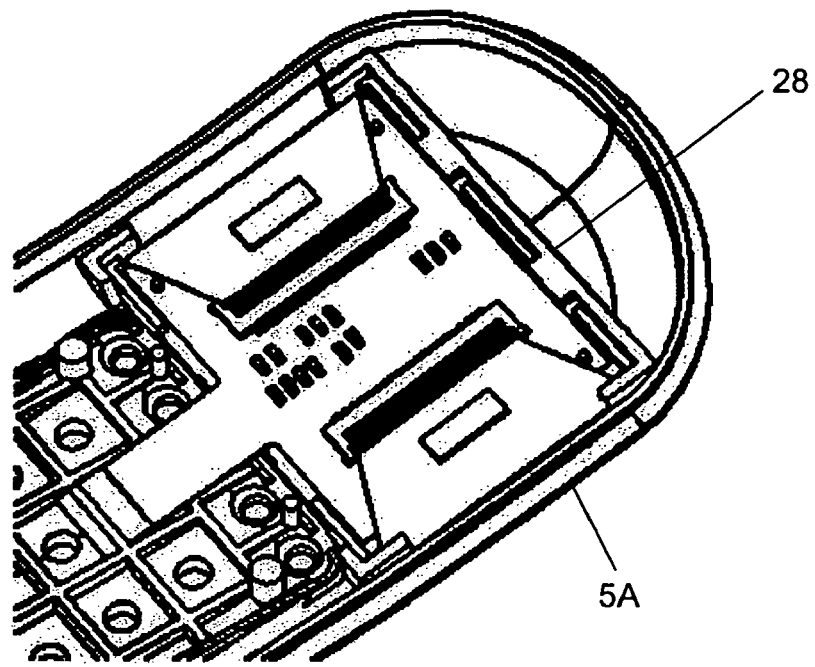
FIG. 5E
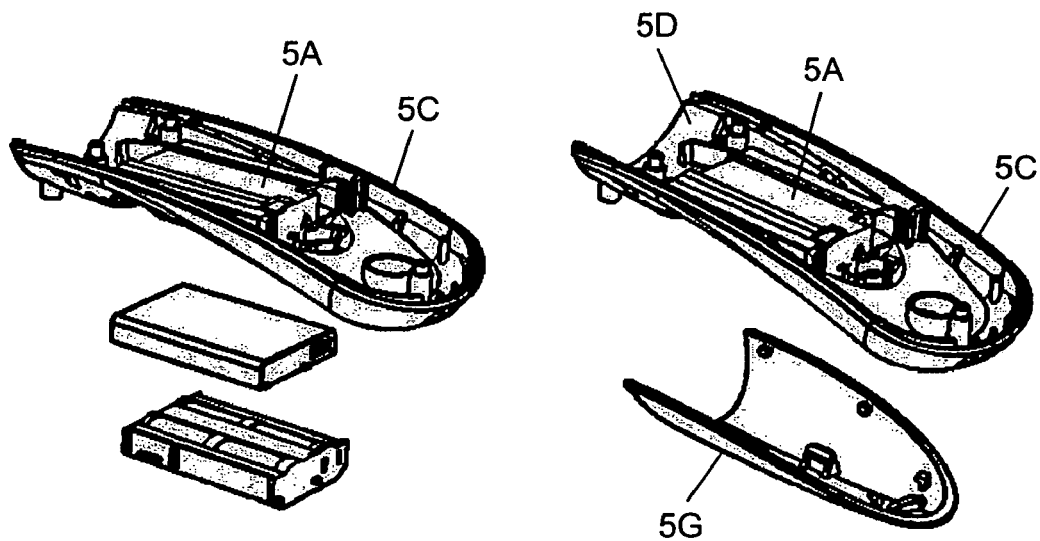
FIG. 5F
FIG. 5G

Software Block Diagram

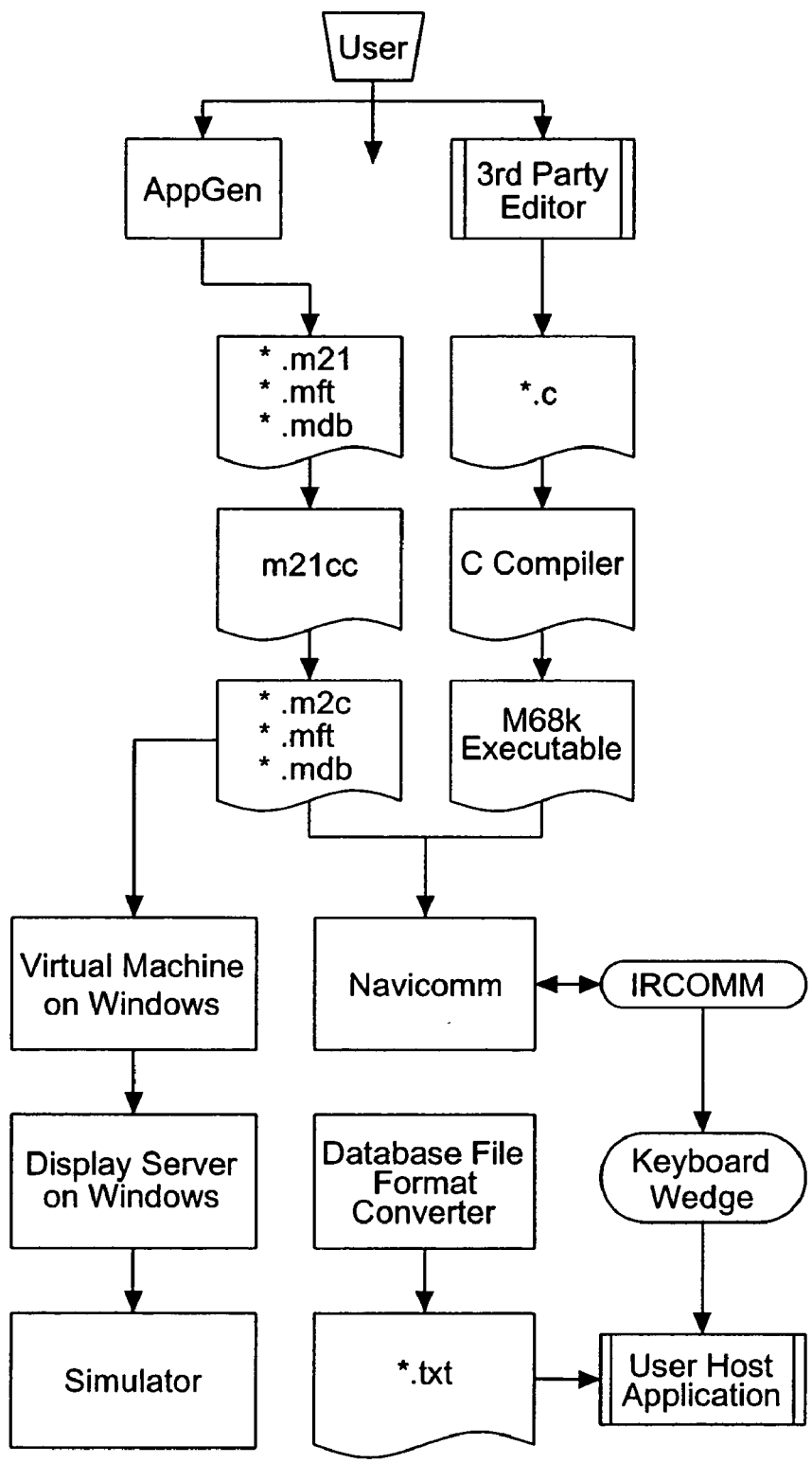
FIG. 10A1

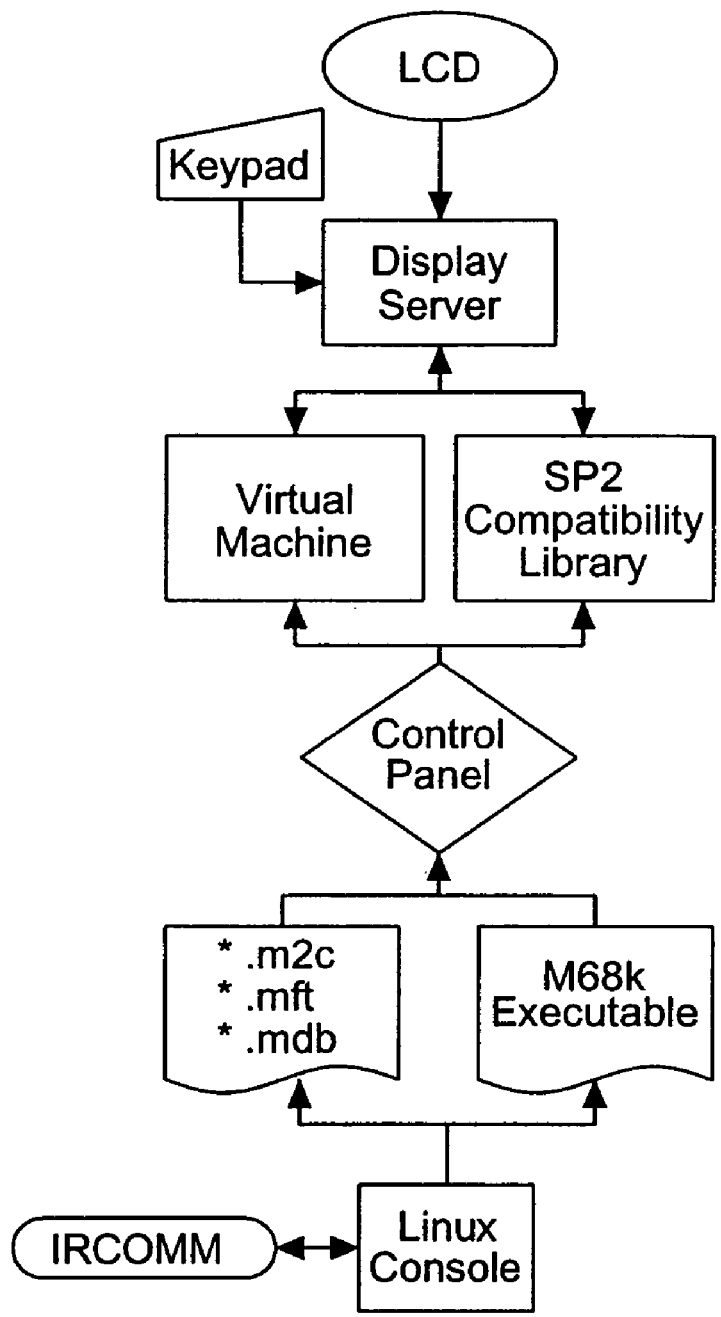
FIG. 10A2

• What is AppGen made up with?

1. "Screen Layout Design" Module or "Screen Editor"
2. "Screen Action Design" Module or "Action Designer"
3. "System Information" Module

• Screen Editor

1. Screen Structure Tree

```
Screen Object
|
|__Main Screen Object
|              |__Static Labels, Variable Labels
|              |__Menus
|              |__Input Areas
|              |__Images
|              |__Shapes
|              |__Animations
|
|__Overlay Area Objects
|              |__Top Aligned
|              |       |__Static Labels, Variable Labels
|              |       |__Images
|              |       |__Shapes
|              |       |__Animations
|              |
|              |__Left Aligned
|              |       |__....
|              |
|              |__Right Aligned
|              |       |__....
|              |
|              |__Bottom Aligned
|                      |__....
|
|__Message Window Objects
               |__Static Labels, Variable Labels
               |__Images
               |__Shapes
               |__Animations
```

FIG. 10B1

2. Screen Widgets

1) Static Labels
    2) Variable Labels
    3) Menus
    4) Input Areas
    5) Images, Shapes, Animations
    6) Variable Object *

3. How does Screen Editor work?

1) Enlarged Placement Pad
    2) Real-Size Preview Pad
    3) What you see is what you get

- Action Designer

1. What are actions for?

2. When can actions be defined?

1) Before entering a specific Screen Object
    2) Before leaving a specific Screen Object
    3) After a data collection is finished 3. What actions are covered?

1) Database Operation
       Lookup, insert, delete, update...

2) Data Formatting

3) Message Window Display

4) Communication

5) Beep, restart, reboot...

4. Who can have actions?

1) Main Screen Object
    2) Input Area Widget

FIG. 10B2

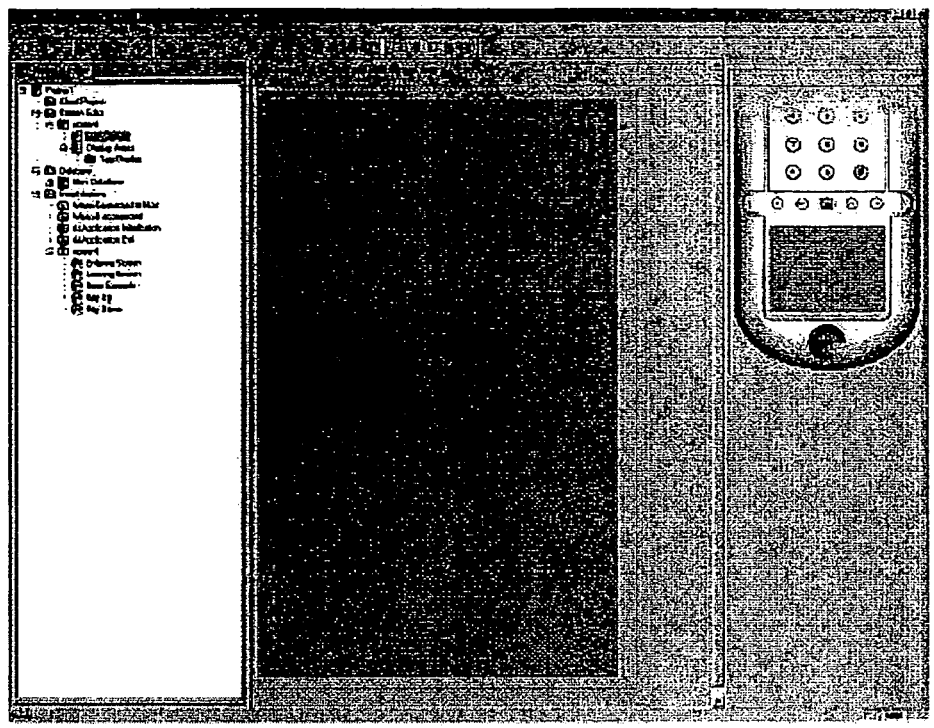
FIG. 10C1
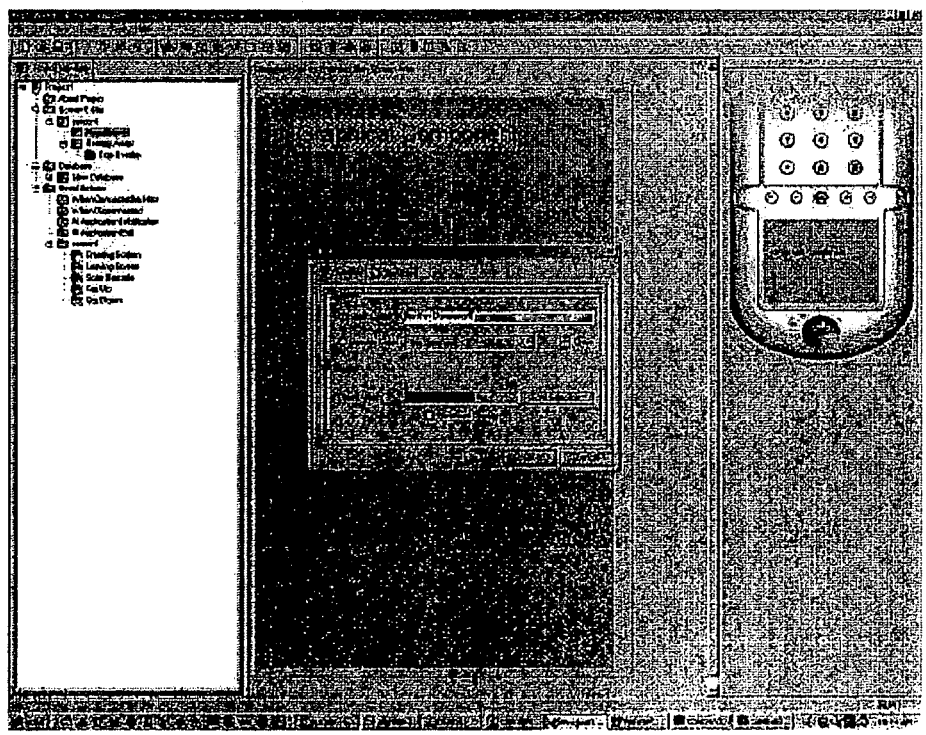
FIG. 10C2

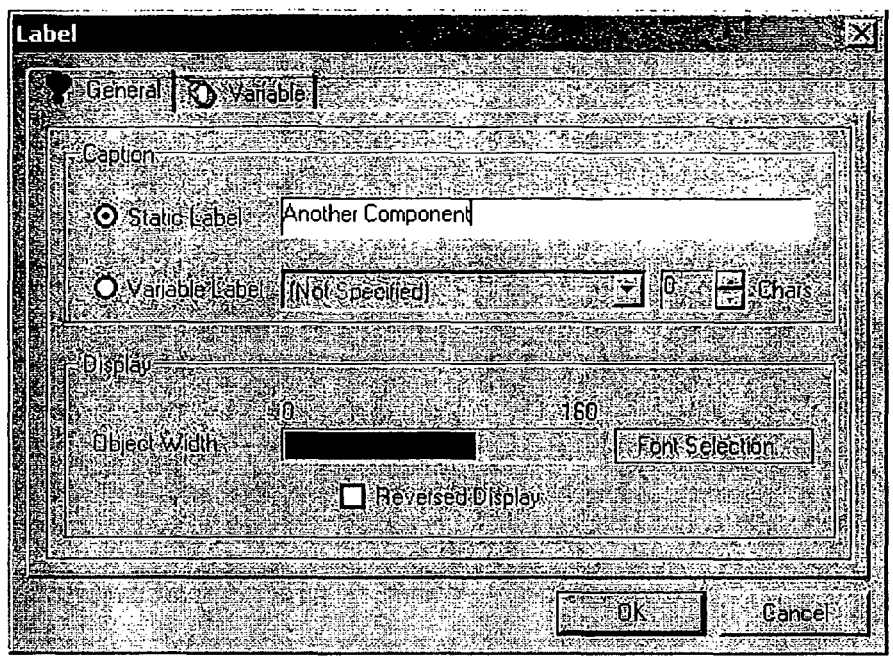
FIG. 10C3
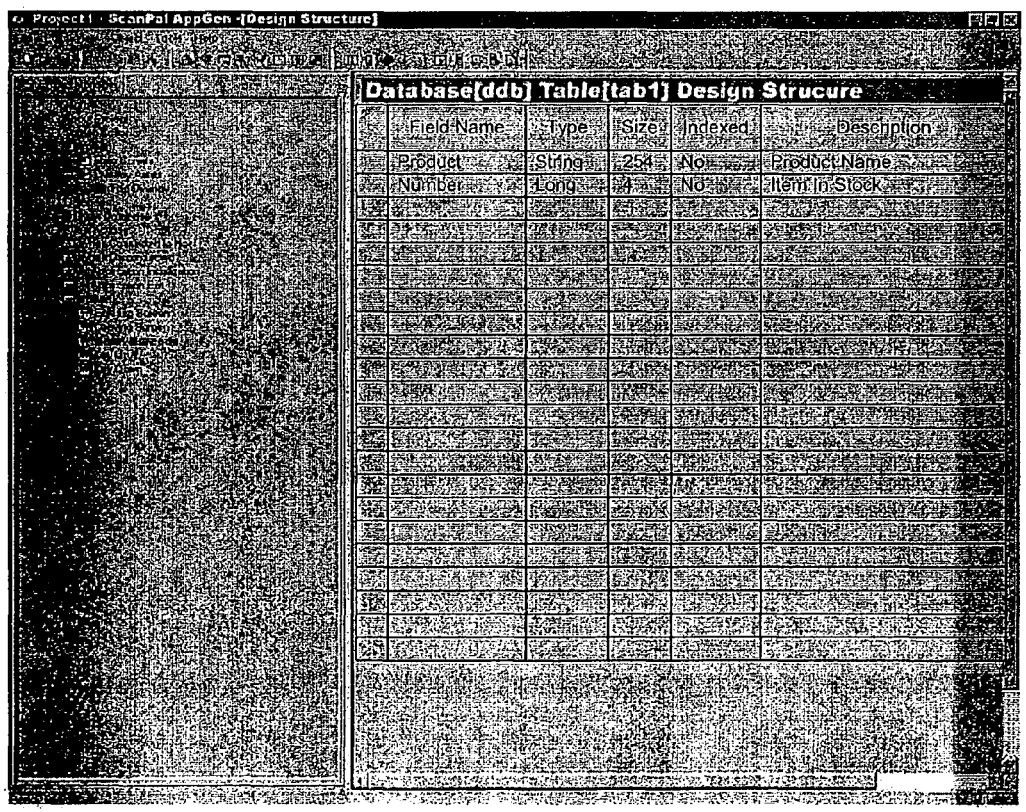
FIG. 10C4

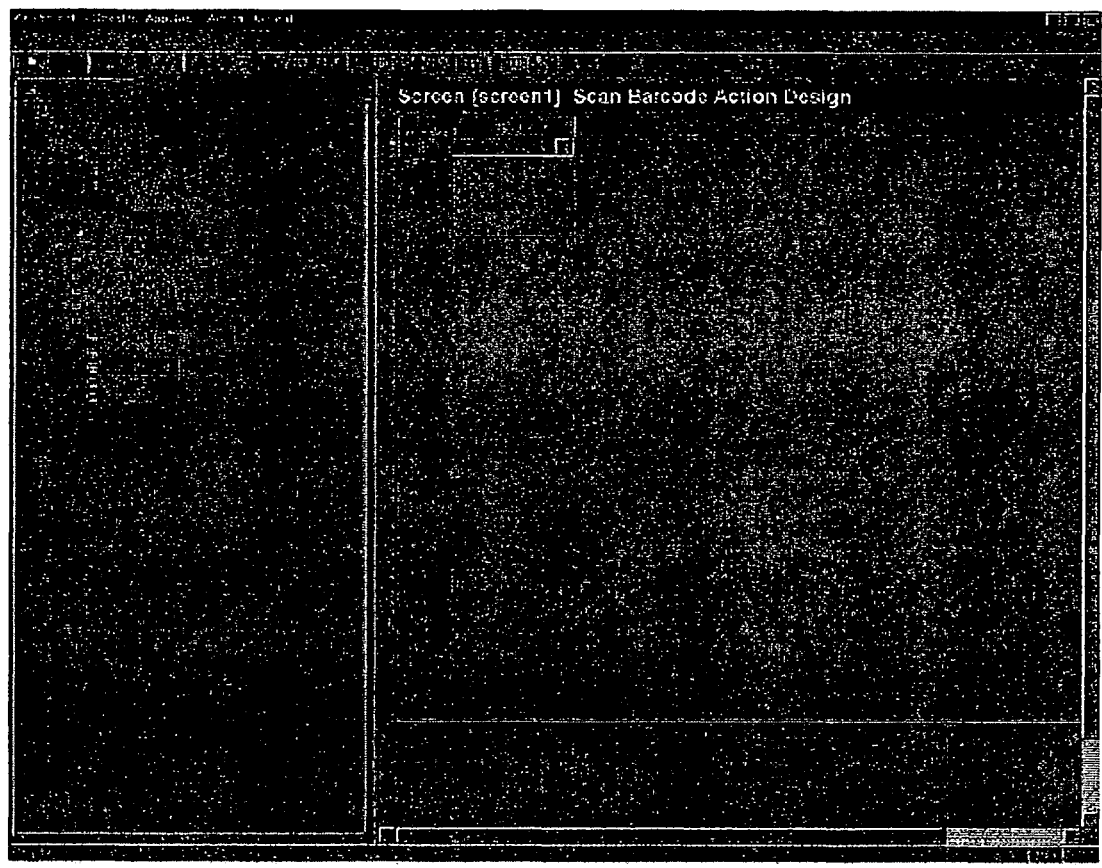
FIG. 10C5

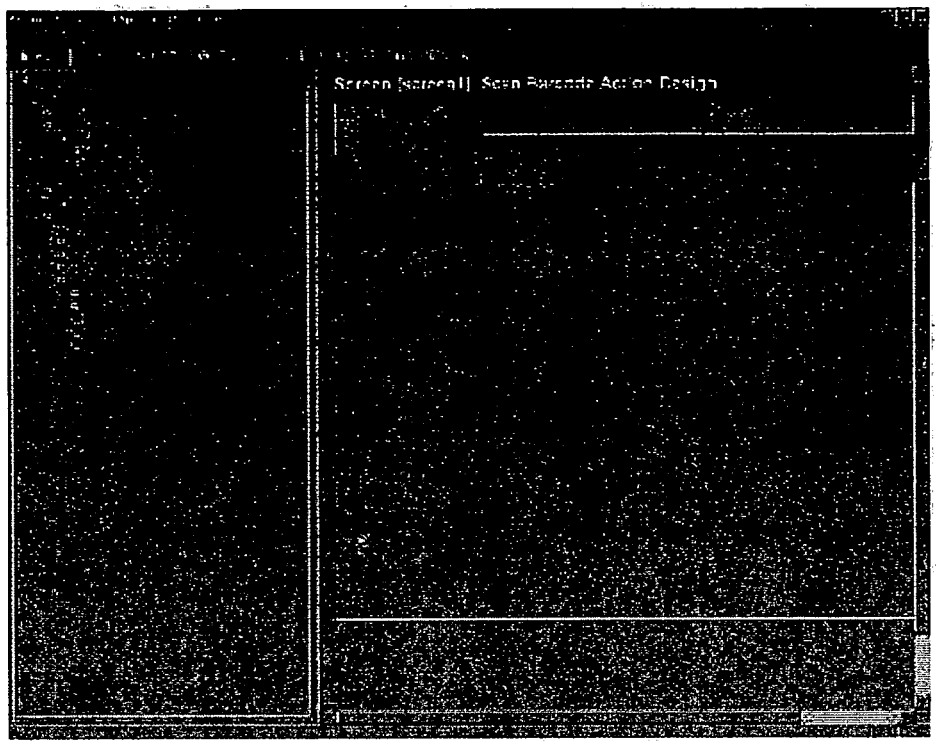
FIG. 10C6
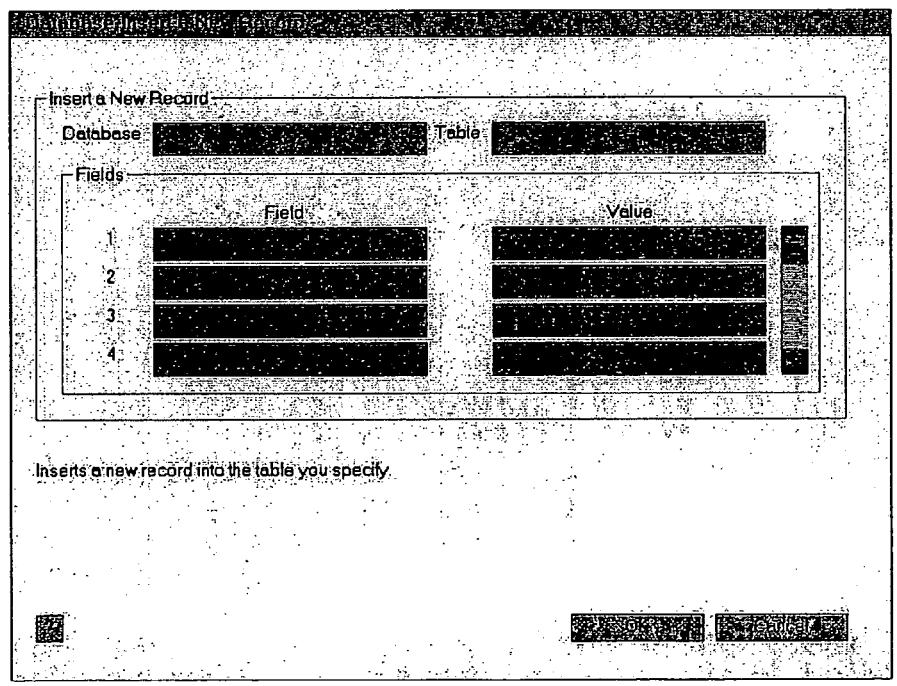
FIG. 10C7

Display Screen From Simulator Module
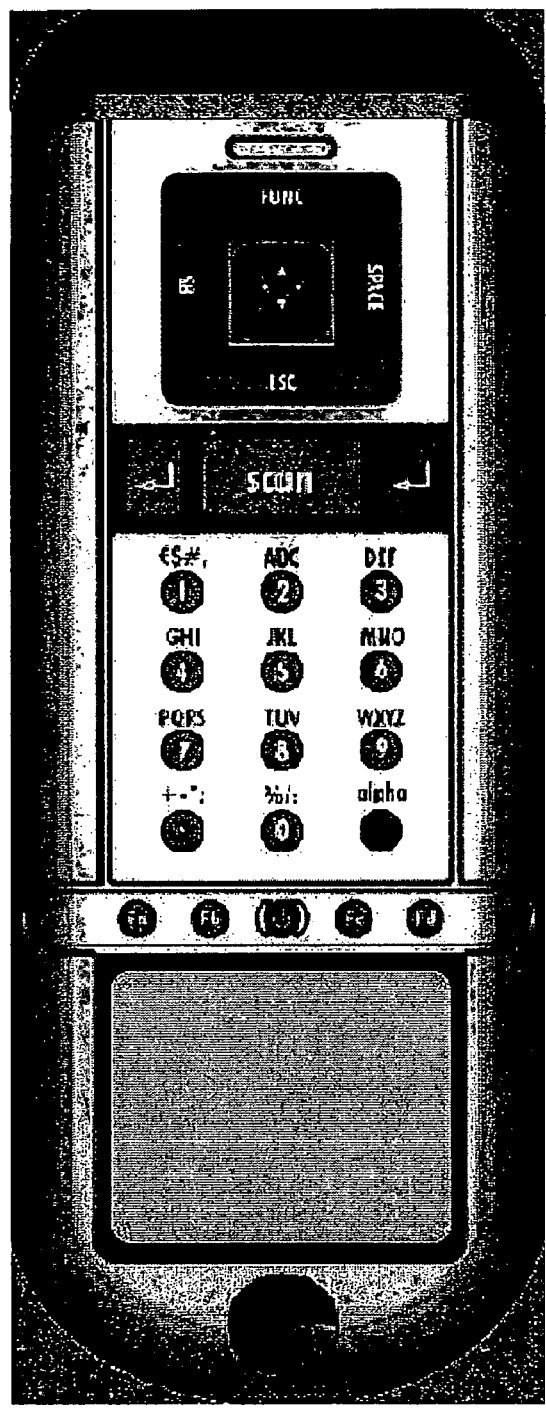
FIG. 10C8

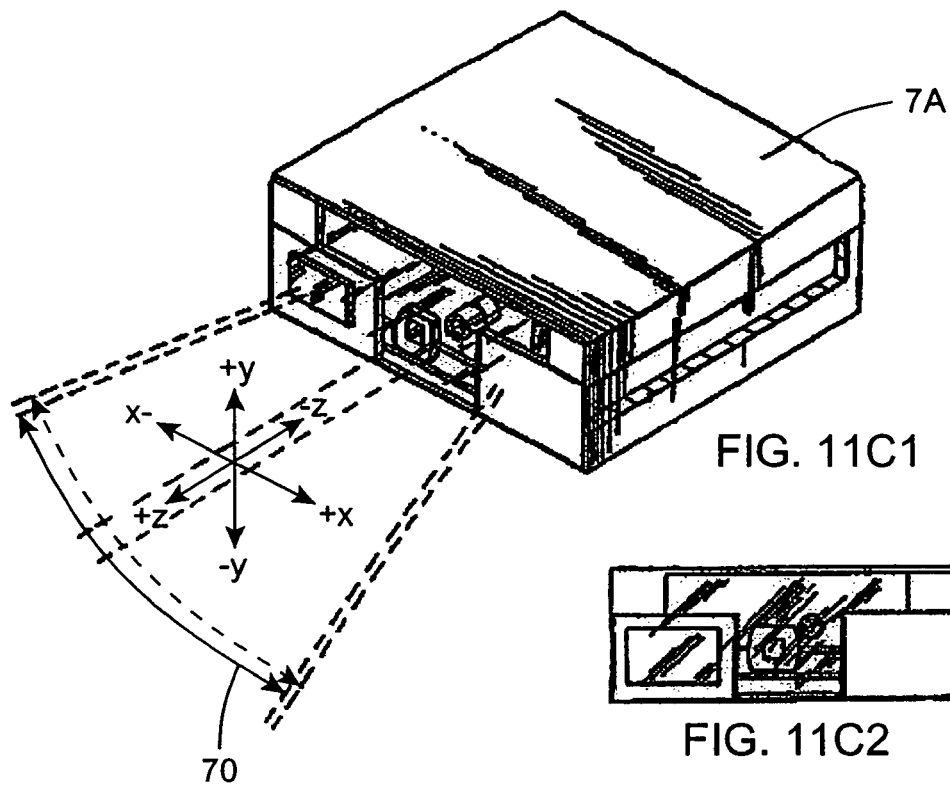
FIG. 11C1
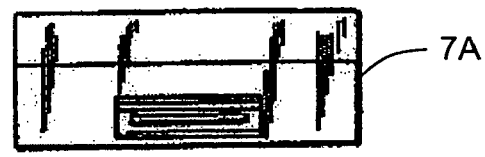
FIG. 11C2
FIG. 11C3
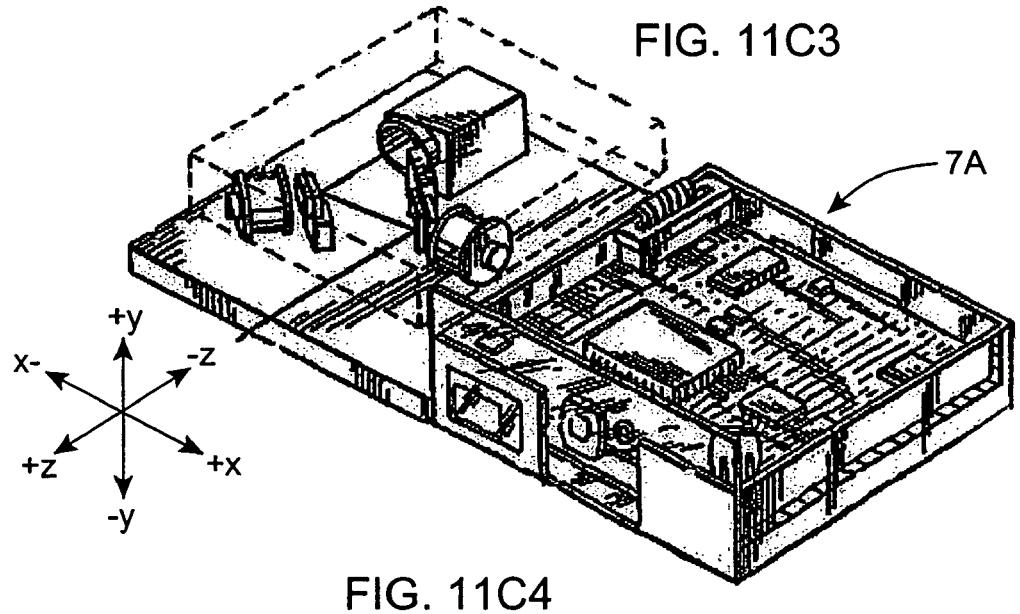
FIG. 11C4

WIRELESS BAR CODE SYMBOL DRIVEN PORTABLE DATA TERMINAL (PDT) SYSTEM FOR RUNNING APPLICATION PROGRAMS ON AN OPERATING SYSTEM EMULATED ON A VIRTUAL MACHINE

RELATED CASES

The present application is a Continuation of U.S. application Ser. No. 10/758,603 filed Jan. 15, 2004 now U.S. Pat. No. 7,121,468; which is a Continuation of U.S. application Ser. No. 10/342,441 filed Jan. 12, 2003 now U.S. Pat. No. 6,976,626; which is a continuation-in-part (CIP) of: U.S. application Ser. No. 09/452,976 filed Dec. 2, 1999, now U.S. Pat. No. 6,595,420; and U.S. application Ser. No. 09/204,176 filed Dec. 3, 1998, now U.S. Pat. No. 6,283,375. Each said patent application is assigned to and commonly owned by Metrologic Instruments, Inc. of Blackwood, N.J., and is incorporated herein by reference in its entirety.

BACKGROUND OF THE INVENTION

1. Field of the Invention

The present invention relates generally to improvements in wireless bar code driven portable data terminals (PDTs) for use in various bar code driven applications including navigation through and interactive with information structures within diverse kinds business enterprises.

2. Brief Description of the State of Knowledge in the Art

Hand-supportable wireless portable data terminals (PDTs) incorporating bar code reading engines are well known in the art and are generally described in published EPO Patent Application No. EP 0 837 406 A2, as well as in the Product Brochure, Data Sheet and Installation and User's Guide relating to Metrologic's ScanPal® 2 Portable Data Collection Terminal (PDT), each said document incorporated herein by reference as if set forth fully herein.

In FIG. 1 of EPO Patent Application No. EP 0 837 406 A2, there is disclosed a wireless portable data terminal (PDT) having a laser scanning bar code reading engine, a keypad, and a LCD-type display panel integrated into a compact hands-supportable housing having a generally bar-shaped geometry. This prior art PDT supports a 2-way RF-type data communication link with a remotely situated base station unit that is operably connected to an information network such as the Internet. In this part art design, the LCD display panel is located towards the end of the housing, near the scanning window of bar code reading engine, with the keypad located opposite the scanning window, towards the PDT operator.

While this prior art PDT design has been used for years in various applications, it suffers from a number of shortcomings and drawbacks which detract from the overall end-user experience.

In particular, due to the overall physical configuration of this prior art PDT design, it is very difficult to operate this kind of PDT in a truly single-handed operation. Most often, manually data entry into such PDTs requires the operator to use two hands: one hand to hold the PDT device, while the other hand is used to manually key data into the device by way of its keypad. By requiring two handed operation, the user experience is typically compromised in ways which can reduce worker productivity and efficiency. For example, the operator cannot easily hold a bar coded garment in one hand while manually keying product-related data into the PDT being held in his or her other hand.

The reason for this shortcoming is that this prior art wireless PDT design provides keypad and control function buttons at locations on the user console, thereby forcing the user the move his or her thumb in such a way that loss of secure grip about the PDT's housing becomes inevitable in nearly most end user applications.

Also, backlit LCD-type display screens provided on such prior art PDTs are generally difficult to view in brightly lit user environments.

Another problem with such prior art PDT designs is that they do not enable simple navigation of the display screen cursor while attempting the operate the PDT using only one hand of the operator. Again, two handed operation is typically required.

Another problem with such prior art PDT designs is that they do not typically support development of powerful end-user applications in a simple low cost manner, nor do they enable easy and flexible deployment of developed applications in portable run-time environments that are supported by open-source operating systems having no or low user license fees associated therewith.

Thus, there is a great need in the art for an improved wireless bar code driven PDT system, improved methods of data capture and transaction processing, and improved development and deployment environments therefor, while overcoming the above described shortcomings and drawbacks of prior art systems and methodologies.

OBJECTS AND SUMMARY OF THE PRESENT INVENTION

Accordingly, it is a primary object of the present invention to provide an improved wireless bar code driven PDT system, an improved method of data capture and transaction processing, and an improved integrated development and deployment environment (IDE) therefor, while overcoming the above described shortcomings and drawbacks of prior art devices and techniques.

Another object of the present invention is to provide an improved PDT system, wherein by virtue of its novel overall physical configuration of prior art PDTs, it is very difficult easy to operate the wireless device in a truly single-handed operation.

Another object of the present invention is to provide such an improved wireless PDT system, wherein its single handed operation promises to improve the user experience as well as increase worker productivity and efficiency.

Another object of the present invention is to provide such an improved wireless PDT system, wherein its keypad and control function buttons are located at locations on its user console that enable the user to move his or her thumb without loss of secure grip about the PDT's housing during single-handed operation in diverse user environments.

Another object of the present invention is to provide such an improved wireless PDT, wherein its backlit LCD-type display panel is located below the alphanumeric keypad and control and function buttons.

Another object of the present invention is to provide such an improved wireless PDT, wherein complete and total control over the navigation of the display screen cursor can be achieved by the operator's thumb while holding and operating the PDT in the operator's hand.

Another object of the present invention is to provide such an improved wireless PDT, wherein the backlit LCD panel of the PDT is easy to view in even brightly lit user environments.

Another object of the present invention is to provide such an improved wireless PDT, wherein the data capture engine is a 1D or 2D laser scanning bar code reading engine integrated into the PDT housing.

Another object of the present invention is to provide such an improved wireless PDT, wherein the data capture engine is a linear-type imaging engine integrated into the PDT housing, capable of reading 1D and 2D bar code symbols.

Another object of the present invention is to provide such an improved wireless PDT, wherein the data capture engine is an area-type imaging engine integrated into the PDT housing, capable of reading 1D and 2D bar code symbols.

Another object of the present invention is to provide such an improved wireless PDT, wherein the data capture engine is manually activated by depressing a bar code reading activation switch on the user console of the PDT.

Another object of the present invention is to provide such an improved wireless PDT, wherein the data capture engine is automatically activated in response to the automatic detection of an object within the field of view of the data capture engine integrated within the PDT.

Such objects of the present invention are provided within a wireless PDT system that employs a novel "display-on bottom" design which places the unit perfectly centered in the hand of the operator, allowing for the best possible viewing as well as providing comfortable single-handed operation. The high-resolution LCD display allows the PDT to show sharp, clear bitmap images while supporting all Windows-recognized font types and sizes. With the auto back-lit feature, the brightness adjusts automatically making the screen easy to read in all light conditions. The PDT is designed for support within the download/charger cradle of a base station which interfaces with a host system using either USB or RS232 interface. Two standard 'AA' or rechargeable Li-Ion batteries provide more than 100 hours of operation. In addition, the PDT comes standard with 2 MB of RAM providing enough memory to store over 100,000 records.

Another object of the present invention is to provide an improved method of data capture and transaction processing using the wireless PDT of the present invention.

Another object of the present invention is to provide such an improved method of data capture and processing, wherein the wireless PDT is physically configured for true single-handed operation.

Another object of the present invention is to provide such an improved method of data capture and processing, wherein true single handed operation is enabled by providing the display panel on the bottom of the user console panel of the PDT, and a multi-position display cursor navigation button above the display panel.

Another object of the present invention is to provide such an improved method of data capture and processing, wherein all user control and function buttons provided on the user control console of the PDT are located above the bottom positioned display panel.

Another object of the present invention is to provide an improved integrated development and deployment environment (IDE) for use in developing robust end-user applications with graphically rich graphical user interfaces (GUIs), that can be deployed on the wireless PDT of the present invention employing an open-source operating system that has no or low user license fees associated therewith.

Another object of the present invention is to provide an improved IDE for a wireless PDT system, wherein a powerful set of easy-to-use application development tools are provided for developing applications that can be run on the wireless PDT hereof, which employs a virtual machine (MVM) so that developed applications can be run on operating systems (OS) other than the operating system upon which the development environment operates.

Another object of the present invention is to provide an improved IDE for a wireless PDT system, wherein end-user applications can be developed on developer computers (PCs) running Microsoft's Windows 2000 OS, while such applications can be deployed on run-time environments supported by operating systems such as uClinux, having ultra-low or no user license fees.

Another object of the present invention is to provide an improved IDE for a wireless PDT system, wherein the IDE enables "drag-and-drop" type visually-oriented programming within a "what you see is what you get (WYSIWYG) development environment.

Another object of the present invention is to provide an improved IDE for a wireless PDT system, wherein all development tools support "event-driven" programming, wherein the developer simply defines what actions are to occur in response to specified events.

Another object of the present invention is to provide an improved IDE for a wireless PDT system, wherein development tools are provided for simply creating SQL relational database management systems (RDBMS) that are supported either within memory structures aboard the PDT, or alternatively aboard Web-enabled database servers connected to an IP-based network, to which the base station of the present invention is interfaced directly or by way of a host computer system.

Such objects are provided by a novel integrated development and deployment environment (IDE) which contains an easy-to-use Windows-based application generator and download utilities. For advanced programming, developers can choose to write software using an advanced application generator or 'C' programming application generator which provides the developer with simple programming and fast setup. Further enhancements available in the application generator include drag and drop icons, time/datestamp, battery level indicator and variable fonts, giving the developer the ability to create graphically-rich custom display screen layouts.

These and further objects of the present invention will become apparent hereinafter and in the Claims to Invention.

BRIEF DESCRIPTION OF THE DRAWINGS

For a fuller understanding of the Objects of the Present Invention, the Detailed Description of the Illustrated Embodiments of the Present Invention should be read in conjunction with the accompanying Drawings, wherein:

FIGS. 2B1 and 2B2 set forth an elevated front view of the wireless bar code driven portable data terminal (PDT) of the present invention, showing its LCD panel mounted beneath its data keypad and navigator controls and away from its integrated bar code reading engine, and closest towards the user, to provide easy and controllable single-handed operation;

FIGS. 2C1 and 2C2 set forth an elevated side view of the wireless bar code driven portable data terminal (PDT) of the present invention;

FIG. 2E1 is an elevated front end view of the wireless bar code driven PDT of the present invention, showing its scanning window;

FIG. 2E2 is an elevated rear end view of the wireless bar code driven PDT of the present invention;

FIG. 5E is a perspective view of the portion of the bottom housing structure of the wireless portable data terminal, containing the mounting fixture designed to support the LCD panel and its rubberized membrane-switching structure;

FIG. 5F is a perspective view of the battery power pack being installed within the battery power compartment of the wireless portable data terminal of the present invention;

FIG. 5G is a perspective view of the battery compartment cover being snap-fitted over the battery compartment of the of the wireless portable data terminal of the present invention;

FIGS. 10A1 and 10A2 set forth a flow chart illustrating the flow and interaction between the application and development programs running on the wireless portable data terminal and the application developer's computer system, respectively, and the user input and documents generated during this process, wherein flow chart on the left side of the figure illustrates events that occur during application development on the developer's computer system including the generation of the final application in the form of binary executable code (i.e. m20) and the downloading of the same onto the wireless portable data terminal, and wherein the flow chart on the right side of the figure illustrates how the final application runs, when downloaded in binary executable code (i.e. m20) onto the wireless portable data terminal;

FIGS. 10B1 and 10B2, taken together, set forth a schematic representation describing the primary software component modules used by the ApplGen program running on the developer's computer system, and what application development functions are carried out by such modules on the IDE of the present invention; 9 of 53

FIGS. 10C1 through 10C8, set forth a high-level tutorial on how to use the Application Generation program of the novel IDE of the present invention, to simply and rapidly design and implement wireless PDT-supported information systems having (i) a Presentation Layer characterized by rich graphical user interface (GUI) screens displayed on the PDT's color LCD panel, (ii) a Data Layer characterized by SQL databases supported within the PDT(s), or within Web-enabled RDBMS servers connected to IP-based information networks such as the Internet, and (iii) a Control Layer characterized by easily implemented business logic using visual WYSIWYG, event-driven programming techniques;

FIG. 11C1 is an enlarged perspective view of the 1D and 2D laser scanning bar code reading engine shown in FIG. 11B;

FIG. 11C2 is an elevated front view of the laser scanning bar code reading engine shown in FIG. 11B, showing its scanning window;

FIG. 11C3 is an elevated rear view of the laser scanning bar code reading engine shown in FIG. 11B, showing its output data communications port which is connected to the PC board within the wireless portable data terminal by way of a flexible communication cable; code reading field;

FIG. 11C4 is a perspective view of the laser scanning bar code reading engine shown in FIG. 11B, shown with the upper portion of its engine housing removed and set along side of the bottom portion thereof, so as to reveal the 1D/2D laser scanning mechanism provided therewithin as well as its scan data signal processing circuit and other subsystem component implementations;

DETAILED DESCRIPTION OF THE ILLUSTRATIVE EMBODIMENTS OF THE PRESENT INVENTION

Figure 1A:
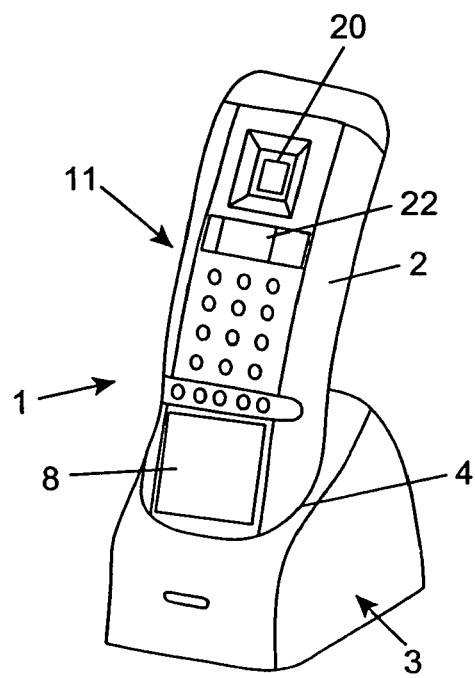
FIG. 1A is a perspective view of the wireless bar code driven portable data terminal (PDT) system of the present invention, showing a perspective view of the hand-supportable portable data terminal supported within the cradle portion of the base station for charging the batteries of the terminal and the communication of data with the host computer system to which the base station is connected.

Referring to the figures in the accompanying Drawings, the various illustrative embodiments of the automatically-activated laser scanning bar code symbol reading system of the present invention will be described in great detail, wherein like elements will be indicated using like reference numerals.

In general, the present invention has several different aspects which can be best appreciated when viewed as a single exposition.

The first aspect of the present invention relates to a novel wireless bar code symbol driven portable data terminal (PDT) system physically configured for truly single-handed operation.

The second aspect of invention relates to a novel method of navigating through and interacting with information structures within database using the wireless PDT of the present invention.

The third aspect of the present invention relates to a novel integrated development environment that supports rapid visual-based development of end-user applications deployable on the wireless PDT of the present invention.

Such aspects of the present invention will be now specified in detail hereinbelow.

Figure 1B:
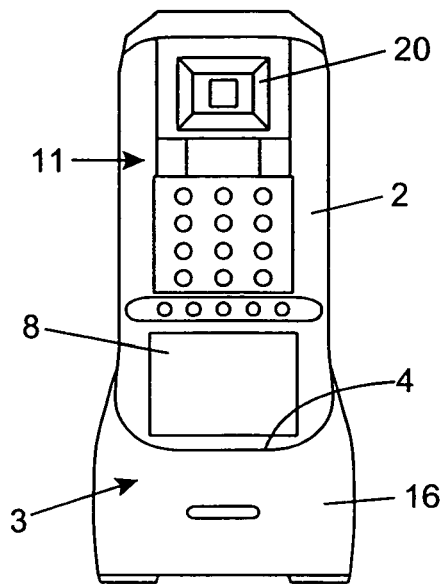
FIG. 1B is an elevated front view of the wireless bar code driven portable data terminal (PDT) system of the present invention, showing the hand-supportable PDT terminal supported within the cradle portion of the base station.
Figure 1C:
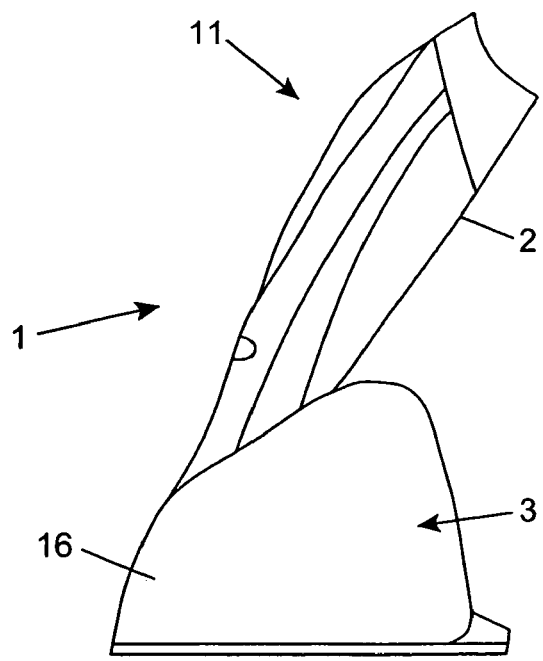
FIG. 1C is an elevated side view of the wireless bar code driven portable data terminal (PDT) system of the present invention, showing the hand-supportable PDT terminal supported within the cradle portion of the base station.

Wireless Bar Code Symbol Driven Portable Data Terminal (PDT) System Physically Configured for Truly Single-Handed Operation The structure and function of the wireless bar code driven portable data terminal (PDT) system of the present invention will be now described in detail with reference to FIGS. 1A through 10, the As shown in FIGS. 1A, 1B and 1C, the wireless PDT system of the present invention 1 comprises: a wireless hand-supportable portable data terminal 2; and a base station 3 having a cradle portion 4 for receipt and support of the hands-supportable PDT 2.

As shown, the wireless PDT 2 comprises: a hand-supportable housing 5 of a bar-like geometry having a distal end disposed away from the operator when held in his or her hand, and a proximate end facing the closest to the operator when held in his or her hand during operation; a rechargeable battery power pack 6A and a non-rechargeable battery pack 6B supported within the battery bay 5C of the housing 5; a data capture engine 7 mounted within the data capture engine bay 5D located at the distal end of the housing, for optically capturing data about objects optically encoded in information structures such as bar code symbols; a LCD panel 8 with its backlighting automatically controlled in response to the brightness level of ambient light sensed by an ambient light sensor 9 located on the housing adjacent the LCD panel; an Internet-enabled microcomputing platform 10 mounted within the supportable housing, and capable of (i) running/executing application programs on a first kind of operating system (OS1) that is emulated on a virtual machine that is supported on a second kind of operating system (OS2) so that the application programs can be developed on developer computers running the first kind of operating system OS1, and (ii) supporting a graphical user interface (GUI) on LCD panel 8 for graphically displaying and manipulating documents (i.e. information files); a user control console 11 having a manual data-entry structure (e.g. membrane alpha-alphanumeric keypad) 12 for manually entering data into these documents; circuitry 13 within the PDT housing 2 and base station 3 for enabling an electromagnetic-based 2-way digital data communication link (e.g. infrared or IR link, radio frequency or RF link or microwave link) between the PDT 2 and the base station 3; circuitry 14 for interfacing the base station 2 with a host computer system or network 15 by way of a standard digital communications interface such as RS232 or the USB interface.

As the LCD panel 8 is mounted beneath the data keypad and the cursor navigational controls located away from its integrated bar code reading engine, and closest towards the user, this novel user console configuration provides an improved arrangement for a truly single-handed operation of the wireless PDT of the present invention.

As shown in Figures, the base station 3 includes: (i) a base housing 16; (ii) means 17 in the base housing 16 for recharging the battery power pack 6A aboard the PDT terminal; (iii) means 13 in the base housing 16 for enabling said electromagnetic-based 2-way digital data communication link 18 between the portable data terminal 2 and the base station 3 (either while the PDT is outside of or inside the cradle portion of the base station); and (iv) means 14 in said base housing for implementing said digital data communications interface between the base station 3 and the host computer system or network 15 using either physical (i.e. hard-wire type) or electromagnetic-wave based (i.e. wireless) communication media.

Figure 2A:
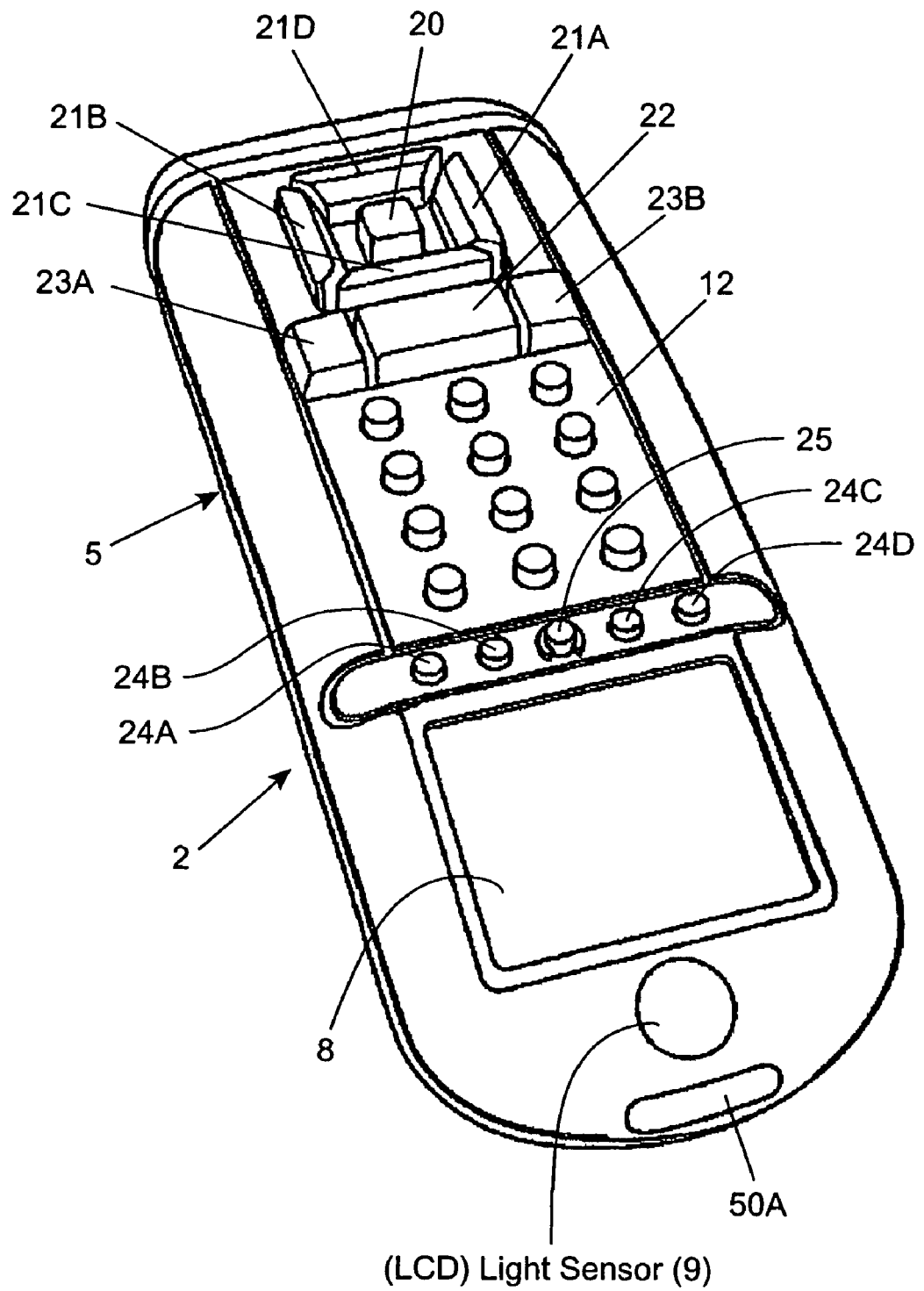
FIG. 2A is a first perspective view of the wireless bar code driven portable data terminal (PDT) of the present invention, showing its LCD panel mounted beneath its data keypad and navigator controls and away from its integrated bar code reading engine, and closest towards the user, to provide easy and controllable single-handed operation.
Figure 2D:
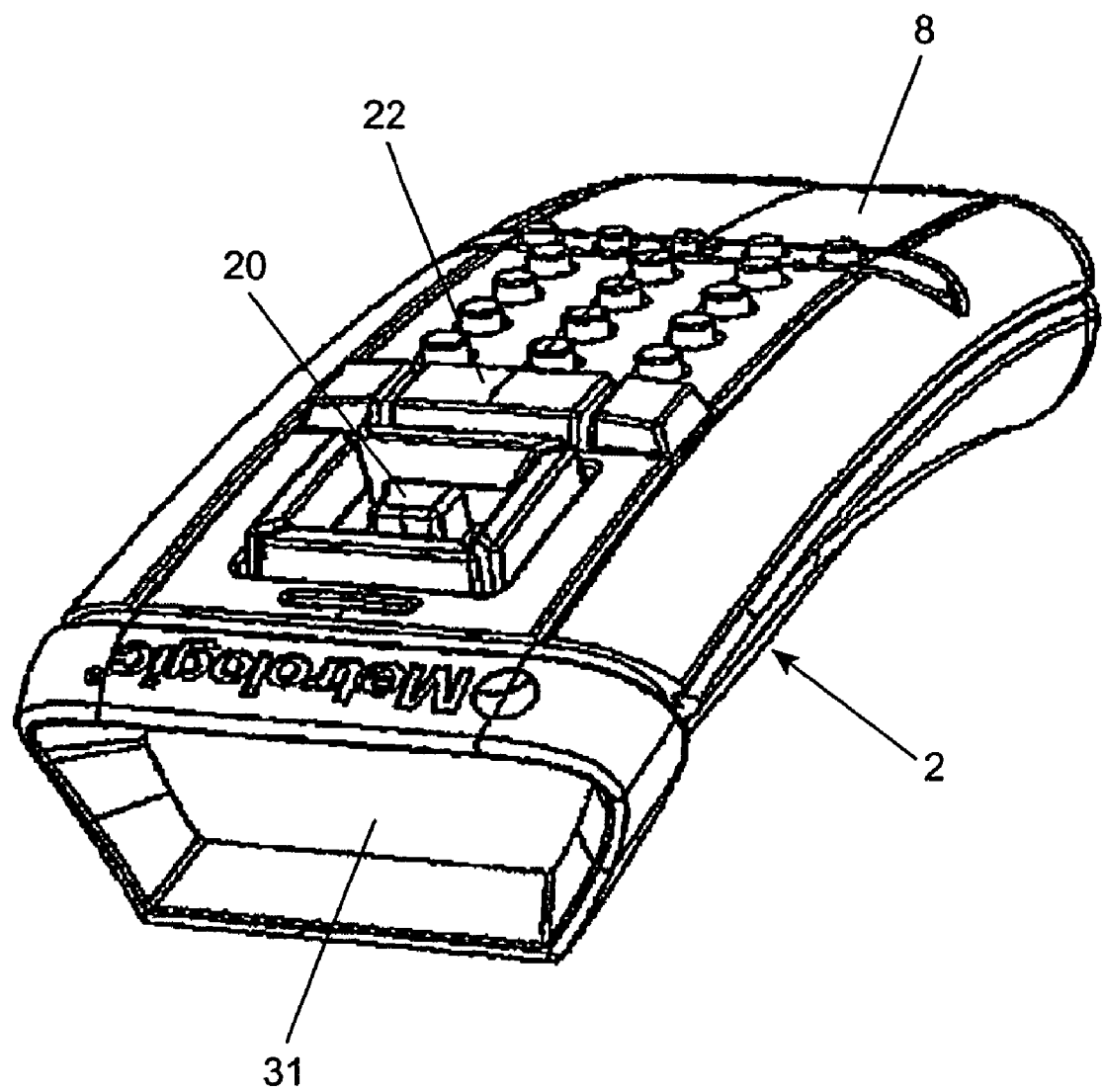
FIG. 2D is a second perspective view of the wireless bar code driven portable data terminal (PDT) of the present invention, showing its scanning window, behind which its integrated bar code reading engine is mounted.
Figure 5A:
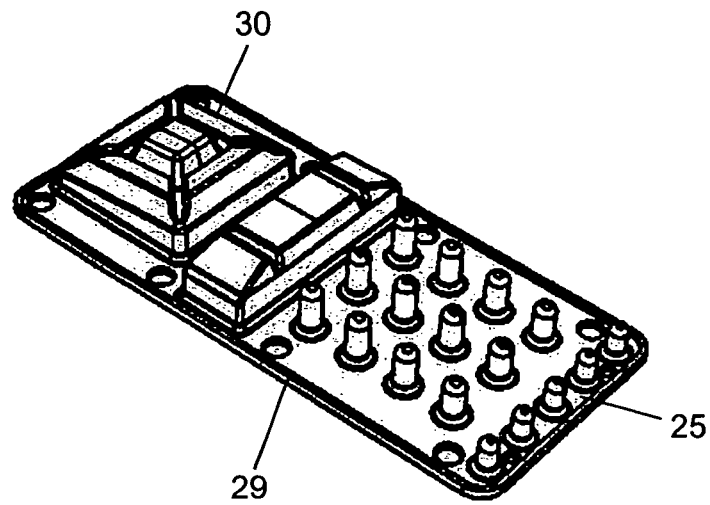
FIG. 5A is a perspective view of the rubber membrane-switching structure employed in the wireless bar code driven portable data terminal (PDT) of the present invention, so as to realize its display cursor (i.e. jog) control buttons, scan and enter buttons, alphanumeric buttons, and other control keys (i.e. ON/OFF, ESC, FN, ALPHA, etc)
Figure 5B:
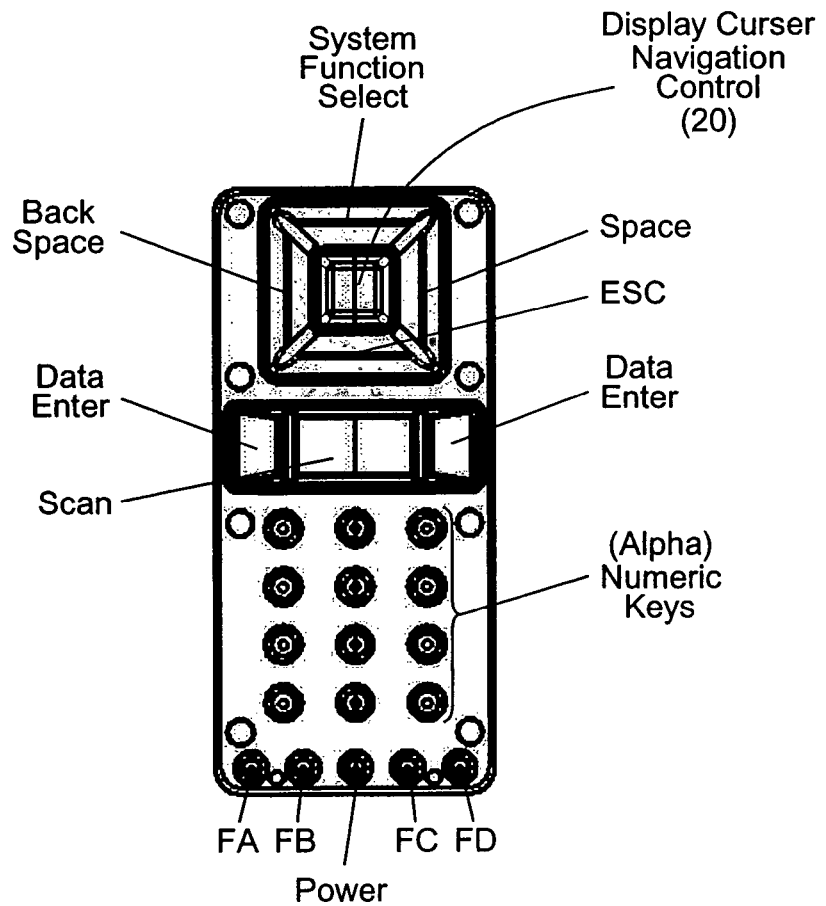
FIG. 5B is a schematic layout diagram for the rubberized membrane-switching structure of the present invention, showing the spatial layout of the display cursor (i.e. jog) control buttons, scan and enter buttons, alphanumeric buttons, and other control keys (i.e. ON/OFF, ESC, FN, ALPHA, etc)
Figure 5C:
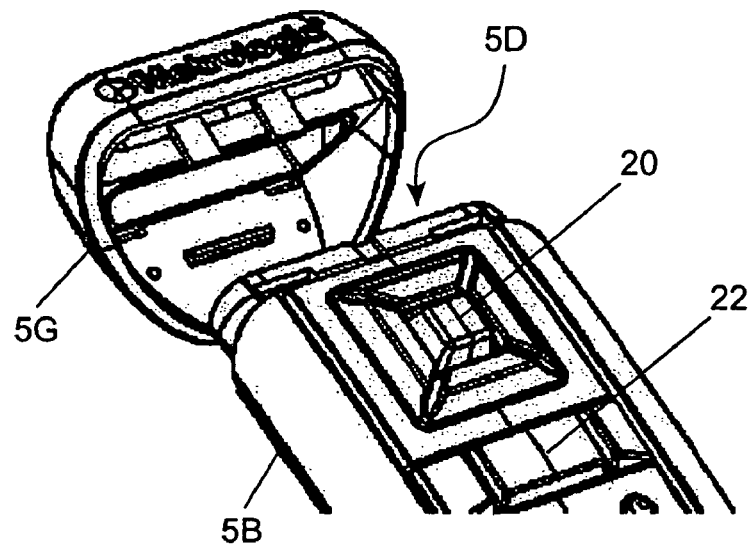
FIGS. 5C and 5D are perspective views of the head housing component (made of rubber molded over polycarbonate plastic) and its integrated scanning window, adapted to snap fit over the hand-supportable body portion of the bar code driven portable data terminal, and fastened thereto by way of slots and hooks.
Figure 5D:
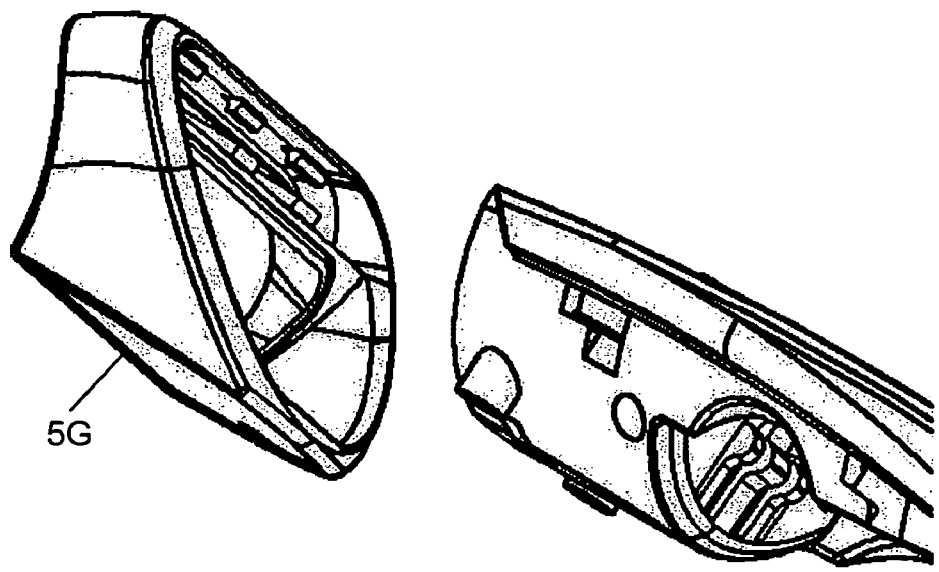

As shown in FIGS. 2A through 2C2, the user console panel provided on the top surface of the hand-supportable PDT housing 2 comprises: user control console 11 implemented using membrane-switching technology and including (i) a five-position cursor navigation control button 20 (having left, right, up, down and IN movements) surrounded by four control function buttons 21A through 21D (for BACK SPACE, ESC, SPACE, and SYSTEM FUNCTION SELECT indicated in FIG. 5B), (ii) a data capture engine control button 22 surrounded by a pair of DATA ENTER function buttons 23A and 23B positioned below the navigation control button 20, (iii) a 3×4 data entry alphanumeric keypad 12 disposed below the data capture engine control button 22, and (iv) two pairs of user-programmable control function buttons 24A, 24B and 24C, 24D positioned about a centrally positioned power ON/OFF button 25.

Figure 4:
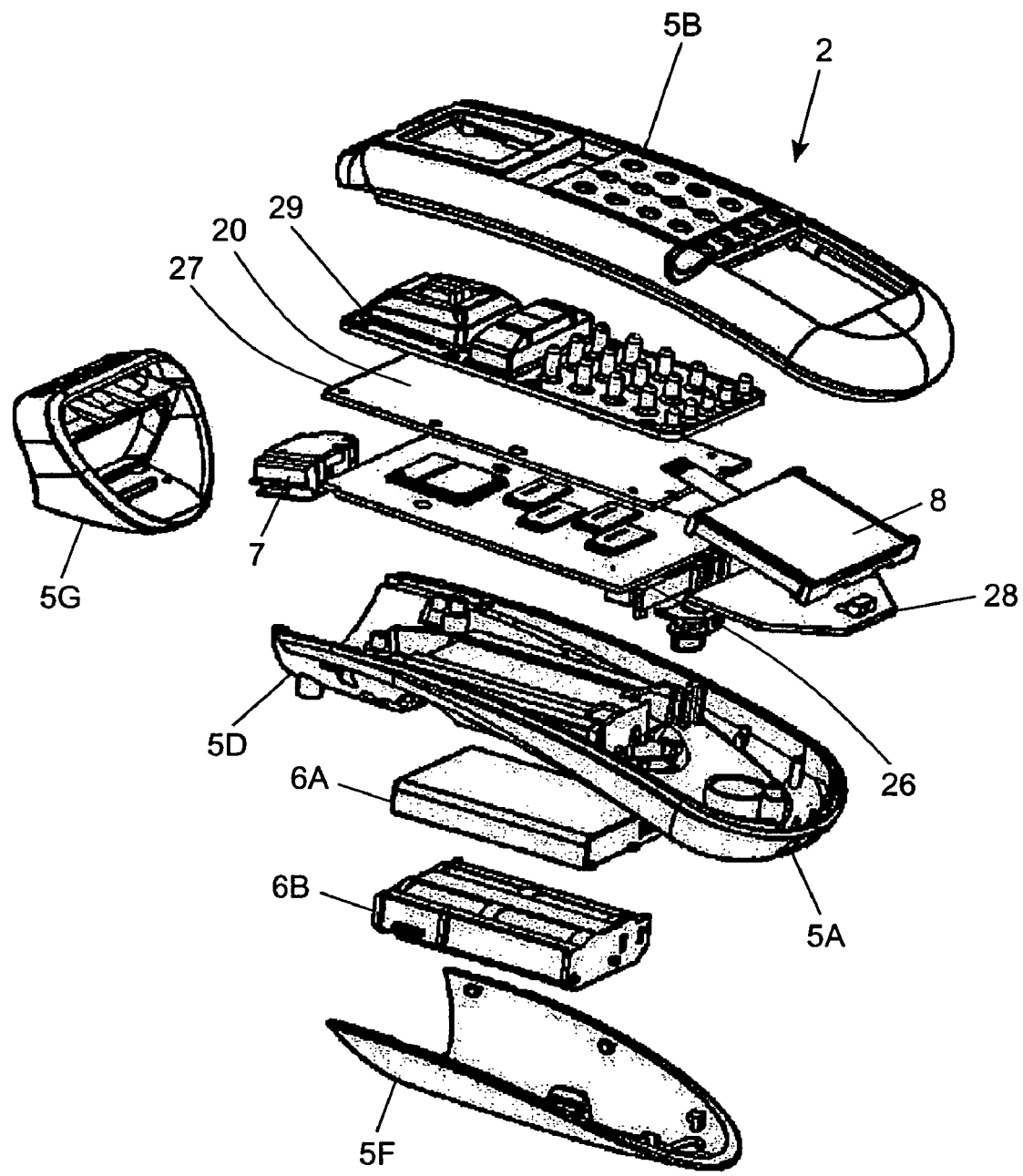
FIG. 4 is an exploded diagram of the wireless bar code driven portable data terminal (PDT) of the present invention, showing the spatial relationship between its various housing and system components prior to final assembly, comprising: a bottom housing structure of elongated geometry; a printed circuit (PC) board populated with surface-mounted integrated circuits (ICs) and other electronic components; a LCD panel and associated ambient light sensor and associated backlight control circuitry; a rubberized membrane-switching structure designed to realize the display cursor (i.e. jog) control buttons, scan and enter buttons, alphanumeric buttons, and other control keys (i.e. ON/OFF, ESC, FN, ALPHA, etc) provided on the wireless portable data terminal; a mounting fixture designed for supporting the LCD panel and the rubberized membrane-switching structure; a top housing structure designed to snap-fit together with the bottom housing structure, with the PC board, mounting structure, LCD panel and the rubberized membrane-switching structure disposed therebetween; a head housing component with integrated scanning window, adapted to snap-fit over and enclose the front end of the housing structure, behind and within which a data capture engine is mounted and electrically connected to the PC board; a rechargeable battery power pack adapted for support and containment within the battery compartment formed on the exterior of the bottom housing portion; and a battery compartment cover adapted to snap-fit over the battery pack contained within the battery compartment.

In FIG. 4, the various housing and system components of the wireless PDT 2 are shown comprising: a bottom housing structure 5A of elongated geometry having battery pack bay 5C for receiving rechargeable Li-ion battery pack 6A (3.7 Volts) an alkaline battery pack (2×2 AAA) 3.0 Volts; a battery bay cover 5F for snap fitting over the battery pack bay 5C with the battery packs 6A, 6B loaded therein; a first printed circuit (PC) board 26 populated with surface-mounted integrated circuits (ICs) and other electronic components enabling the microcomputing platform and wireless communication link of the system, mounted within the interior portion of the bottom housing structure 5A; a second PC board 27 mounted over and electrically interfaced to first PC board 26, and having the five-position jog (cursor-navigation) switch 20 and other circuitry mounted thereon; color LCD panel 8 supported by a fixture 28 mounted within the proximate portion of the bottom housing structure 5B; ambient light sensor 9 mounted beneath the LCD panel 8 (e.g. beneath the brand logo of the product), with its associated backlight control circuitry supported on the first PC board 26; a rubberized membrane-switching structure 29, supported upon the second PC board 27 so that the five-position job button 20 is aligned with and is disposed under the central rubber button 30 formed in the membrane structure 29, and providing (i) four fixed function buttons 21A, 21B, 21C and 21D arranged around the five-position job (i.e. GUI cursor control button) 20 for selecting the back space, escape, space and function-select functions of the PDT, respectively, (ii) left enter button 23A, scan activate (or data transfer) button 22, and right enter button 23B, (iii) 3×4 array of alphanumeric buttons 12, and (iv) linear array of four user-programmable function buttons/keys 24A, 24B, 24C and 24D, arranged about the ON/OFF power button 25 of the PDT; a top housing structure 5A with apertures for providing user access to the LCD panel and elements of the membrane-switching structure 29, respectively, and designed to snap-fit together with the bottom housing structure 5A, such that the PC board, mounting structure, LCD panel and the rubberized membrane-switching structure are disposed therebetween; a head housing component 5G with an integrated scanning window 31, adapted to snap-fit over and enclose the front end of the assembled housing structure, behind and within which data capture engine (e.g. bar code reading engine) 7.

Figure 6:
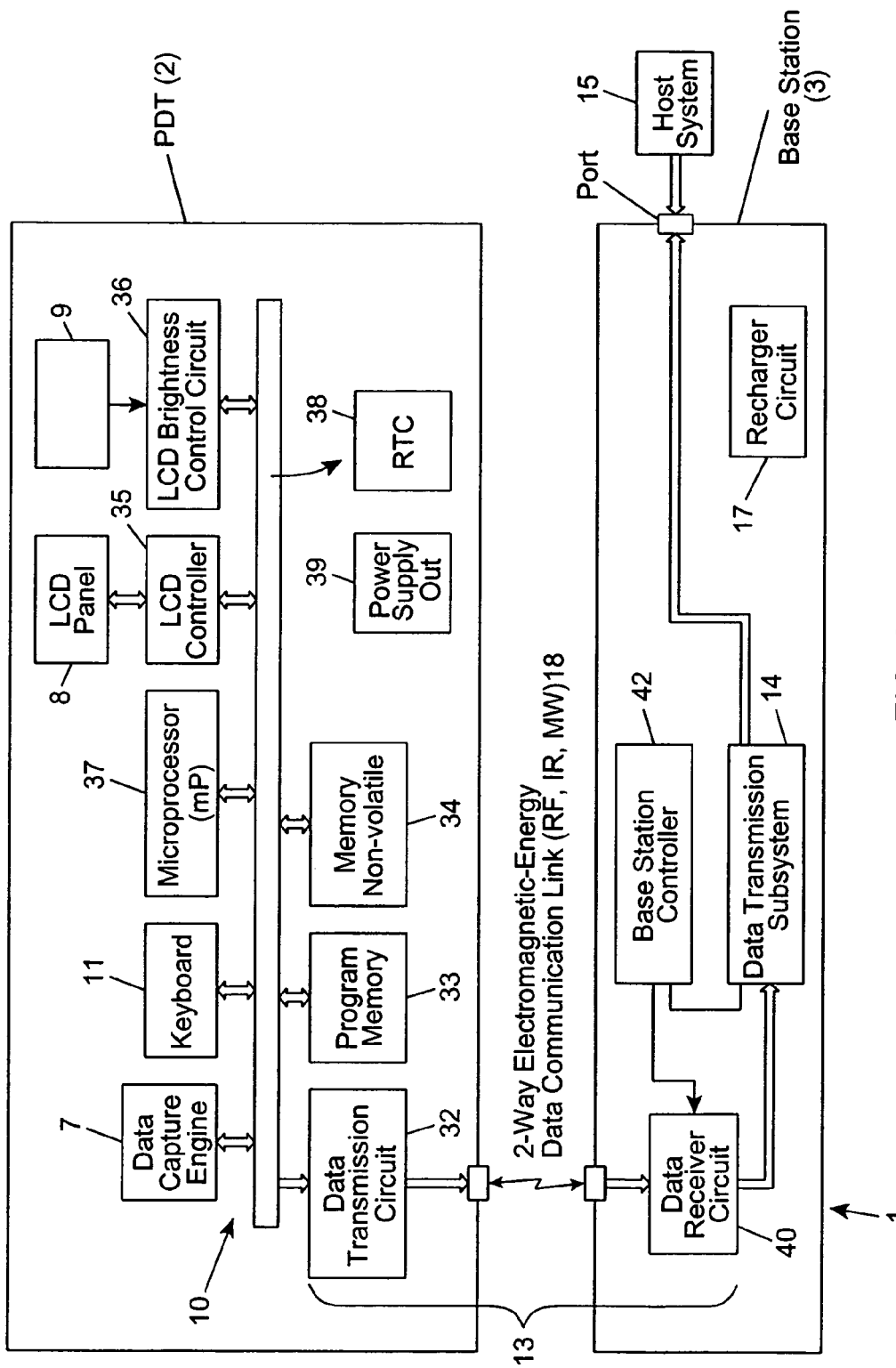
FIG. 6 is a block schematic diagram showing the various subsystem blocks associated with the design models of the wireless hand-supportable portable data terminal of the present invention, and its cradle-supporting base station, interfaced with possible host systems and/or networks.

As shown in the systems diagram of FIG. 6, the wireless hand-supportable portable data terminal 2 comprises a number of subsystems integrated about a system bus, namely: a data transmission circuit 32 for realizing the PDT side of the electromagnetic-based wireless 2-way data communication link 13; program memory (e.g. DRAM) 33; non-volatile memory (e.g. SRAM) 34; data capture engine 7 for optically capturing data encoded within an information structure (e.g. bar code symbol); a manual data entry device such as a membrane-switching type keypad 12; LCD panel 8; an LCD controller 35; LCD backlight brightness control circuit 36; and a system processor 37 integrated with a systems bus (e.g. data, address and control buses); and a real-time clock (RTC) circuit 38. Also, a battery power supply circuit 39 is provided for supplying regulated power supplies to the various subsystems, at particular voltages determined by the technology used to implement the PDT device.

As shown in FIG. 6, the base station 3 also comprises a number of integrated subsystems, namely: a data receiver circuit 40 for realizing the base side of the electromagnetic-based wireless 2-way data communication link 13; a data transmission subsystem 14 including a communication control module; a base station controller 42 (e.g. programmed microcontroller) for controlling the operations of the base station 3. As shown, the data transmission subsystem 14 interfaces with the host system or network by way of the USB or RS232 communication interfaces, well known in the art. Taken together, data transmission and reception circuits 32 and 40 realize the wireless electromagnetic 2-way digital data communication link 13 employed by the wireless PDT of the present invention.

Figure 7A:
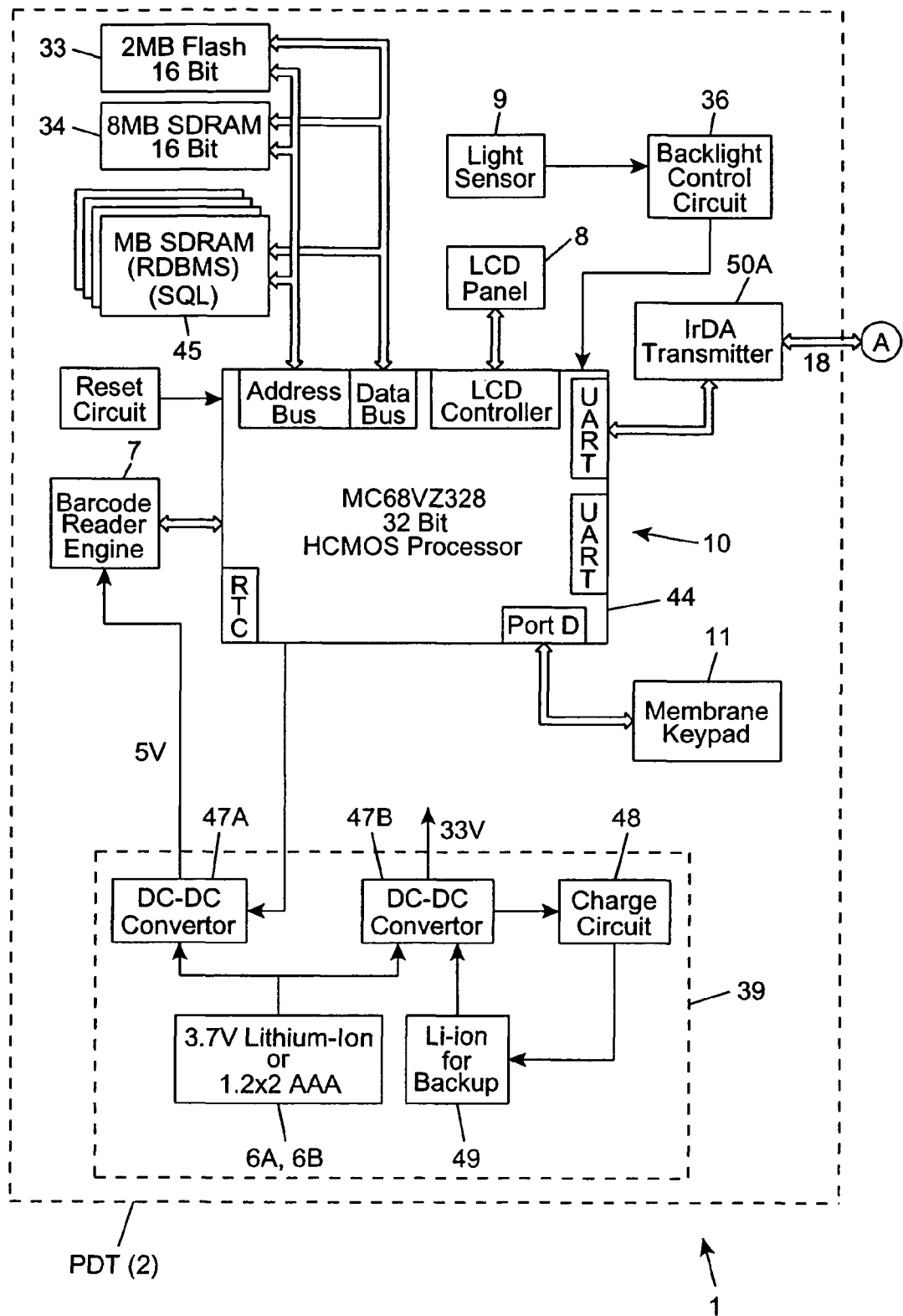
FIGS. 7A and 7B, taken together, set forth a block schematic diagram showing the various subsystem component blocks associated with the implementation models of the wireless hand-supportable portable data terminal of the present invention, and its cradle-supporting base station interfaced with possible host systems and/or networks.
Figure 7B:
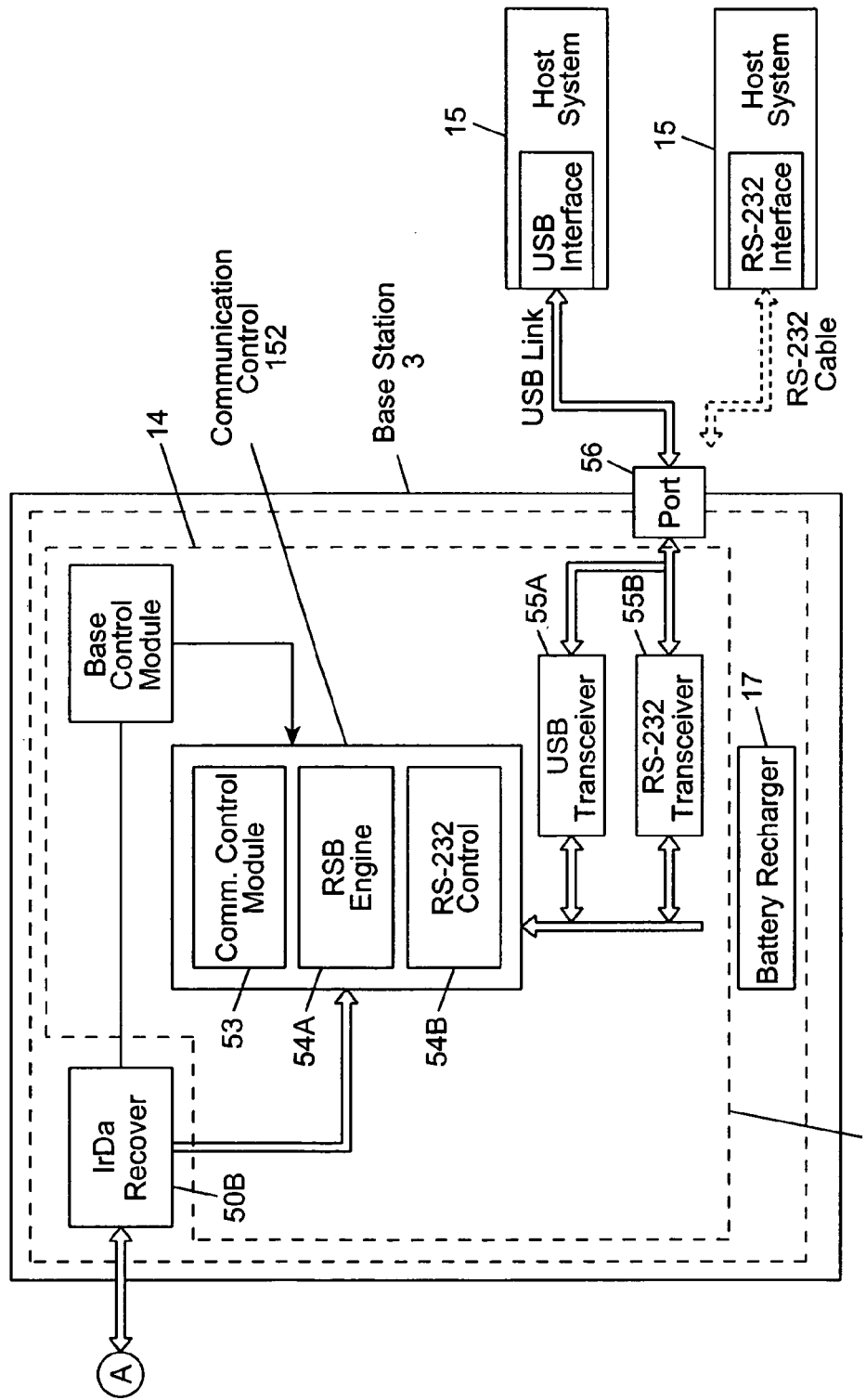

The system architecture shown in FIG. 6 can be implemented using more specific implementation components shown in FIGS. 7A and 7B.

In particular, the system processor 37, the RTC 38, the systems bus (i.e. address bus, data bus and control bus), the LCD controller 35, and the universal asynchronous receiver/transmitter (UART) associated with the data transmission circuit 32 is realized using an integrated portable system processor 44 (e.g. DragonBall™ VZ Integrated Processor MC68VZ328 from Motorola Corporation). Program memory 33 is realized using 8 MB of SDRAM. Non-volatile memory 34 is realized using 2 MB of Flash for system parameter, and 4×16 MB of SRAM 45 for user data storage.

In general, the data capture engine 7 can be realized using any device capable of optically capturing and reading data encoded within an information structure (e.g. bar code symbol) or alphanumeric string. In the various illustrative embodiments disclosed herein, the data capture engine is shown realized as a laser scanning 1D/2D bar code symbol reading engine employed in the illustrative embodiments of FIGS. 11A through 13D, a laser or LED illuminated linear-type (1D) imaging engine employed in the embodiments of FIGS. 14A through 14H, and a laser or LED illuminated area-type (2D) imaging engine employed in the illustrative embodiment shown in FIGS. 15A through 15H.

Figure 8:
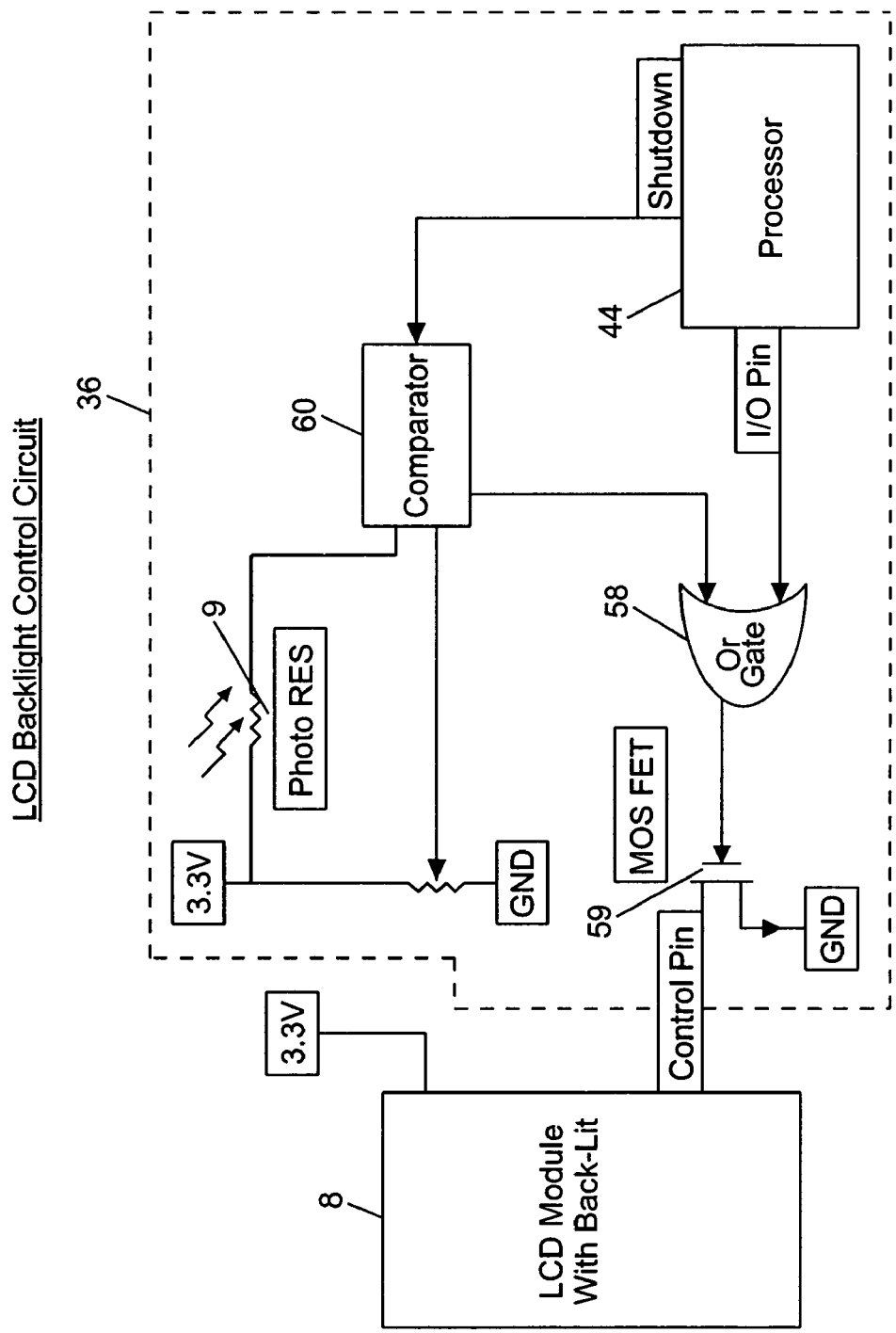
FIG. 8 is a schematic diagram of the LCD backlit illumination control circuit employed in the wireless hand-supportable portable data terminal of the present invention.

As illustrated in FIGS. 1A through 5B, manual data entry device 12 is realized as a membrane-switching type keypad, whereas the visual display panel 8 is realized as a high-resolution color LCD panel LCD backlight brightness control circuit 36 is shown in greater detail in FIG. 8.

The battery power supply circuit 39 is realized using a rechargeable 3.7 lithium-ion (Li-ion) battery or two 1.2 AAA-type rechargeable batteries. These batteries produce an power supply which is provided to two DC-DC power converters 47A and 47B for the purpose of generating (i) a 5.0 Volt power supply for powering the data capture engine (e.g. laser scanning bar code reading engine) 7, and (ii) a 3.3 Volt supply for powering electrical components employed throughout the PDT. As shown, charging circuit 48, powered by the 3.3 Volt supply, is provided within the PDT-for automatically charging a Li-ion backup battery 49 used to power the SRAM 45 and the RTC 38 employed in the processor 44 within the PDT.

As shown in FIGS. 7A and 7B, the data receiver circuit 40 employed in the base station 3 of the illustrative embodiment is realized using an IrDA receiver 50B, to matched to the IrDA transmitter 50A employed in the wireless PDT 2. The data transmission subsystem 14 is realized using a microcontroller 51 programmed to implement a communication controller 52 having a communication control module 53A, USB and RS232 communication control modules 54A and 54B, and a USB transceiver 55A and RS232 transceiver 55B, and a communication port 56. As shown, the data transmission subsystem 14 interfaces with the host system or network by way of the USB or RS232 communication interfaces, well known in the art. Also, battery recharging unit 17 is provided within the cradle of the base station for the purpose of recharging the battery power pack 6A when the PDT is inserted and stored within the cradle of the base station. When inserted within the cradle portion of the base station, the PDT automatically enters a data transmission mode of operation, and transmits any collected user data stored within the database maintained in SRAM 45, to the host system 15 to which the base station 3 is connected by way of either the USB or RS232 serial data communication interface. Details regarding such data communication interfaces is described in greater detail in copending U.S. application Ser. No. 09/960,247 filed Sep. 21, 2001 incorporated herein by reference.

Taken together, data transmission and reception circuits 50A and 50B realize the wireless electromagnetic 2-way digital data communication link 13 employed by the wireless PDT of the present invention. While infrared energy is used to realize the data communication link of the illustrative embodiment, it is understood that RF communication technologies such as Bluetooth™ RF transceiver chip sets can be used alternatively for circuits 50A and 50B, with the added benefit of greater data communication range and 2-way communication while the wireless PDT is being used outside of the cradle portion of the base station.

An additional feature provided within the cradle of the base station 36 is a smart battery charger capable of automatically detecting a rechargeable-type battery (e.g. Li-ion battery) contained within its battery pack bay of the wireless PDT, and will only charge the Li-ion battery, and not an Alkaline battery pack if contained within the battery bay.

Within the cradle there are two charge sockets, namely: one for "main" battery, the other is for "spare" battery. The main battery is given highest recharging priority, while the spare battery is not. When the main battery is detected in the cradle of the base station, the recharging circuit contained therein will automatically charge the main battery firstly, and when it is fully charged or no longer detected in the base station cradle, the recharging circuit therein will automatically switch to recharge the spare battery. When the battery icon flashes on the display screen of the PDT, this indicates that the main battery is recharging. When an LED on the base station cradle is blinking, this indicates that the spare battery recharging. When the spare battery is fully recharged, then the LED will be remain actively illuminated, otherwise the LED will be shut off.

In FIG. 8, the LCD backlit illumination control circuit 36 is shown realized by a circuit comprising: light sensor 9 (realized as a photo-resistor) for detecting the brightness level of ambient environment; an OR gate 58 having an output which drives the input of a MOSFET 59 connected to the brightness control pin of the LCD panel 8. The inputs to the OR gate 58 are provided by (i) the processor 44, and the output of a comparator 60. This circuit is designed to detect the brightness of the ambient environment in which the PDT operates, and in response thereto, automatically activate the LCD backlight when the light level in the environment is determined to be sufficient dark to require backlighting. Also the circuit can disabled by the system controller so that the backlight can be activated manually. As shown in FIG. 8, the photo-resistor 9 is biased so that its resistance value will change in response to detected lighting levels. The photo-resistor 9 is configured so that darker detected lighting levels will generate higher voltages across the photo-resistor. This causes a change in voltage at one of the inputs to comparator 60. The second input to the comparator is set to a threshold voltage controlled by the microcontroller (i.e. microprocessor) 44 within the PDT. When the voltage produced by the photo-resistor is below the threshold voltage, then the comparator 60 will generate a high voltage level, as output, and this will cause open MOSFET 59, whose collector is connected to the brightness control pin of the LCD panel 8, to activate the backlighting structure of the LCD panel. When the voltage produced by the photo-resistor is above the threshold voltage, then the comparator 60 will generate a low voltage level, as output, and this will cause close MOSFET 59, to deactivate the backlighting structure of the LCD panel 8. As shown, one of the I/O pins of the processor 44, supplied to the input of OR gate while the other input thereto is provided as the output from the comparator 60, can be used to deactivate this backlighting control function, and enable manual or processor control of the LCD backlight if desired or required by the application at hand. While this simple circuit suffices to control the brightness level of the LCD panel in response to the sensed ambient lighting levels, it is understood that other circuits can be used to carry out this functionality.

Integrated Development Environment (IDE) of the Present Invention for Developing and Deploying Applications on the Wireless PDT In general, the IDE of the present invention comprises a development environment which is characterized by: (i) the various tools provided on the developer's host computer illustrated in FIG. 9B; and (ii) the various tools provided on the wireless PDT illustrated in FIG. 9A. The graphical user interface (GUI) for the IDE is provided by the AppGen program shown in FIG. 9B.

A primary object of the AppnGen program is to provide a powerful set of easy-to-use application development tools for developing applications that can be run on the wireless PDT hereof, which employs a virtual machine (MVM) so that developed applications can be run on operating systems (OS) other than the operating system upon which the development environment operates. Thus, using the IDE of the present invention, end-user applications can be developed on developer computers (PCs) running Microsoft's Windows 2000 OS, while such applications can be deployed on run-time environments supported by operating systems such as uClinux, having ultra-low or no user license fees.

A notable feature of the IDE of the present invention is that it enables "drag-and-drop" type visually-oriented programming within a "what you see is what you get (WYSIWYG) development environment. Also, tools are provided for simply creating SQL relational database management systems (RDBMS) that are supported either within memory structures aboard the PDT, or alternatively aboard Web-enabled database servers connected to an IP-based network, to which the base station of the present invention is interfaced directly or by way of a host computer system. Development tools illustrated in FIGS. 9A through 10C8, support "even-driven" programming, wherein the developer simply defines what actions are to occur in response to specified events.

Figure 9A:
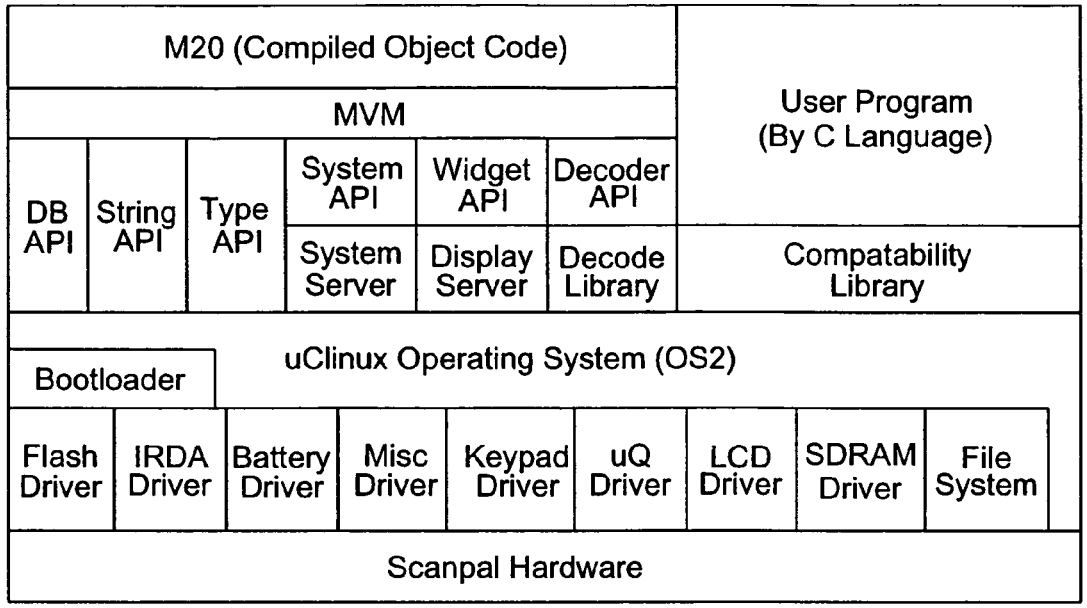
FIG. 9A is a block schematic diagram of the various layers of software modules supported at run-time on the hardware computing platform of the wireless hand-supportable portable data terminal of the present invention, illustrating that the compiled object code associated with any run-time application is run upon a virtual machine (i.e. virtual operating system) that is, in turn, run upon another different hardware-supported operating system.

FIG. 9A illustrates the various layers of software supported at run-time on the micro-computing platform 10 of the wireless PDT 2. As shown, the compiled object code associated with any run-time application is run upon a Virtual Machine (MVM) which, functioning as a virtual operating system (OS1) is, in turn, run upon another different hardware-supported operating system (e.g. uClinux OS), indicated by OS2. As shown, the microcomputing platform (i.e. hardware) of the PDT supports various software layers namely: flash driver; IrDA driver; battery driver; misc. driver; keypad driver; data capture engine (uQ) driver; LCD driver; SCRAM driver; file driver; bootloader; uClinux operating system (OS2); DB API; String API; Type API; System Server; Display Server; Decode Library; Compatibility Library; System API; Widget API; Decoder API; User Program (by C language); Virtual Machine (MVM); and M2O (compiled object code).

Figure 9B:
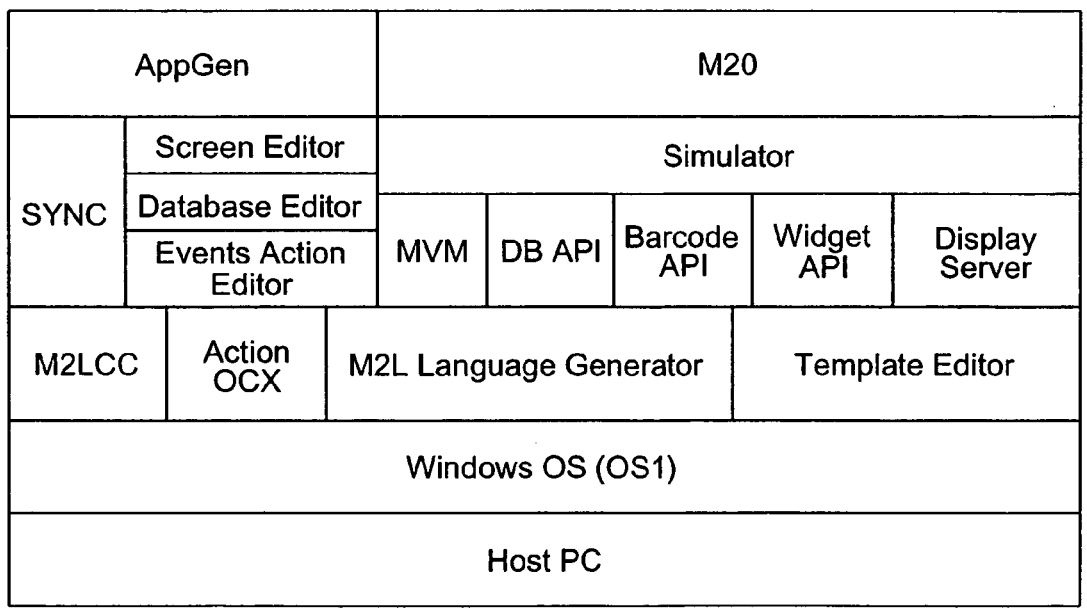
FIG. 9B is a block schematic diagram of the various layers of software modules supported on a host computing system during the development of an application to be ported to and run upon the virtual machine of the wireless hand-supportable portable data terminal of the present invention.

FIG. 9B illustrates the various layers of software modules that are supported on the hardware of the host computing platform during the development of an application to be ported to MVM of the wireless PDT 2. As shown, the host computing platform of the developer's computer supports various software layers, namely: Windows OS (OS1); M2LCC; Action OCX; M2L language generator; template editor; SYNC; Screen Editor; MVM; DB API; Barcode API; Widget API; Display Server; Simulator; ApplnGen; and M2O.

Notably, some of these software modules are common to both the development and deployment (i.e. run-time) environments. These software modules will be specified below.
Software Modules Employed on the PDT's Computing Platform The MVM module runs on uClinux/DragonBall platform, and has an interface with the display server module, and the system server module. The System server module administrates the system, manages beep/LED/backlight, and monitor battery volume. The Display server module executes draw LCD directives from the MVM module or the USER program, and submits key code and barcode to the MVM or the USER program.

The uClinux OS is a derivative of Linus 2.x kernel intended for microcontrollers without Memory Management Units (MMUs). In the illustrative embodiment, it has been ported to Dragonball VS.

The Bootloader module initializes the whole system including hardware and software, and loading the kernel into program memory and generating a user defined welcome message for display on the LCD panel upon start-up of the system.

The Flash Driver provide standard interface to kernel's upper layer to read/write contents on flash memory The IRDA Driver provides an IRDA RFCOMM interface to the system.

The Battery Driver accesses the real-time voltage data relating to the onboard battery pack.

The Misc. Drivers control the activation (i.e. on/off) of the LED, the audible BEEP, the LCD backlight, and system sleep mode.

The Keypad Driver accesses key code data generated by the keypad.

The data capture engine (i.e. uQ) driver accesses raw symbol character data generated by the data capture engine.

The LCD driver displays the contents to be drawn on the LCD panel and controls the operation of the LCD panel itself.

The SRAM driver provides a standard interface for the user to read/write application-related content into the SCRAM provide aboard the PDT.

The File system comprises a number of software submodule, namely: ROM file system (ROMfx); RAM file system (RAMfs); and Journaling Flash File System (JEFS). The ROMfx submodule stores the root file system (read only). The RAMfs submodule stores temp user files. The JFFS submodule stores user files/data.

The Database API performs general database operations. Specifically, this API supports the following SQL commands: CREATE DATABASE; OPEN DATABASE; DROP DATABASE; CREATE TABLE; OPEN TABLE; DROP TABLE; INSERT RECORDS INTO TABLE; UPDATE TABLE RECORDS; DELETE TABLE RECORDS; SELECT RECORDS FROM TABLE INTO A RECORDSET; and TRAVERSE RECORDSET. The input to this API are SQL commands, and the output therefrom is data and the status of executed commands. All the table data is stored in a relational database management system (RDBMS) implemented in (i) SRAM (or like) persistent memory aboard the PDT when the PDT is configured for use in a "batch" wireless PDT mode, or in alternative applications, in (ii) persistent memory located on an Web-enabled RDBMS server or the like operably connected to the infrastructure of the Internet or other IP-based information network when the PDT is configured for operation in a "real-time" Web-enabled wireless PDT mode. If the DRAM loses power, then the Database API will restore the database system.

The TYPE API performs general variable type operations. Specifically, this API supports the following data variable types: INTEGER; BOOLEAN; REAL; PRICE; STRING; DATETIME; DATE; and TIME. This API supports the following functions: Declare a variable as a type; Assign a constant value to a variable; Assign a variable's value to another variable; Perform add, subtract, multiple, divide mathematics operation; Turn a variable into string to display; and Support date time mathematics operation. The input to this API are variable type operation commands, and the output therefrom is a variable value.

The String API performs general string operations. Specifically. This API supports the following functions: Assign value; catenate string; Format a string; Display a string; Split a string into pieces; Extract a substring; and Calculate the string length. The input to this API are string operation commands, and the output therefrom is a string.

The System API provides the following system information elements: battery status; get and set system date and time; get Battery status; get memory status; get and set backlight status; get and set transmit port; and get and set transmit speed. The input to this API are system operation commands, and the output therefrom is operation executed status.

The Widget API provides support for generating display screens for the user application.

The Decoder API provides algorithmic support for decoding scanned bar code symbols.

The Systems Server provides support for interfacing the processor with peripheral elements such as batteries, the RTC, etc.

The Display Server provides support for abstracting display functions across the platform.

The Decode Library provides resources (i.e. classes) for decoding bar code symbols scanned by the data capture engine (i.e. bar code reader).

The Compatibility Library provides an interface for programming with backward compatibility. Developers may have written application programs using an old library, and they do not want to rewrite the program. The compatibility library includes: system library; reader machine library; keyboard wedge library; buzzer library; calendar library; and file process library. The input to this interface is the user program's function call, and the output therefrom is the status of the executed function (i.e. function executed status).

Software Modules on the Developer's Computing Platform

The software modules unique to the developer's computer system, preferably the Windows OS, will be described below.

The function of the AppGen program module (i.e. Application Generator) is to create a graphical user interface and tools for use by developers to design, build and test end-user applications adapted to run on deployed PDTs of the present invention. Details regarding the GUI and functionalities supported by the AppGen program module shown in FIG. 9 are described in the method of use flow charts set for in FIGS. 10B1 through 10C8.

The Screen Editor module shown in FIG. 9B is used to create objects found in the Presentation layer of an application under development. The Screen Editor provides a WYSIWYG graphical user interface that allows user to design the display screen with pre-designed components. The Screen Editor module is used by the developer for creating both the "Main Screen" and the "Overlay Area" of the user's display screen. This tool can be used to Create, modify, delete, and drag-and-drop screen objects (e.g. Label, Menu and Input Area) on the enlarged placement pad of the design view. This tool supports: the creation of multiple user screens; and the creation and modification of user-defined variables. This tool also provides a real-size preview pad for presenting an updated view of the current screen to be laid out on the LCD panel. It also includes a font and monochrome bitmap generator.

The Database Editor module shown in FIG. 9B is used to create objects found in the Database layer of the application under development. The Database Editor allows the developer to create new databases and define the structure for each database. The function of the Database Editor module is to create new database and also delete some databases. This tool is used to create a database, create tables for the database, and define the field names and field types, as well as other properties, therefor. Developers can modify their database structure or table structure using this editor when they want to effect some changes in their databases. Commands associated with this tool include: create database, delete database, create table, delete table, create field, delete field, rename field name, change field data type and so on.

The Event Actions Editor module shown in FIG. 9B is used to create objects found in the Control layer of the application which bind together objects in the Presentation Layer and objects in the Database Layer by defining program actions to respond to predefined events when user input occurs to the graphic components on the screen.

On the developer's computing platform, the Screen Editor module needs to communicate with virtual machine. The Simulator module uses a windows socket to communicate between Screen Editor and the Virtual Machine (MVM). When the developer uses the Screen Editor to edit the screen, the Simulator sends the commands to virtual machine (MVM), then virtual machine draws the bitmap and returns the handler to the Simulator, and then Simulator displays the bitmap to developer/user. What the user sees in the Simulator is the same as he will see in LDC. The Simulator also processes the user's keypad event. When user uses the Simulator's keypad, the Simulator responds to the key event and displays the corresponding display screen. The input to the Screen Editor module are the screen editor's commands, and the output therefrom is a DIB handler.

The Action OCX module produces actions only for the following three cases: when entering a screen; leaving a screen; and when using an input area. With the Actions OCX module, application developers can add specific actions for the three cases identified above. This module supports the following action types: Condition Type; Database Type; Display Type; Loop Type; and System Type. Developers should choose an action type first and then choose an action from the group they have chosen. A form for the action definition will be loaded and displayed, and users can define their action in the displayed form. Thereafter, the form will disappear and a description sentence of the action will be displayed in a grid cell. When developer wants to modify his or her action which has been defined, he or she simply needs to double click on the grid cell of the action description. The definition form will reload, and thereafter, the action can be modified as desired.

The Widget APIs provide interfaces for creating and manipulating screens and screen objects defined by the App-Gen, running on the developer's computer system.

The function of the M2L language Auto-Generator is to convert the output of the AppGen program module into test M2L code language (i.e. executable object code) for execution on the deployed PDT.

The function of the Template Editor is to generate pre-defined templates for rapid application development.

The function of the Barcode API is to read symbol character data produced as output from the bar code reading data capture engine of the illustrative embodiments.

The function of SYNC module is to support the downloading and uploading of data between the developer's host PC the deployed PDT.

The function of the M2LCC compiler module is to convert application source code to application object code for execution on the MVM within the PDT.

The function of the Display Server module is to handle the simulated LCD panel during application development, and handle the actual LCD panel on the deployed PDT.

The M2O is generated object code compiled to run on the MVM (i.e. virtual machine of the present invention).

The function of the DB API is to define and support the database operations within the PDT.

FIGS. 10A1 and 10A2, taken together, set forth a flow chart illustrating the flow and interaction between the application and development programs running on the wireless portable data terminal and the application developer's computer system, respectively, and the user input and documents generated during this process. Collectively, these development and deployment environments comprise an integrated development environment (IDE) capable of generating sophisticated applications. The blocks on the left side of FIG. 10 illustrate events that occur during application development on the developer's computer system including the generation of the final application in the form of binary executable code (i.e. m20) and the downloading of the same onto the wireless portable data terminal. The blocks on the right side of FIG. 10 illustrates how the final application runs, when downloaded in binary executable code (i.e. m20) onto the wireless portable data terminal.

The flow chart shown in FIGS. 10B1 and 10B2 describes the primary software component modules used by the App-Gen program on the developer computer system, and what application development functions are carried out by such modules on the IDE of the present invention.

In FIGS. 101 through 10C7, a high-level tutorial is presented showing how to use the AppGen (i.e. Application Generation) program of the present invention, so as to simply and rapidly design and implement wireless PDT-supported information systems (i.e. PDT-supported applications). Notably, each such PDT-supported application (i.e. system) comprises: (i) a Presentation Layer characterized by rich graphical user interface (GUI) screens constructed using a visual WYSIWYG Screen Editor, and displayed on the PDT's color LCD panel; (ii) a Data Layer characterized by SQL databases supported within the PDT(s), or within Web-enabled RDBMS servers connected to IP-based information networks such as the Internet; and (iii) a Control Layer characterized by easily implemented business logic using event-driven programming techniques.

As indicated above, the Presentation Layer of an application under development is created using the Screen Editor module shown in FIG. 9B, which provide a WYSIWYG graphical user interface that allows user to design the display screen with pre-designed components. The Database Layer of the application is created using the Database Editor module shown in FIG. 9B, which allows the developer to create new databases and define the structure for each database. The Control Layer of the application is created using the Event Actions Editor module shown in FIG. 9B, which allows the developer to define program actions to respond to predefined events when user input occurs to the graphic components on the screen.

In FIG. 10C1, there is shown an image of the startup screen. Notably, the left tab thereof shows that the files associated with a "system" (i.e. application) to be created under a "Project" heading will be organized according to Presentation, Database and Control Layers, as described above. The developer will first design the graphical presentation and then define the database structures. Then in order to bind together (i) database (entity) objects within the Database Layer to (ii) interface (GUI) objects within the Presentation Layer, the developer creates control objects (found within the Control Layer by defining the program actions to occur in response to events that may occur as a result of an end-user interacting with the interface objects presented on the display screen of a deployed wireless PDT of the present invention.

As shown in FIG. 10C2, using the Screen Editor module the developer can add pre-defined graphical components onto the GUI of the Screen Editor program simply via drag and drop operations. The popup window shown in FIG. 10C2 is used to modify the attributes of each graphical component (object) being used to build a display screen. The main graphical components used to build GUI screens for the PDT are Label (both text and bitmap), Input Area and Menu.

Figure 3:
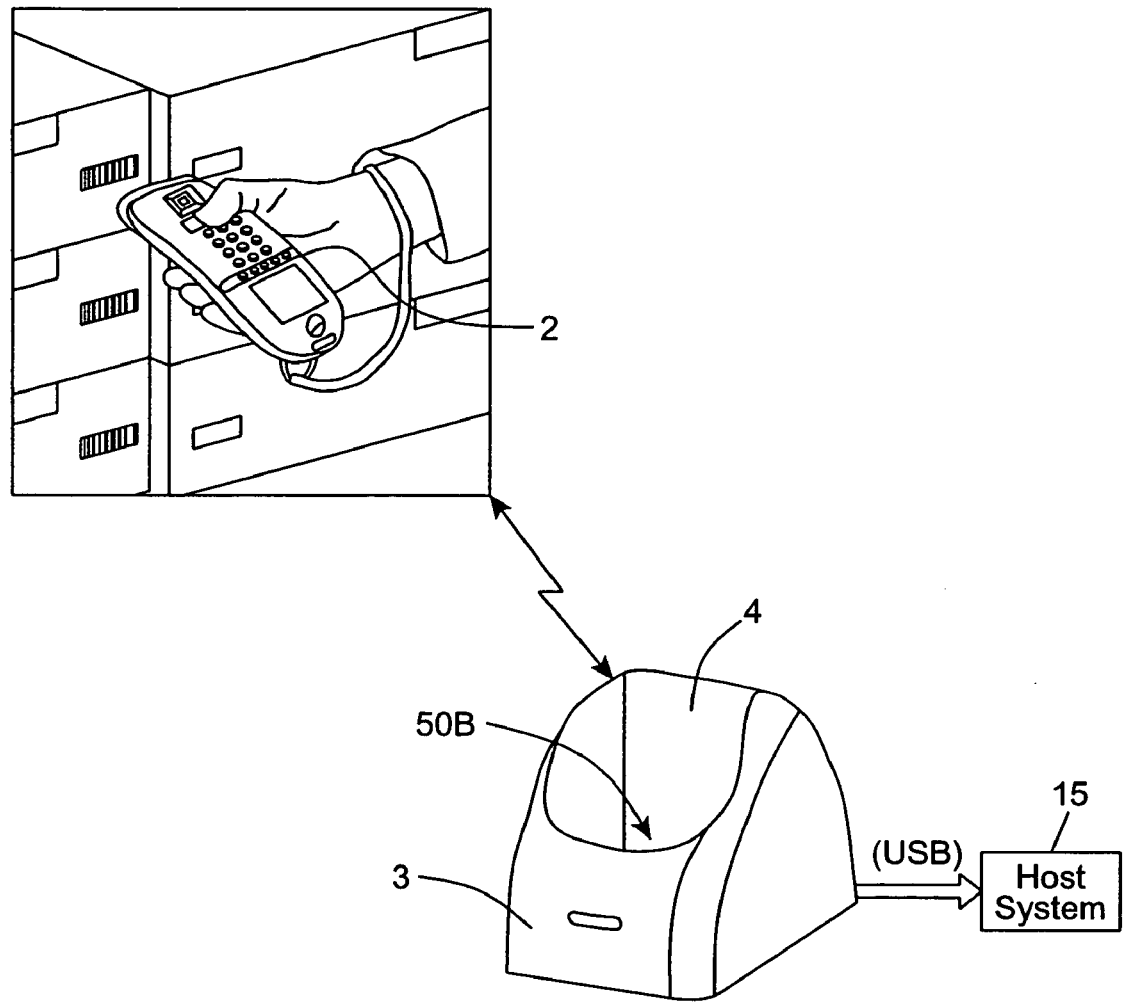
FIG. 3 is a perspective view of the wireless bar code driven portable data terminal (PDT) of the present invention, shown being used in a single-handed mode of operation, while located remote from its RF-linked cradle-providing base station, connected to a host computer system and/or network.

As shown in FIG. 10C3, using the Database Editor module, the developer can define the structure of the database to be created for use in the application.

As shown in FIG. 10C4, using the Events Action Editor module, the developer can bind together (i) database (entity) objects within the Database Layer to (ii) interface (GUI) objects within the Presentation Layer of the application (i.e. system) under development. Such control objects are created within the Control Layer by defining the program actions to occur in response to events that may occur as a result of an end-user interacting with the interface objects presented on the display screen of a deployed wireless PDT of the present invention. When using the Events Action Editor, predefined actions are uniquely associated with graphical components, and by simply dragging and dropping graphical components, the required binding operations can be created to bind objects together between the Presentation and Database Layers of the application under development. For example, when a barcode is scanned, one can create an action to insert it into the database, as shown in FIG. 10C5. When an input area receives an ENTER key event (as illustrated in FIGS. 10C6 and 10C7), an action may be created to respond to that event. Also, for each event, multiple lines of action may be added, as well as loops and conditions, thereby making the Action Editor module a comprehensive graphical (visually-controlled) programming tool within the IDE of the present invention.

The application program under development will be complete once the GUI screens have been created and laid out, the databases created and defined, and all the actions have been defined for the events associated with the graphical components and user input. Thereafter, the complete application program can be compiled into a *.m20 file (i.e. object code) and run on the virtual machine (MVM) of either the Simulator module as shown in FIG. 10C8, or on a deployed wireless PDT as illustrated in FIGS. 1A through 8.

Summary of Features Embodied within the Wireless PDT of the Illustrative Embodiment of the Present Invention As described above, the wireless PDT of the present invention has the form factor of a small wireless portable unit designed for true single-handed operation. In the illustrative embodiment, the wireless PDT is powered by either 2AA batteries or by a Lithium-ion rechargeable battery, and is equipped with an integrated color LCD display panel, an alpha-numerical keypad with joggle (i.e. cursor navigation) and function keys, and an data capture engine capable of reading 1D and 2D bar code symbols, as well alphanumerical characters and other forms of graphical intelligence appearing in business enterprises. The PDT may be programmed from a PC, providing user-customizable scan and database functions. Host communication can be supported through any type of electromagnetic energy based 2-way data communication interface. Preferably, the PDT employs an embedded OS such as uClinux. A virtual machine (MVM) operates on top of the OS's (uClinux and Windows) to provide cross-platform development capabilities. An Application generator (AppGen) runs on Windows to provide screening editing to the customer. VM object code is generated by the AppGen to run either on uClinux or Windows. An additional server, accepting command packets from the MVM, actually handles the platform-depend aspects such as display, scanner interface, and database management. The base station 3 provides the following functionality: charging the battery in the terminal; charging an additional battery at the same time; passing data from the terminal's IRDA port to the host. It provides multiple interfaces to the host—RS232, USB, Keyboard Wedge, etc. The interface selection is intelligently controlled by a programmed microprocessor.

Figure 11A:
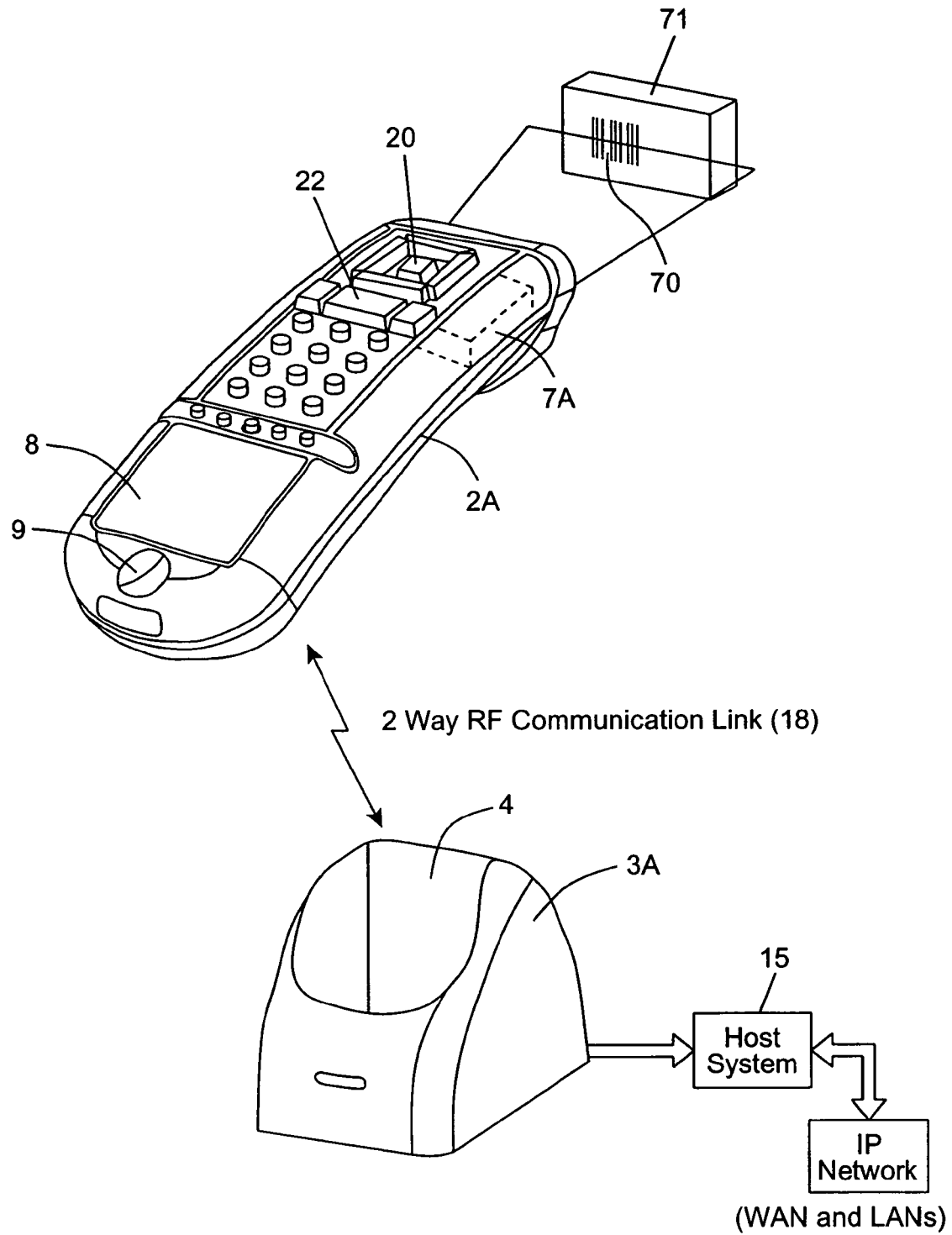
FIG. 11A is a perspective view of a first illustrative embodiment of the wireless bar code driven portable data terminal system of the present invention, wherein its manually-triggered bar code reading engine is activated to read a bar code symbol on a package and the symbol character data representative of the read bar code is automatically transmitted to its cradle-providing base station by way of an RF-enabled 2-way data communication link.

First Illustrative Embodiment of the Wireless Bar Code Driven Portable Data Terminal System of the Present Invention FIGS. 11A through 11D show a first illustrative embodiment of the wireless bar code driven portable data terminal system of the present invention 2A. As shown in FIG. 11A, the manually-triggered bar code reading engine 7A within the PDT is manually activated to read a bar code symbol 70 on a package 71 and the symbol character data representative of the read bar code is automatically transmitted to its cradle-providing base station 3A by way of an RF-enabled 2-way data communication link 18, when the operator uses his or her thumb to depress the bar code read activation switch 20 provided on its user control console.

Figure 11B:
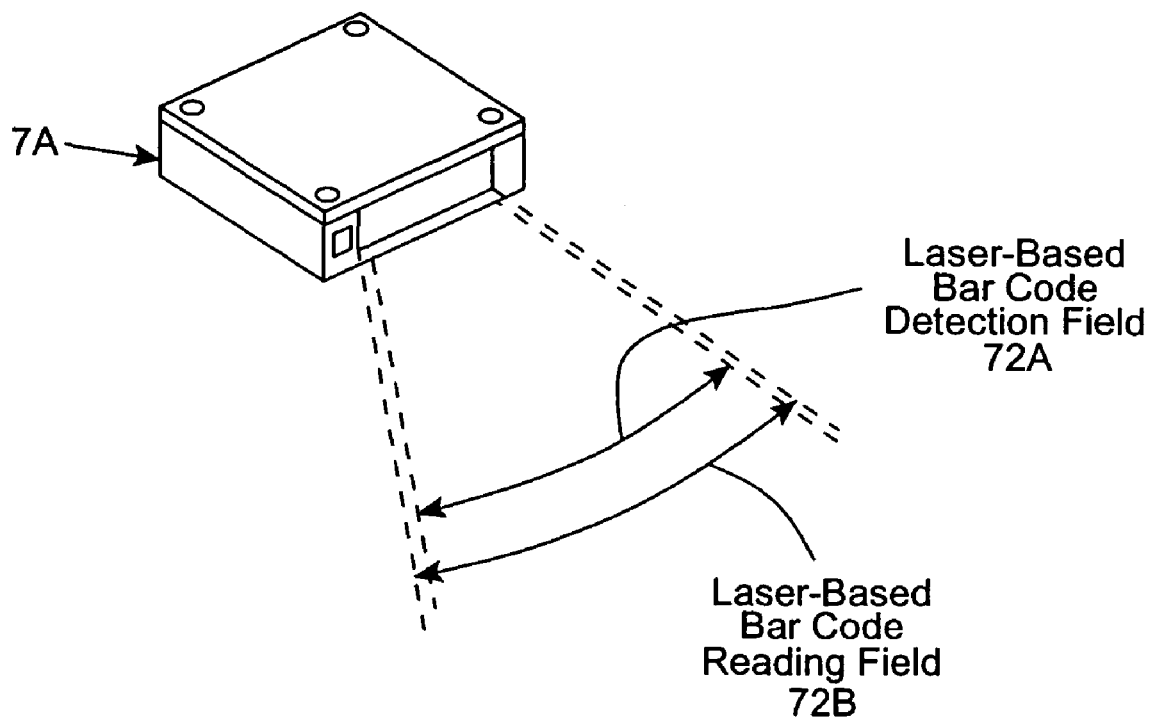
FIG. 11B is a perspective view of the 1-D and 2-D laser scanning bar code reading engine embodied within the engine bay of the wireless bar code driven portable data terminal system depicted in FIG. 11A, illustrating the overlapping spatial relationship of its laser-based bar code detection field and laser-based bar code reading field.

FIG. 11B shows the 1-D and 2-D laser scanning bar code reading engine 7A embodied within the engine bay of the wireless bar code driven portable data terminal system 2A depicted in FIG. 11A. This figure also illustrates the overlapping spatial relationship of its laser-based bar code detection field 72A and laser-based bar code reading field 72B. FIGS. 11C1 through 11C4 illustrate the subcomponents used to construct this engine. Details regarding this engine design are set forth in WIPO Publication No. WO 00/33239 incorporated herein by reference.

Figure 11D:
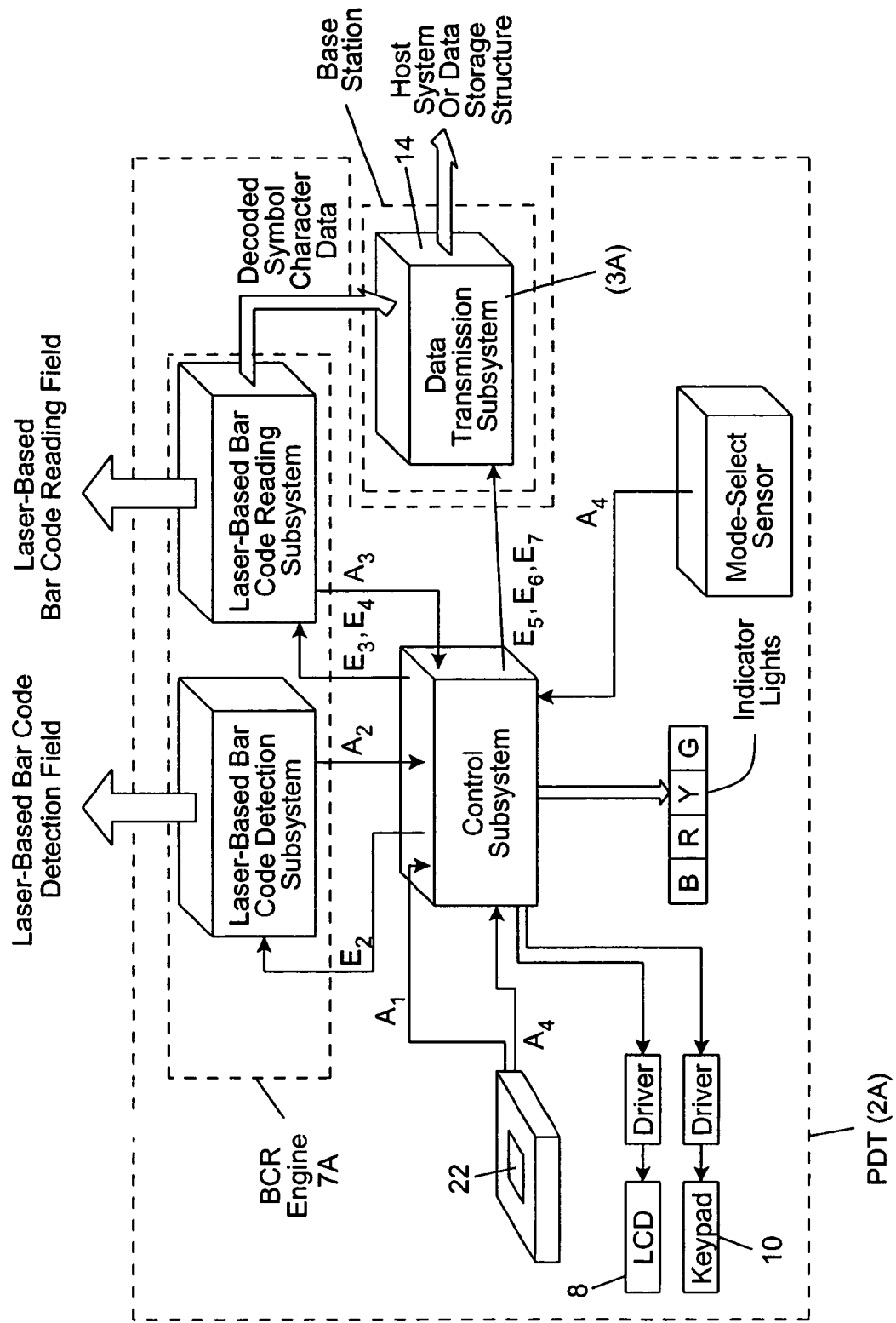
FIG. 11D is a schematic block system diagram showing the various subsystem blocks comprising the manually-activated laser scanning bar code reading engine employed in the wireless portable data terminal shown in FIG. 11A.

The manually-triggered wireless PDT 2A shown in FIGS. 11A through 11C can be modeled using a number of functional subsystem blocks arranged in accordance with the system diagram shown in FIG. 11D. As shown, the PDT 2A comprises: a hand-supportable housing 5; a laser scanning bar code reading engine 7A, having a laser-based bar code detection subsystem and laser-based bar code reading subsystem, capable of projecting a laser illumination beam 75 through its scanning window 31 in coplanar relationship with its field of view (FOV) 76; user control console 10; a high-resolution color LCD display panel 8 mounted below the user control console and integrated with the hand-supportable housing, for displaying, in a real-time manner, captured images, data being entered into the system, and graphical user interfaces (GUIs) generated by the end-user application running on the virtual machine of the wireless PDT; and a computer control subsystem contained within the PDT housing, for carrying out system control operations according to the requirements of the end-user application to be implemented upon the hardware and software platforms of the wireless PDT of this illustrative embodiment. Details regarding the operation of the bar code reading engine design employed in this illustrative embodiment are set forth in WIPO Publication No. WO 00/33239 incorporated herein by reference.

As shown in FIG. 11D, the base station 3A associated with PDT 2A comprises a data transmission subsystem 14 and other subsystem components not shown but described in detail hereinabove with respect to FIGS. 6 and 7, (e.g. relating to battery recharging, and data communication interfacing with a host system operably connected to digital communication network, such as a LAN or WAN supporting a networking protocol such as TCP/IP, AppleTalk or the like).

The subsystems associated with the wireless PDT and its base station can be implemented in a straightforward manner using the hardware and software implementation platforms illustrated in FIGS. 6 through 9A.

Figure 11E:
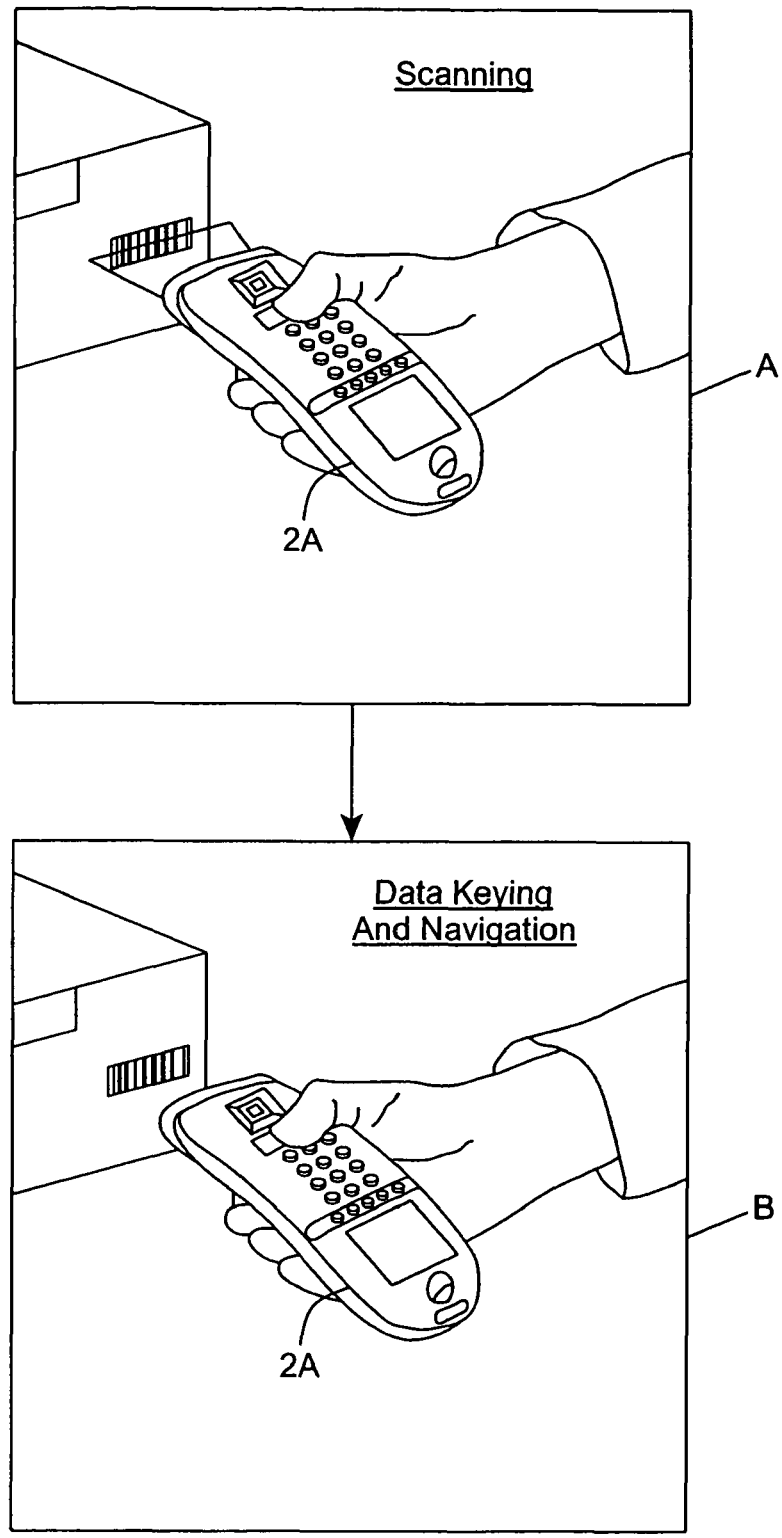
FIG. 11E is a schematic representation illustrating the improved single-handed operation of the wireless portable data terminal of the first illustrative embodiment of the present invention.

In FIG. 11E, the wireless portable data terminal of the first illustrative embodiment is shown used in a truly single-handed manner in accordance with the principles of the present invention.

Figure 12A:
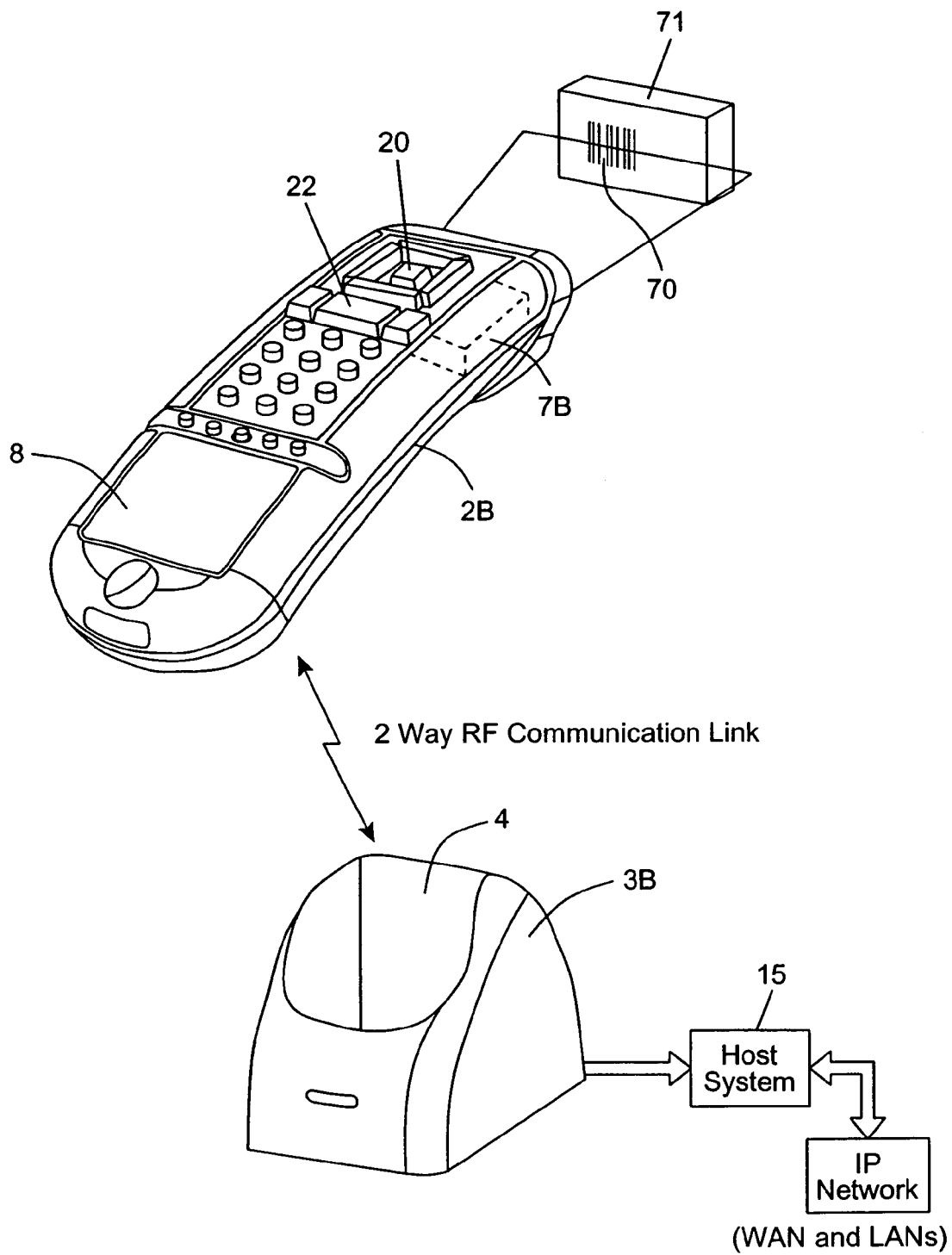
FIG. 12A is a perspective view of a second illustrative embodiment of the wireless bar code driven portable data terminal system of the present invention, wherein its automatically-triggered (i.e. activated) bar code reading engine is used to read a bar code symbol on a package and the symbol character data representative of the read bar code is automatically transmitted to its cradle-providing base station by way of an RF-enabled 2-way data communication link.
Figure 12B:
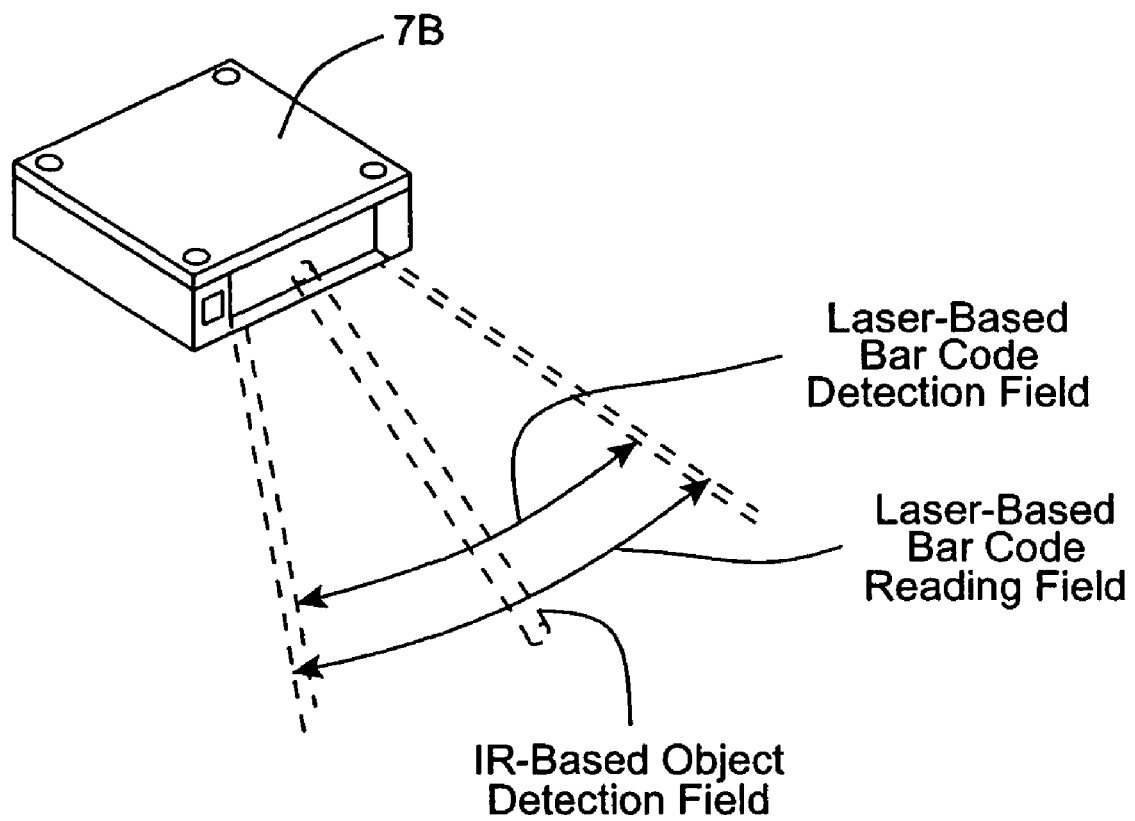
FIG. 12B is a perspective view of the 1-D and 2-D laser scanning bar code reading engine embodied within the engine bay of the wireless bar code driven portable data terminal system depicted in FIG. 12A, illustrating the overlapping spatial relationship of its IR-based object detection field, laser-based bar code detection field and laser-based bar code reading field.
Figure 12C:
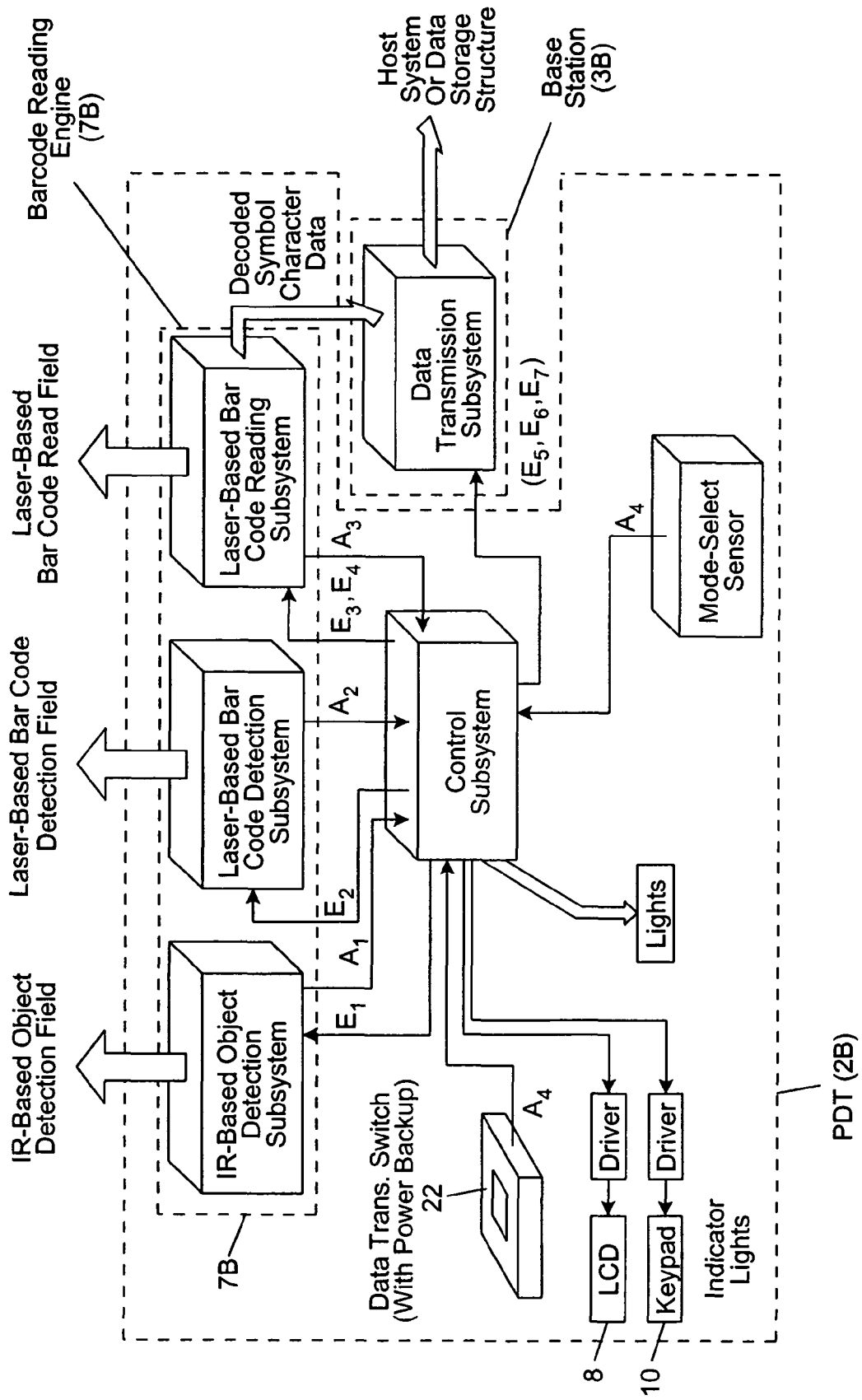
FIG. 12C is a schematic block system diagram showing the various subsystem blocks comprising the automatically-activated laser scanning bar code reading engine employed in the wireless portable data terminal shown in FIG. 12A.

Second Illustrative Embodiment of the Wireless Bar Code Driven Portable Data Terminal system of the Present Invention FIGS. 12A through 12C show a second illustrative embodiment of the wireless bar code driven portable data terminal system of the present invention 2B. As illustrated in FIG. 12A, the automatically-triggered (i.e. activated) bar code reading engine 7B within the PDT is automatically activated to read a bar code symbol 70 on a package 71 and the symbol character data representative of the read bar code is automatically transmitted to its cradle-providing base station 3B by way of an RF-enabled 2-way data communication link 18, when the operator uses his or her thumb to depress the data transmission activation switch 22 provided on the user control console.

FIG. 12B shows the 1-D and 2-D laser scanning bar code reading engine 7B embodied within the engine bay of the wireless bar code driven portable data terminal system 2B depicted in FIG. 12A. This figure also illustrates the overlapping spatial relationship of its IR-based object detection field, laser-based bar code detection field and laser-based bar code reading field. Details regarding this engine design are set forth in WIPO Publication No. WO 00/33239 incorporated herein by reference.

The automatically-triggered wireless PDT 2B shown in FIGS. 12A through 12B can be modeled using a number of functional subsystem blocks arranged in accordance with the system diagram shown in FIG. 12C. As shown, the PDT 2B comprises: a hand-supportable housing 5; a laser scanning bar code reading engine 7B, having an IR-based object detection subsystem, laser-based bar code detection subsystem and laser-based bar code reading subsystem, capable of projecting an IR beam and a laser illumination beam through its scanning window 31 in a substantially coplanar relationship with its field of view (FOV); a user control console 10; a high-resolution color LCD display panel 8 and drivers mounted below the user control console 10 and integrated with the hand-supportable housing, for displaying, in a real-time manner, captured images, data being entered into the system, and graphical user interfaces (GUIs) generated by the end-user application running on the virtual machine of the wireless PDT; and computer subsystem contained within the PDT housing, for carrying out system control operations according to the requirements of the end-user application to be implemented upon the hardware and software platforms of the wireless PDT 2B of this illustrative embodiment. Details regarding the operation of the bar code reading engine design employed in this illustrative embodiment are set forth in WIPO Publication No. WO 00/33239 incorporated herein by reference.

As shown in FIG. 12C, the base station 3B associated with PDT 2B comprises a data transmission subsystem 14 and other subsystem components not shown but described in detail hereinabove with respect to FIGS. 6 and 7, (e.g. relating to battery recharging, and data communication interfacing with a host system operably connected to digital communication network, such as a LAN or WAN supporting a networking protocol such as TCP/IP, AppleTalk or the like).

The subsystems associated with the wireless PDT and its base station can be implemented in a straightforward manner using the hardware and software implementation platforms illustrated in FIGS. 6 through 9A.

Figure 12D:
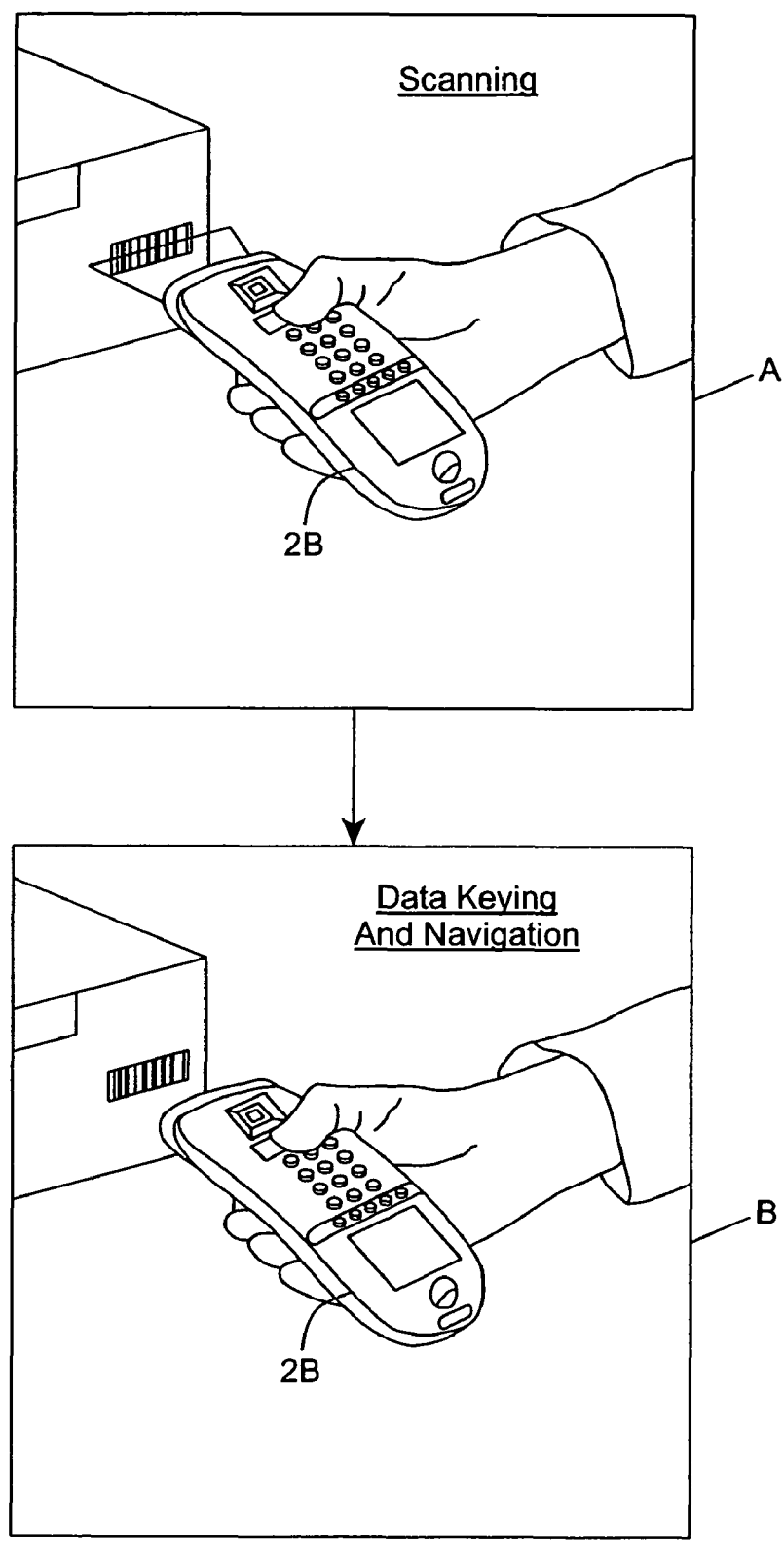
FIG. 12D is a schematic representation illustrating the improved single-handed operation of the wireless portable data terminal of the second illustrative embodiment of the present invention.

In FIG. 12D, the wireless portable data terminal of the second illustrative embodiment is shown used in a truly single-handed manner in accordance with the principles of the present invention.

Figure 13A:
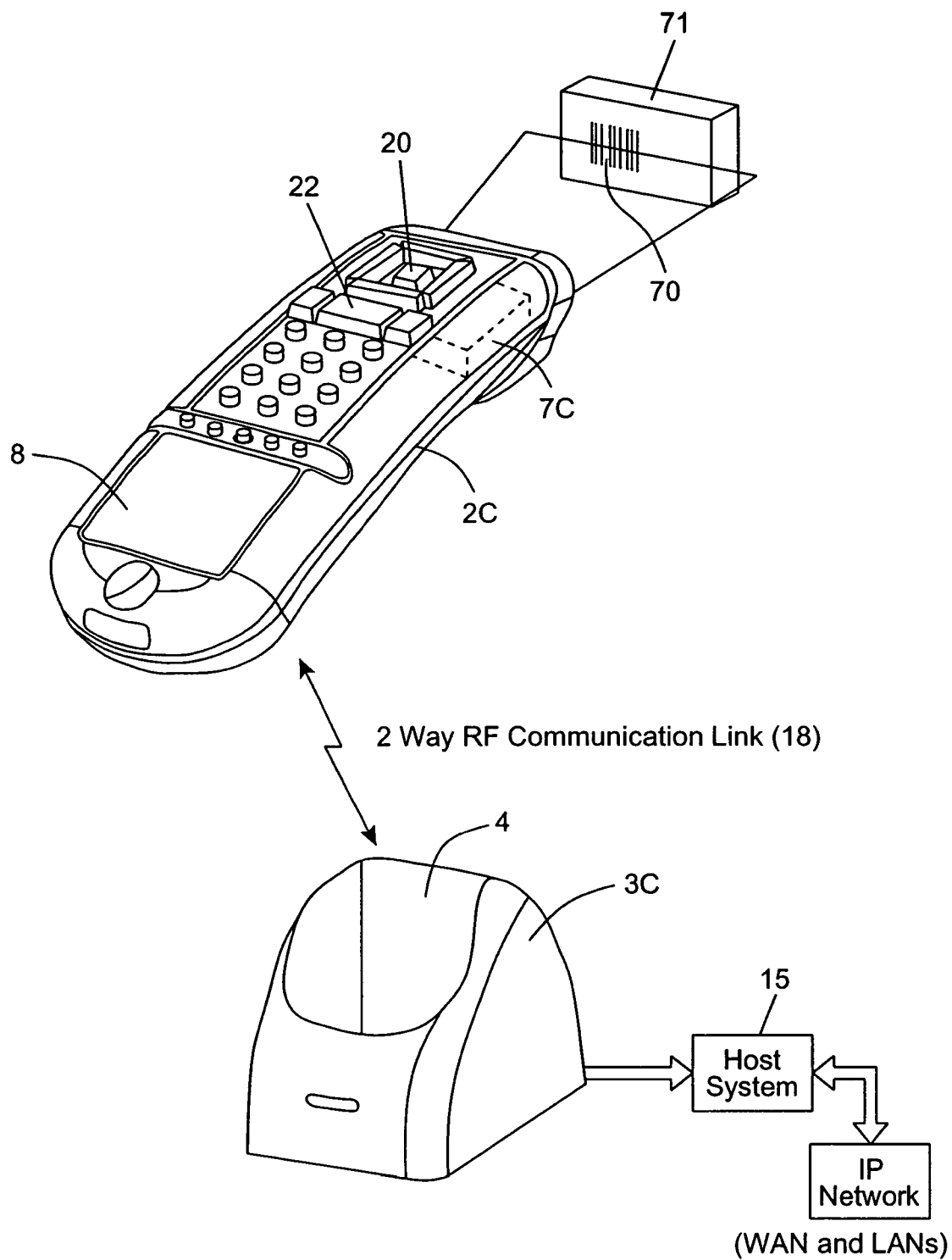
FIG. 13A is a perspective view of a third illustrative embodiment of the wireless bar code driven portable data terminal system of the present invention, wherein its automatically-triggered (i.e. activated) bar code reading engine is used to read a bar code symbol on a package and the symbol character data representative of the read bar code is automatically transmitted to its cradle-providing base station by way of an RF-enabled 2-way data communication link.
Figure 13B:
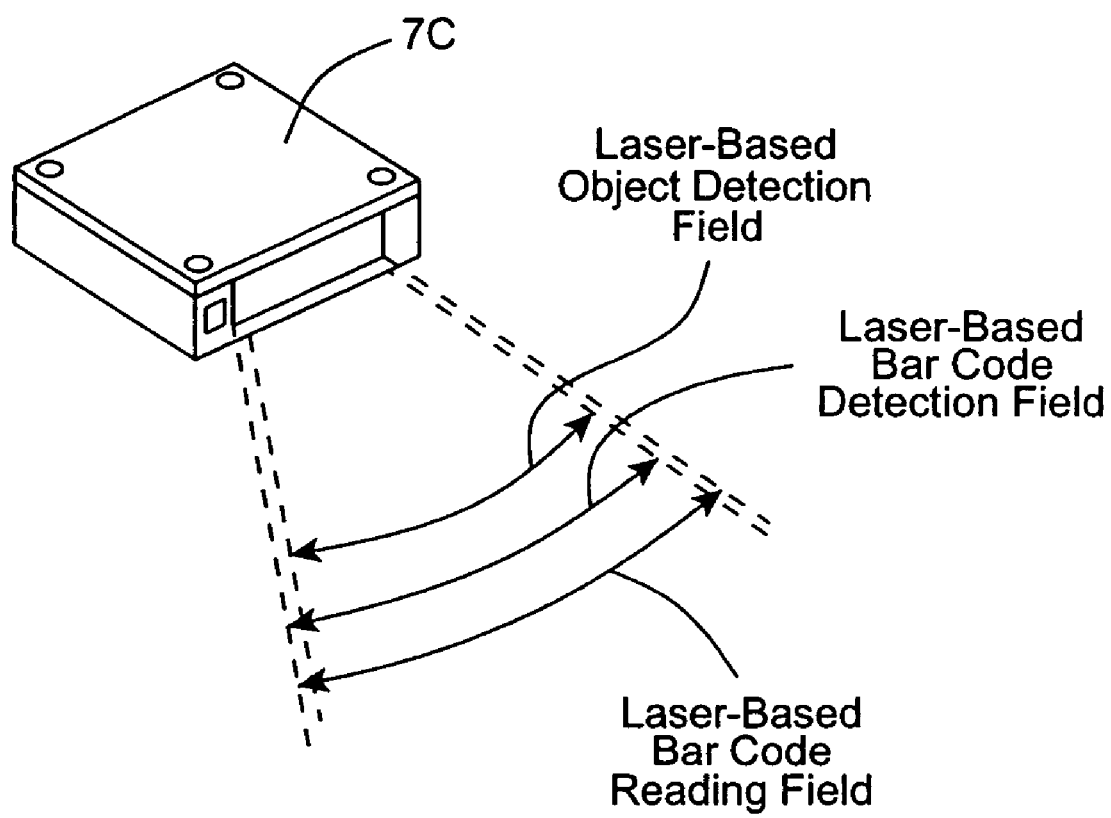
FIG. 13B is a perspective view of the 1-D and 2-D laser scanning bar code reading engine embodied within the engine bay of the wireless bar code driven portable data terminal system depicted in FIG. 13A, illustrating the overlapping spatial relationship of its laser-based object detection field, laser-based bar code detection field and laser-based bar code reading field.
Figure 13C:
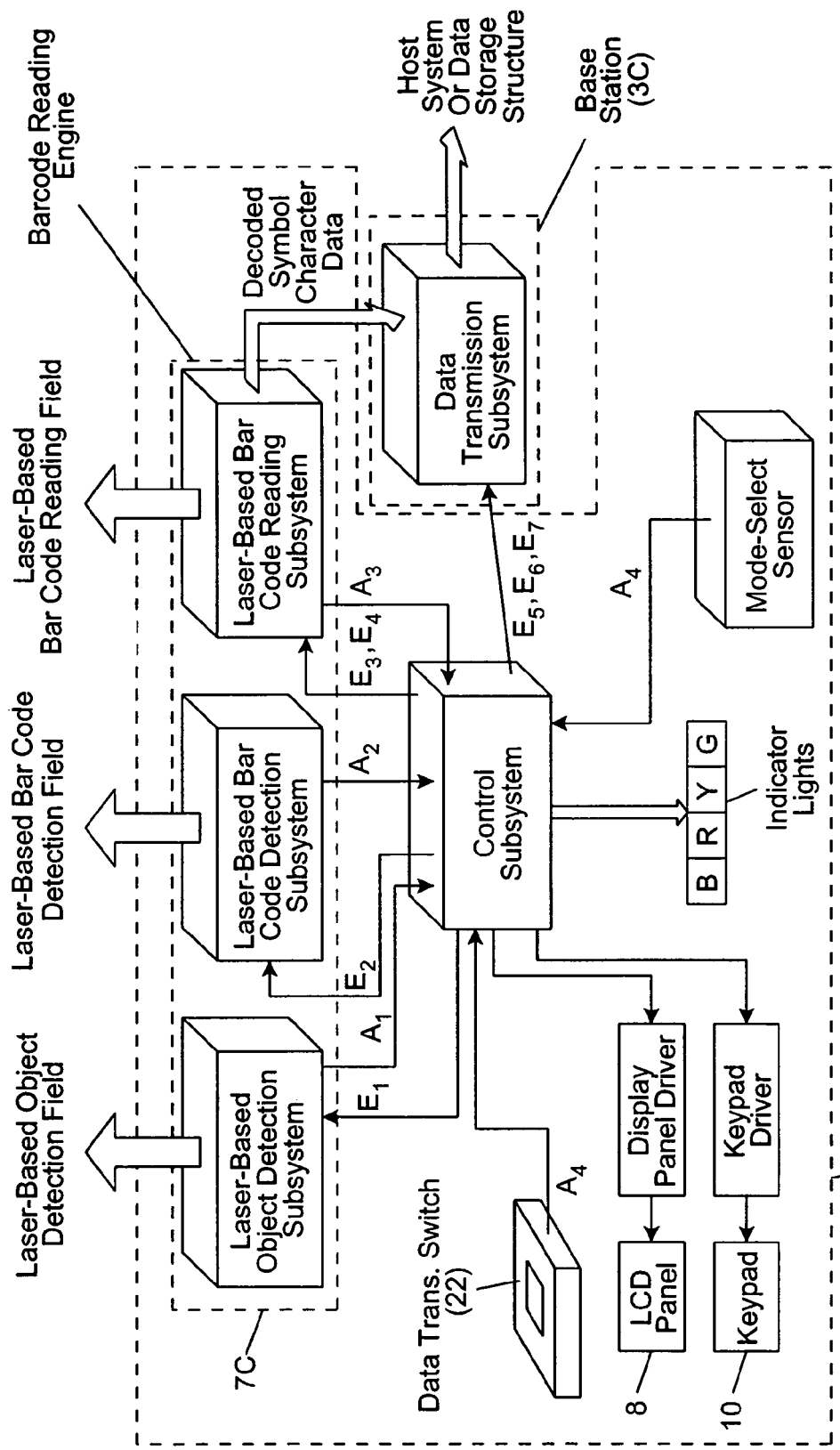
FIG. 13C is a schematic block system diagram showing the various subsystem blocks comprising the automatically-activated laser scanning bar code reading engine employed in the wireless portable data terminal shown in FIG. 13A.

Third Illustrative Embodiment of the Wireless Bar Code Driven Portable Data Terminal System of the Present Invention FIGS. 13A through 13C show a third illustrative embodiment of the wireless bar code driven portable data terminal system of the present invention 2C. As illustrated in FIG. 13A, the automatically-triggered (i.e. activated) bar code reading engine 7C within the PDT is automatically activated to read a bar code symbol 70 on a package 71 and the symbol character data representative of the read bar code is automatically transmitted to its cradle-providing base station 3C by way of an RF-enabled 2-way data communication link 18, when the operator uses his or her thumb to depress the data transmission activation switch 22 provided on the user control console.

FIG. 13B shows the 1-D and 2-D laser scanning bar code reading engine 7C embodied within the engine bay of the wireless bar code driven portable data terminal system 2C depicted in FIG. 13A. This figure also illustrates the overlapping spatial relationship of its laser-based object detection field, laser-based bar code detection field and laser-based bar code reading field. Details regarding this engine design are set forth in WIPO Publication No. WO 00/33239 incorporated herein by reference.

The automatically-triggered wireless PDT 2C shown in FIGS. 13A through 13B can be modeled using a number of functional subsystem blocks arranged in accordance with the system diagram shown in FIG. 13C. As shown, the PDT 2C comprises: a hand-supportable housing 5; a laser scanning bar code reading engine 7C, having an laser-based object detection subsystem, laser-based bar code detection subsystem and laser-based bar code reading subsystem, capable of projecting a laser illumination beam through its scanning window 31 in a substantially coplanar relationship with its field of view (FOV); user control console 10; a high-resolution color LCD display panel 8 and drivers mounted below the user control console 10 and integrated with the hand-supportable housing, for displaying, in a real-time manner, captured images, data being entered into the system, and graphical user interfaces (GUIs) generated by the end-user application running on the virtual machine of the wireless PDT; and a computer subsystem contained within the PDT housing, for carrying out system control operations according to the requirements of the end-user application to be implemented upon the hardware and software platforms of the wireless PDT 2C of this illustrative embodiment. Details regarding the operation of the bar code reading engine design employed in this illustrative embodiment are set forth in WIPO Publication No. WO 00/33239 incorporated herein by reference.

As shown in FIG. 13C, the base station 3C associated with PDT 2C comprises a data transmission subsystem 14 and other subsystem components not shown but described in detail hereinabove with respect to FIGS. 6 and 7, (e.g. relating to battery recharging, and data communication interfacing with a host system operably connected to digital communication network, such as a LAN or WAN supporting a networking protocol such as TCP/IP, AppleTalk or the like).

The subsystems associated with the wireless PDT and its base station can be implemented in a straightforward manner using the hardware and software implementation platforms illustrated in FIGS. 6 through 9A.

Figure 13D:
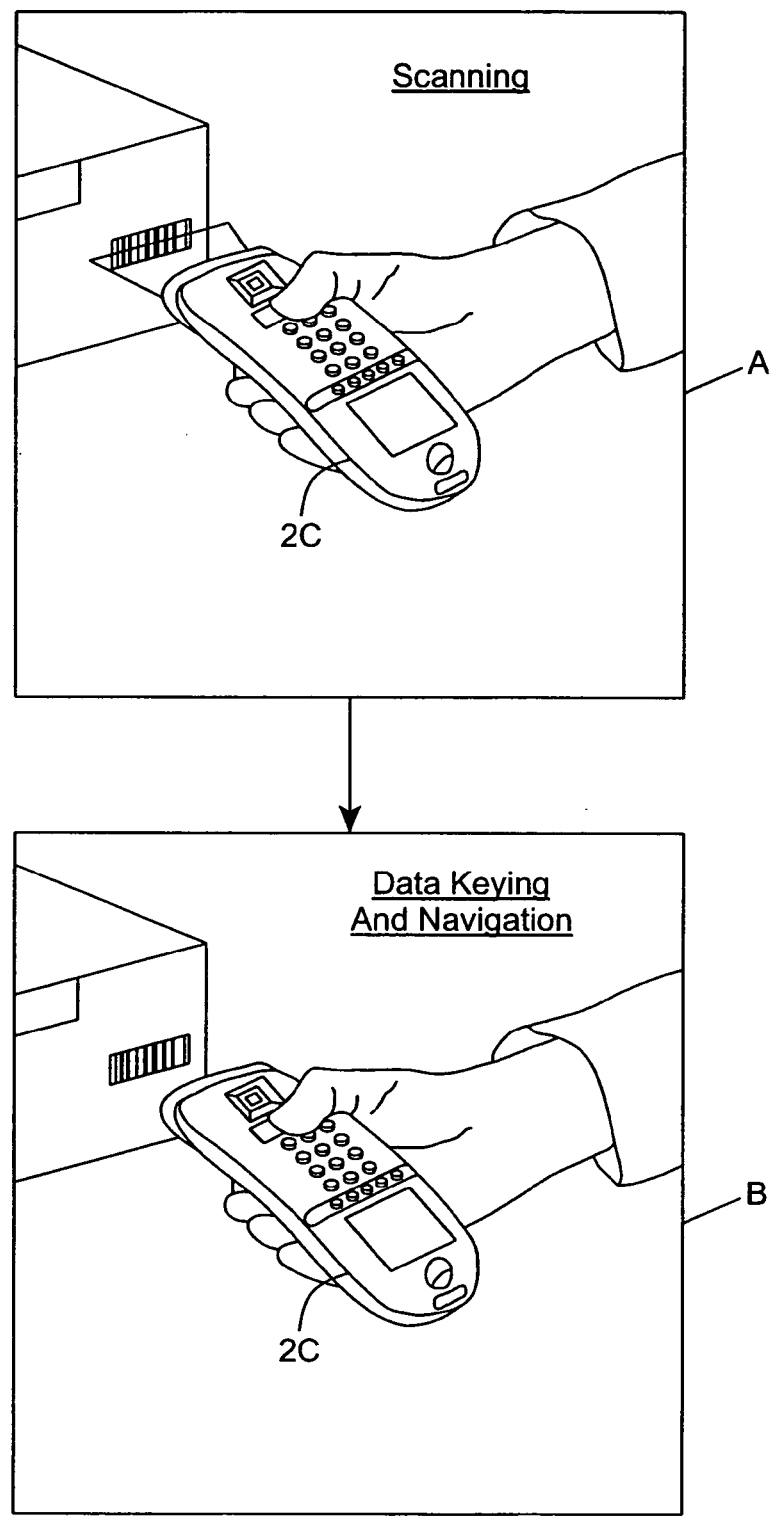
FIG. 13D is a schematic representation illustrating the improved single-handed operation of the wireless portable data terminal of the third illustrative embodiment of the present invention.

In FIG. 13D, the wireless portable data terminal of the third illustrative embodiment is shown used in a truly single-handed manner in accordance with the principles of the present invention.

Figure 14A:
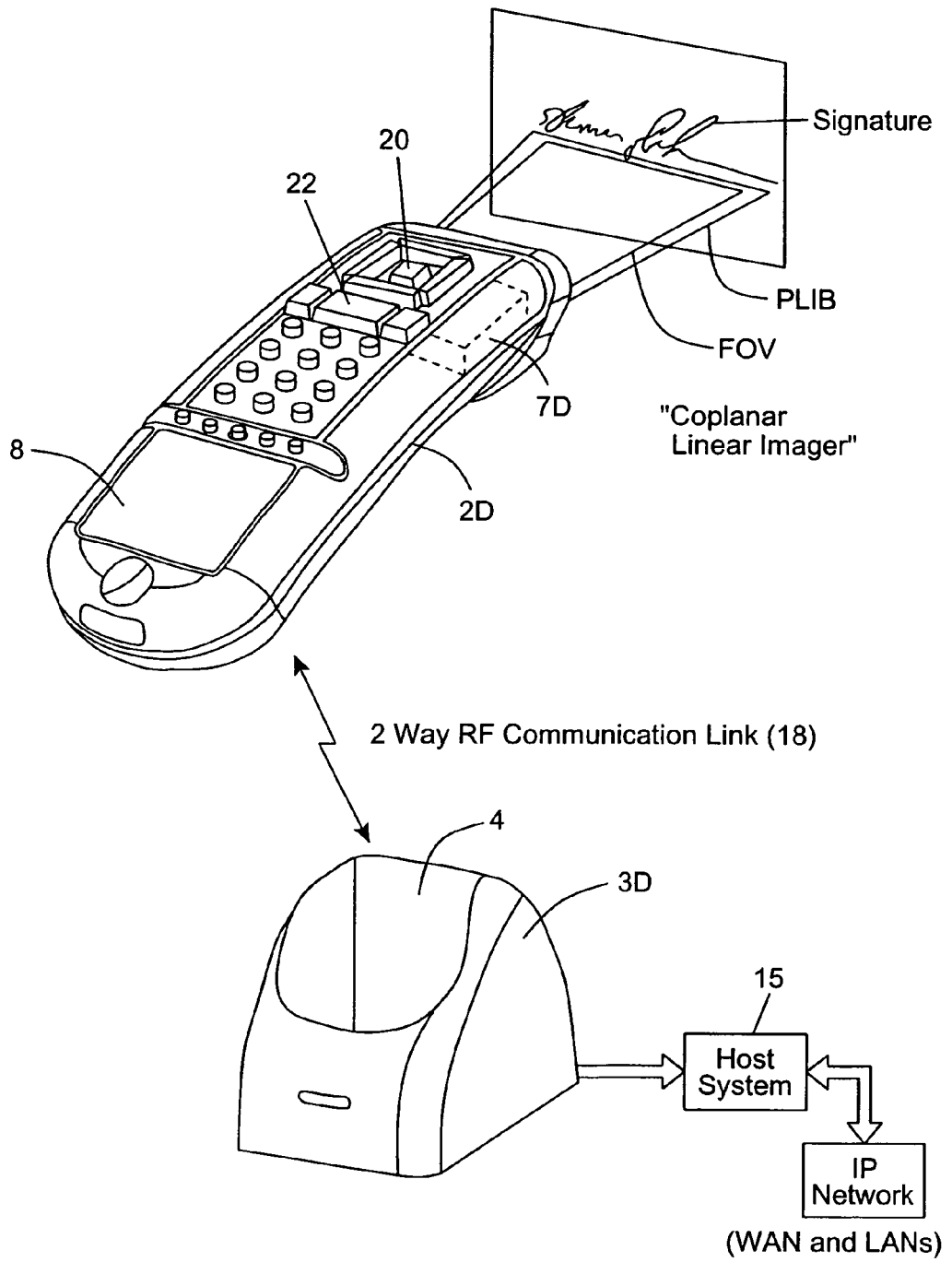
FIG. 14A is a perspective view of a fourth illustrative embodiment of the wireless bar code driven portable data terminal system of the present invention, wherein its linear (1D) imaging engine is used to read a bar code symbol (or other graphical intelligence) on a package and the symbol character data representative of the read bar code is automatically transmitted to its cradle-providing base station by way of an RF-enabled 2-way data communication link.

Fourth Illustrative Embodiment of the Wireless Bar Code Driven Portable Data Terminal System of the Present Invention FIG. 14A is a perspective view of a fourth illustrative embodiment of the wireless bar code driven portable data terminal system of the present invention 2D. As shown, the linear (1D) imaging engine employed in the PDT is used to read a bar code symbol (or other graphical intelligence) on a package and the symbol character data representative of the read bar code is automatically transmitted to its cradle-providing base station 3D by way of an RF-enabled 2-way data communication link 18, when the operator depresses the image capture activation button 22 provided on the user control console panel.

Figure 14B:
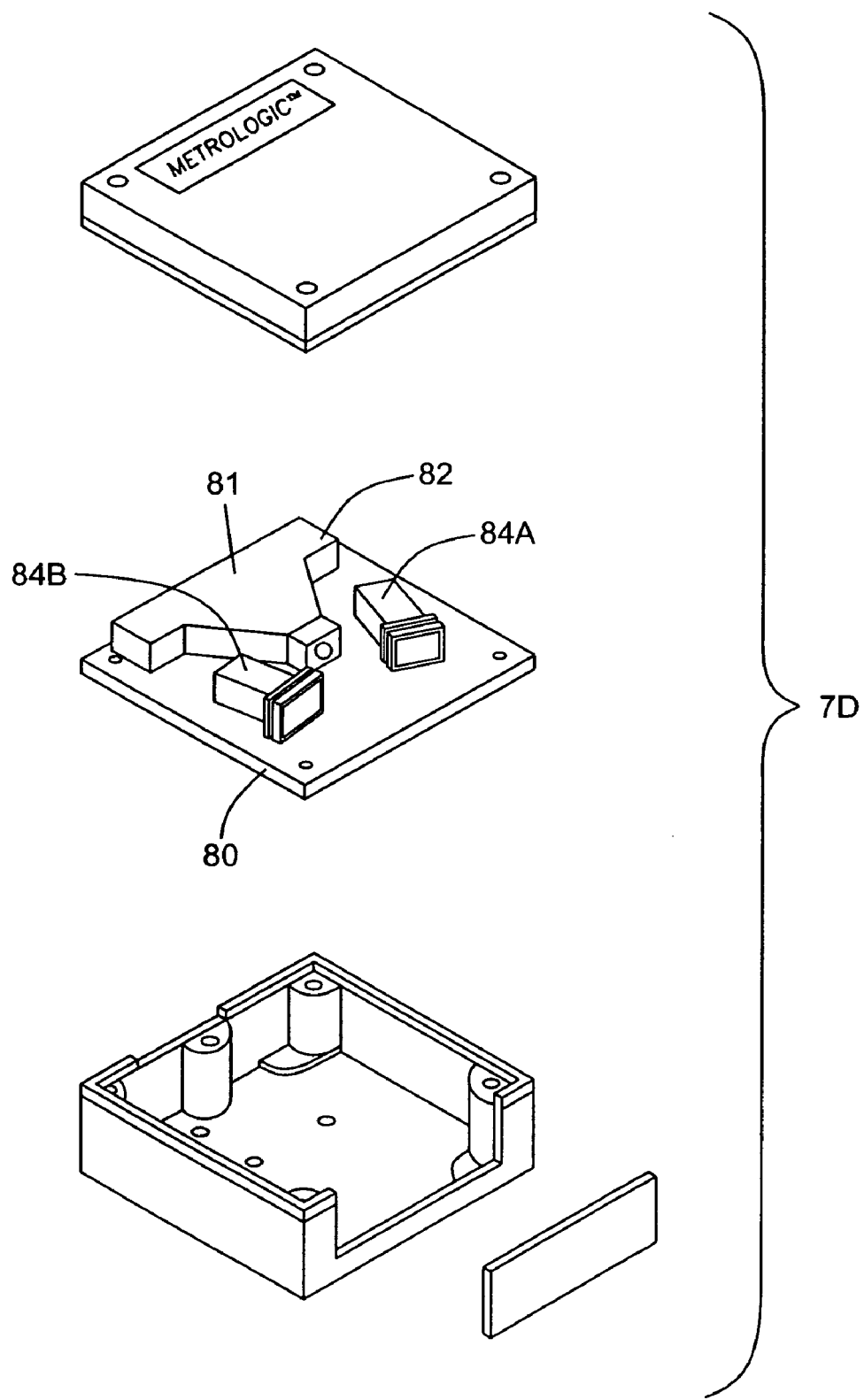
FIG. 14B is an exploded view of the components comprising laser (or VLD) illuminated linear-imaging engine embodied within the engine bay of the wireless bar code driven portable data terminal system depicted in FIG. 14A.

As shown in FIG. 14B, the laser (or VLD) illuminated linear-imaging engine 7D comprises a number of subcomponents, namely: an optical-bench/multi-layer PC board 80; an IFD (i.e. camera) subsystem mounted on the optical bench, and including 1-D (i.e. linear) CCD image detection array 81 having image detection elements and being contained within a light-box 82 provided with image formation optics 83, through which laser light collected from the illuminated object along the field of view (FOV) is permitted to pass; and a pair of PLIMs (i.e. comprising a dual-VLD or LED PLIA) 84A and 84B mounted on optical bench 80 on opposite sides of the IFD module, for producing a planar light beam (PLIB) within the FOV. As shown in FIG. 14B, the field of view of the IFD module spatially-overlaps and is coextensive (i.e. coplanar) with the PLIBs that are generated by the PLIMs 84A and 84B employed therein.

There are various ways in which to control the operation of the PDT illustrated in FIGS. 14A through 14B to produce differently configured image-capture driven PDTs of the present invention. Several different system configurations are specified in FIGS. 14C through 14G and described hereinbelow.

Figure 14C:
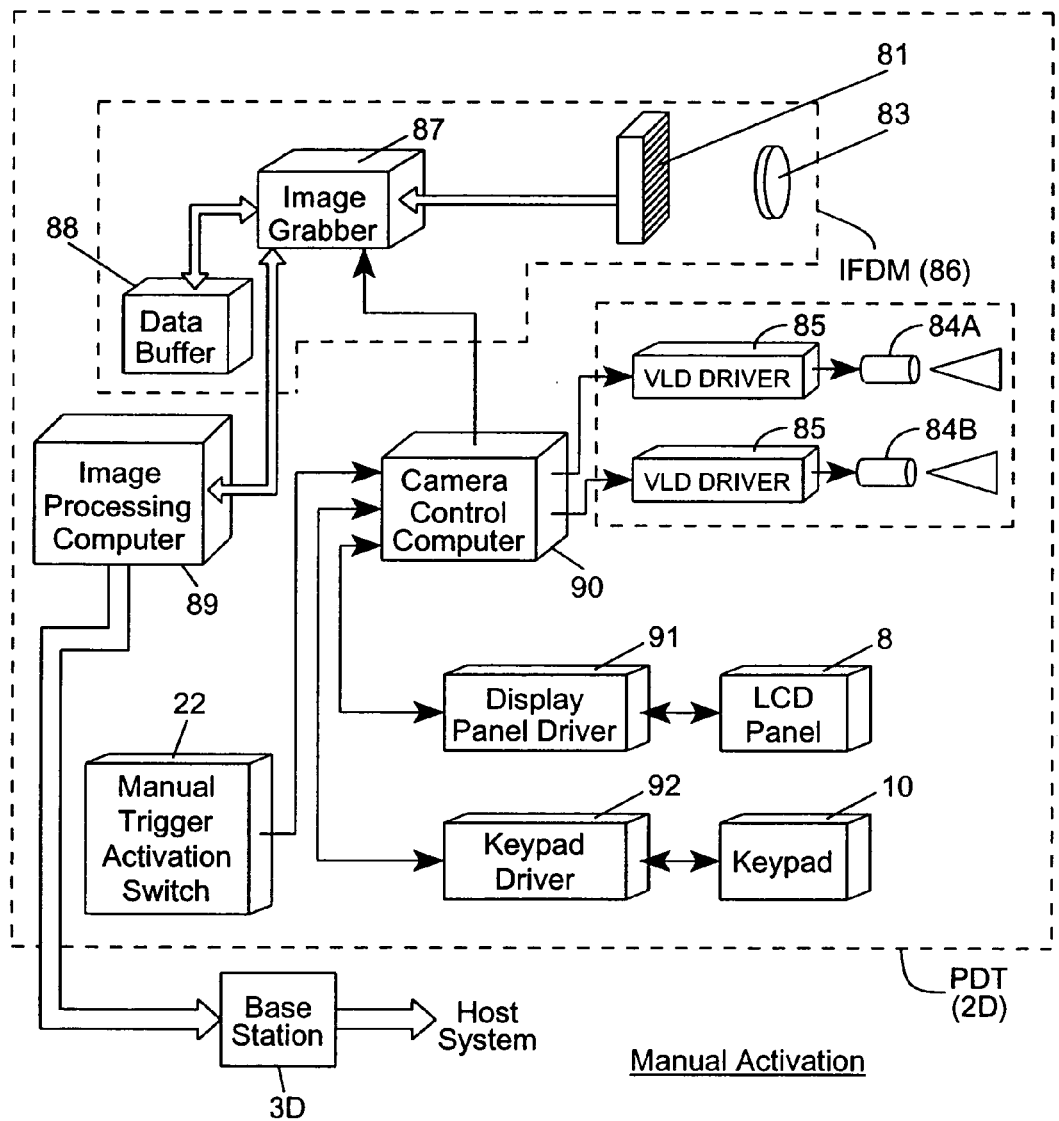
FIG. 14C is a schematic block system diagram showing the various subsystem blocks comprising the wireless portable data terminal shown in FIG. 14A, wherein the illumination and imaging of a bar code bearing object is carried out by a manually-triggered linear-imaging engine that is integrated within the wireless portable data terminal, and programmably configured for image-based bar code reading operation upon manually depressing the imager activation button (i.e. switch) provided on the user control console of the wireless portable data terminal.

In the system configuration shown in FIG. 14C, the illumination and imaging of a bar code bearing object is carried out by a manually-triggered linear-imaging engine 7D that is integrated within the wireless portable data terminal 2D, and programmably configured for image-based bar code reading operation upon manually depressing the imager activation button (i.e. switch) 22 provided on the user control console of the wireless portable data terminal. As shown, the PDT 2D comprises: planar laser illumination array (PLIA), including a set of VLD driver circuits 85, PLIMs 84A, 84B (realized using VLDs or LEDs); a linear-type image formation and detection (IFD) module 86 having a linear image detection array 81 with image detection elements, image formation optics 83, an image frame grabber 87, and an image data buffer 88; an image processing computer 89; a camera control computer 90; a LCD panel 8 and a display panel driver 91; user control console 10 and driver 92; and a manually-actuated trigger switch 22 for manually activating the planar laser illumination arrays, the linear-type image formation and detection (IFD) module, the image frame grabber, the image data buffer, and the image processing computer, via the camera control computer, in response to the manual activation of the trigger switch 22. Thereafter, the system control program carried out within the camera control computer 90 enables: (1) the automatic capture of digital images of objects (i.e. bearing bar code symbols and other graphical indicia) through the image formation optics 83 provided within the linear imager; (2) the automatic decode-processing of the bar code symbol represented therein; (3) the automatic generation of symbol character data representative of the decoded bar code symbol; (4) the automatic buffering of the symbol character data within the hand-supportable housing or transmitting the same to a host computer system; and (5) thereafter the automatic deactivation of the subsystem components described above. When using a manually-actuated trigger switch 22 having a single-stage operation, manually depressing the switch 22 with a single pull-action will thereafter initiate the above sequence of operations with no further input required by the user. Details regarding the operation of the linear imaging engine design employed in this illustrative embodiment are set forth in WIPO Publication No. WO 02/43195 A2 incorporated herein by reference.

Figure 14D:
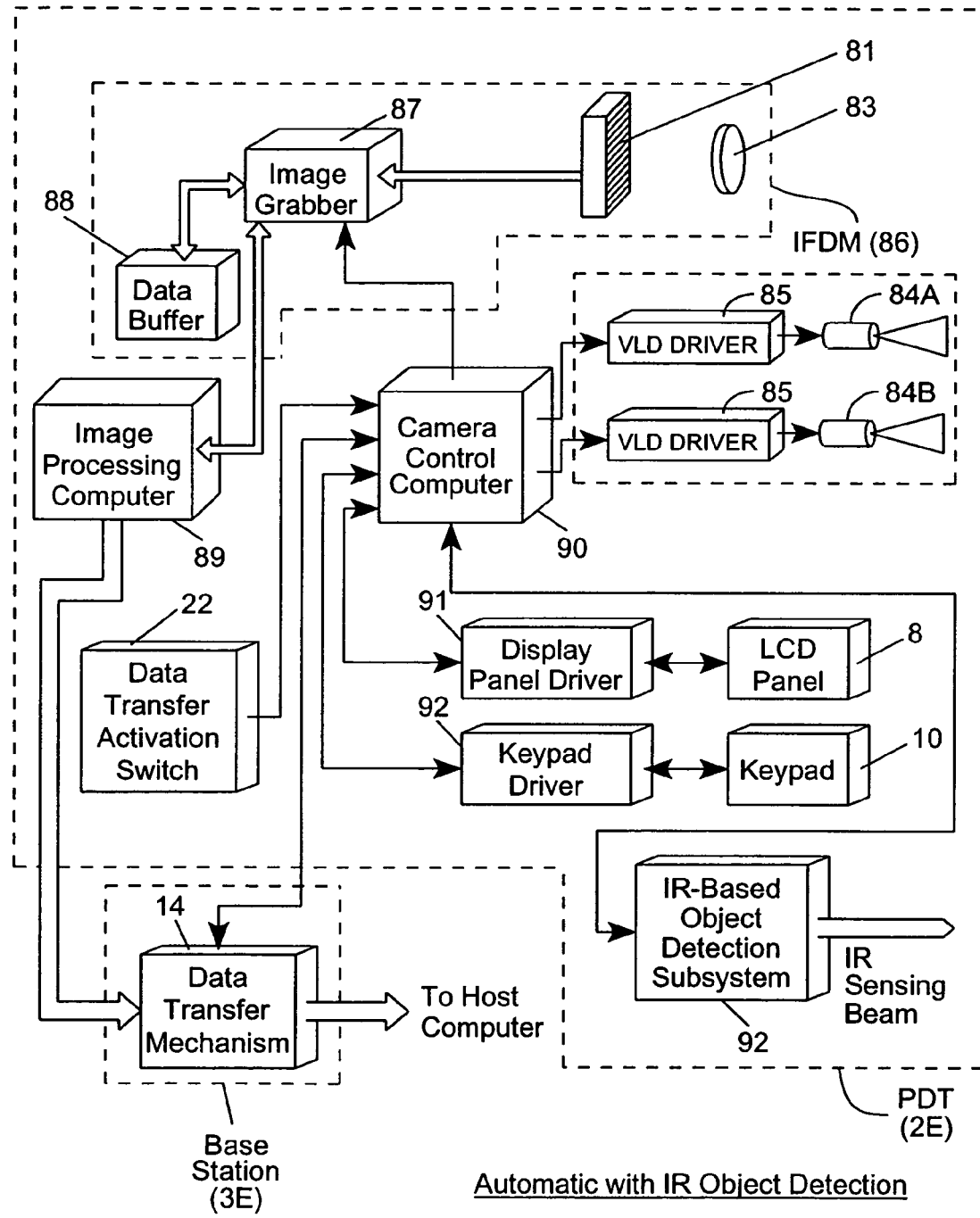
FIG. 14D is a schematic block system diagram showing the various subsystem blocks comprising the wireless portable data terminal shown in FIG. 14A, wherein the illumination and imaging of a bar code bearing object is carried out by an automatically-triggered linear-imaging engine with IR-based object detection that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.

In the system configuration shown in FIG. 14D, the illumination and imaging of a bar code bearing object is carried out by an automatically-triggered linear-imaging engine with IR-based object detection that is integrated within the wireless portable data terminal, and programmably configured for automatic image-based bar code reading operation and transmission of symbol character data to its remote base terminal when the operator manually depresses the data transmission button (i.e. switch) 22 provided on the user control console of the wireless portable data terminal.

As shown in system diagram of FIG. 14D, the PDT 2D comprises: planar laser illumination array (PLIA), including a set of VLD or LED driver circuits 85, PLIMs (VLD or LED) 84A, 84B, and a linear-type image formation and detection (IFD) module 86 having a linear image detection array 81 with image detection elements, image formation optics 84, an image frame grabber 87, and an image data buffer 88; an image processing computer 89; a camera control computer 90; a LCD panel 8 and a display panel driver 91; user control console 10 and associated driver 92; an IR-based object detection subsystem 92 within its hand-supportable housing for automatically activating, upon detection of an object in its IR-based object detection field, the planar laser illumination arrays (driven by VLD driver circuits 84A, 84B), the linear-type image formation and detection (IFD) module, and the image processing computer, via the camera control computer, so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 and a manually-activatable data transmission switch 22, integrated with the hand-supportable housing, for enabling the transmission of symbol character data from the imager processing computer 89 to a host computer system, via the data transmission mechanism 14, in response to the manual activation of the data transmission switch 22 at about the same time as when a bar code symbol is automatically decoded and symbol character data representative thereof is automatically generated by the image processing computer. This manually-activated symbol character data transmission scheme is described in greater detail in copending U.S. application Ser. No. 08/890,320, filed Jul. 9, 1997, and Ser. No. 09/513,601, filed Feb. 25, 2000, each said application being incorporated herein by reference in its entirety. Details regarding the operation of the linear imaging engine design employed in this illustrative embodiment are set forth in WIPO Publication No. WO 02/43195 A2 incorporated herein by reference.

Figure 14E:
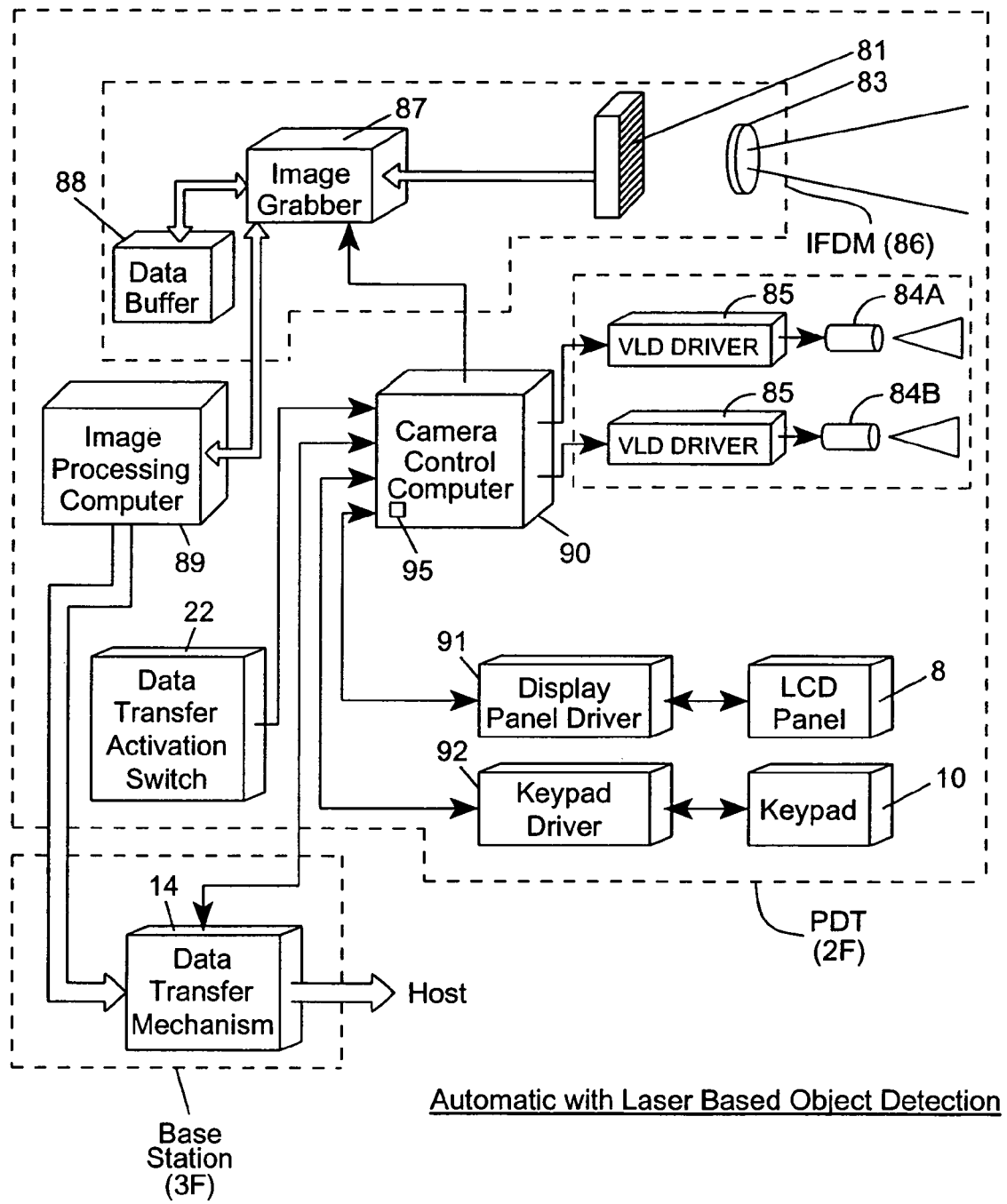
FIG. 14E is a schematic block system diagram showing the various subsystem blocks comprising the wireless portable data terminal shown in FIG. 14A, wherein the illumination and imaging of a bar code bearing object is carried out by an automatically-triggered linear-imaging engine with laser-based object detection that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.

In the system configuration shown in FIG. 14E, the illumination and imaging of a bar code bearing object is carried out by an automatically-triggered linear-imaging engine with laser-based object detection that is integrated within the wireless portable data terminal 2F, and programmably configured for automatic image-based bar code reading operation and transmission of symbol character data to its remote base terminal when the operator manually depresses the data transmission button (i.e. switch) 22 provided on the user control console of the wireless portable data terminal.

As shown in the system diagram of FIG. 14E, the PDT 2F comprises: a planar laser illumination array (PLIA), including a set of VLD or LED driver circuits 85, PLIMs (comprising a VLD or LED) 84A, 84B, and a linear-type image formation and detection (IFD) module having a linear image detection array 81 with image detection elements, image formation optics 83, an image frame grabber 87 and an image data buffer 88; an image processing computer 89; a camera control computer 90; a LCD panel 8 and a display panel driver 91; user control console 10 and driver 92; a laser-based object detection subsystem 95 embodied within camera control computer 90 for automatically activating the planar laser illumination arrays into a fill-power mode of operation, the linear-type image formation and detection (IFD) module, and the image processing computer 89, via the camera control computer 90, in response to the automatic detection of an object in its laser-based object detection field, so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 and a manually-activatable data transmission switch 22 for enabling the transmission of symbol character data from the imager processing computer to a host computer system, via the data transmission mechanism 14, in response to the manual activation of the data transmission switch 22 at about the same time as when a bar code symbol is automatically decoded and symbol character data representative thereof is automatically generated by the image processing computer 89. This manually-activated symbol character data transmission scheme is described in greater detail in copending U.S. application Ser. No. 08/890,320, filed Jul. 9, 1997, and U.S. Ser. No. 09/513,601, filed Feb. 25, 2000, each said application being incorporated herein by reference in its entirety. Details regarding the operation of the linear imaging engine design employed in this illustrative embodiment are set forth in WIPO Publication No. WO 02/43195 A2 incorporated herein by reference.

Figure 14F:
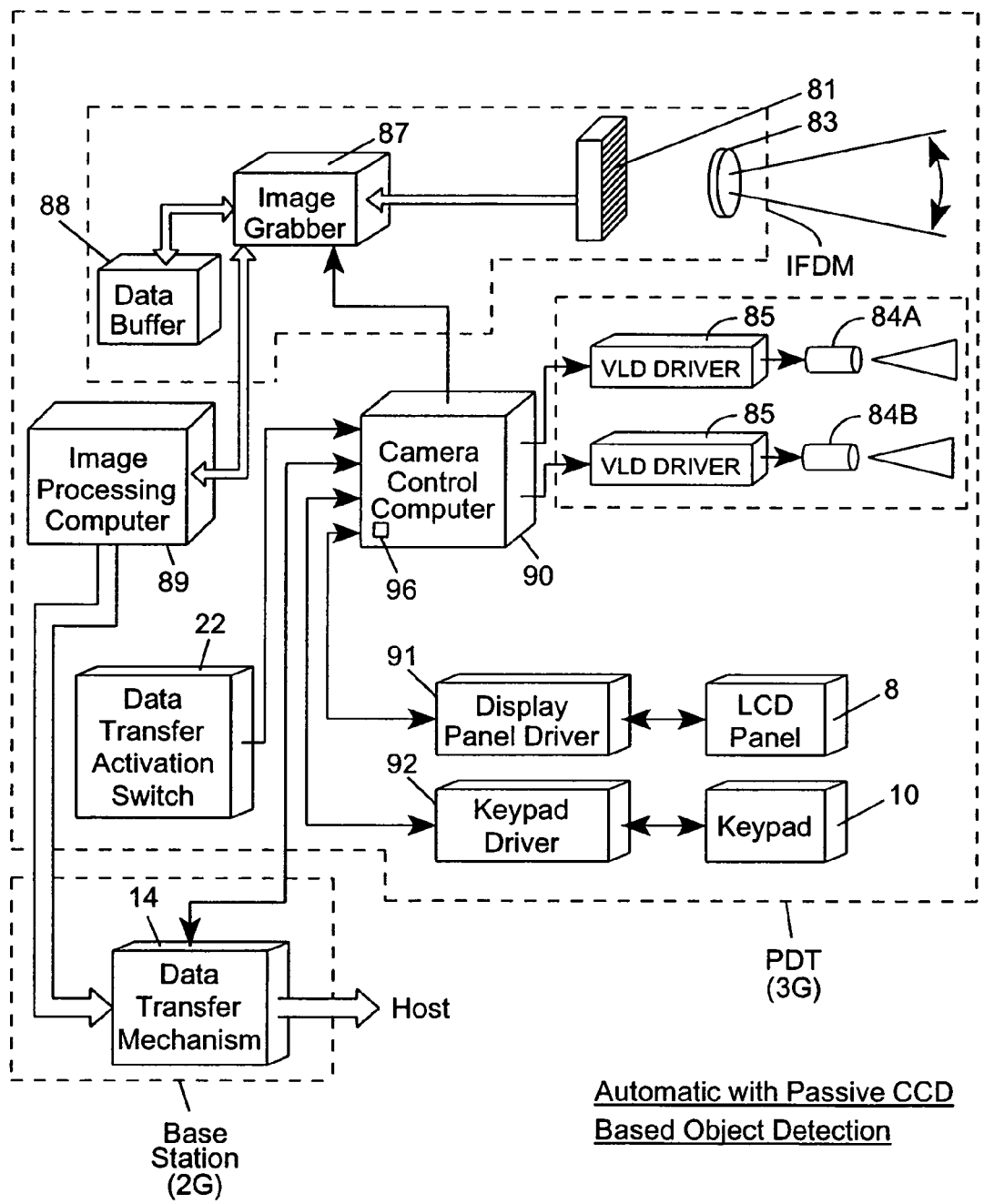
FIG. 14F is a schematic block system diagram showing the various subsystem blocks comprising the wireless portable data terminal shown in FIG. 14A, wherein the illumination and imaging of a bar code bearing object is carried out by an automatically-triggered linear-imaging engine with passive CCD-based object detection that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.

In the system configuration shown in FIG. 14F, the illumination and imaging of a bar code bearing object is carried out by an automatically-triggered linear-imaging engine with passive CCD-based object detection that is integrated within the wireless portable data terminal 2G, and programmably configured for automatic image-based bar code reading operation and transmission of symbol character data to its remote base terminal when the operator manually depresses the data transmission button (i.e. switch) 22 provided on the user control console of the wireless portable data terminal.

As shown in FIG. 14F, the PDT 2G comprises: planar laser illumination array (PLIA), including a set of VLD or LED driver circuits 85, PLIMs (i.e. VLD or LED) 84A, 84B, and a linear-type image formation and detection (IFD) module having a linear image detection array 81 with image detection elements, image formation optics 83, an image frame grabber 87 and an image data buffer 88; an image processing computer 89; a camera control computer 90; a LCD panel 8 and a display panel driver 91; user control console 10 and driver 92; an ambient-light driven object detection subsystem 96 embodied within the camera control computer 90, for automatically activating the planar laser illumination arrays (driven by VLD or LED driver circuits 85), the linear-type image formation and detection (IFD) module, and the image processing computer 89, via the camera control computer 90, upon automatic detection of an object via ambient-light detected by object detection field enabled by the linear image sensor 81 within the IFD module, so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 (aboard the base station 3G) and a manually-activatable data transmission switch 22 for enabling the transmission of symbol character data from the image processing computer 89 to a host computer system, via the data transmission mechanism 14, in response to the manual activation of the data transmission switch 22 at about the same time as when a bar code symbol is automatically decoded and symbol character data representative thereof is automatically generated by the image processing computer 89. This manually-activated symbol character data transmission scheme is described in greater detail in copending U.S. application Ser. No. 08/890, 320, filed Jul. 9, 1997, and Ser. No. 09/513,601, filed Feb. 25, 2000, each said application being incorporated herein by reference in its entirety. Details regarding the operation of the linear imaging engine design employed in this illustrative embodiment are set forth in WIPO Publication No. WO 02/43195 A2 incorporated herein by reference. Notably, in some applications, the passive-mode object detection subsystem employed in this system embodiment might require (i) using a different system of optics for collecting ambient light from objects during the object detection mode of the system, or (ii) modifying the light collection characteristics of the light collection system to permit increased levels of ambient light to be focused onto the CCD image detection array 81 in the IFD module (i.e. subsystem). In other applications, the provision of image intensification optics on the surface of the CCD image detection array should be sufficient to form images of sufficient brightness to perform object detection and/or bar code detection operations.

Figure 14G:
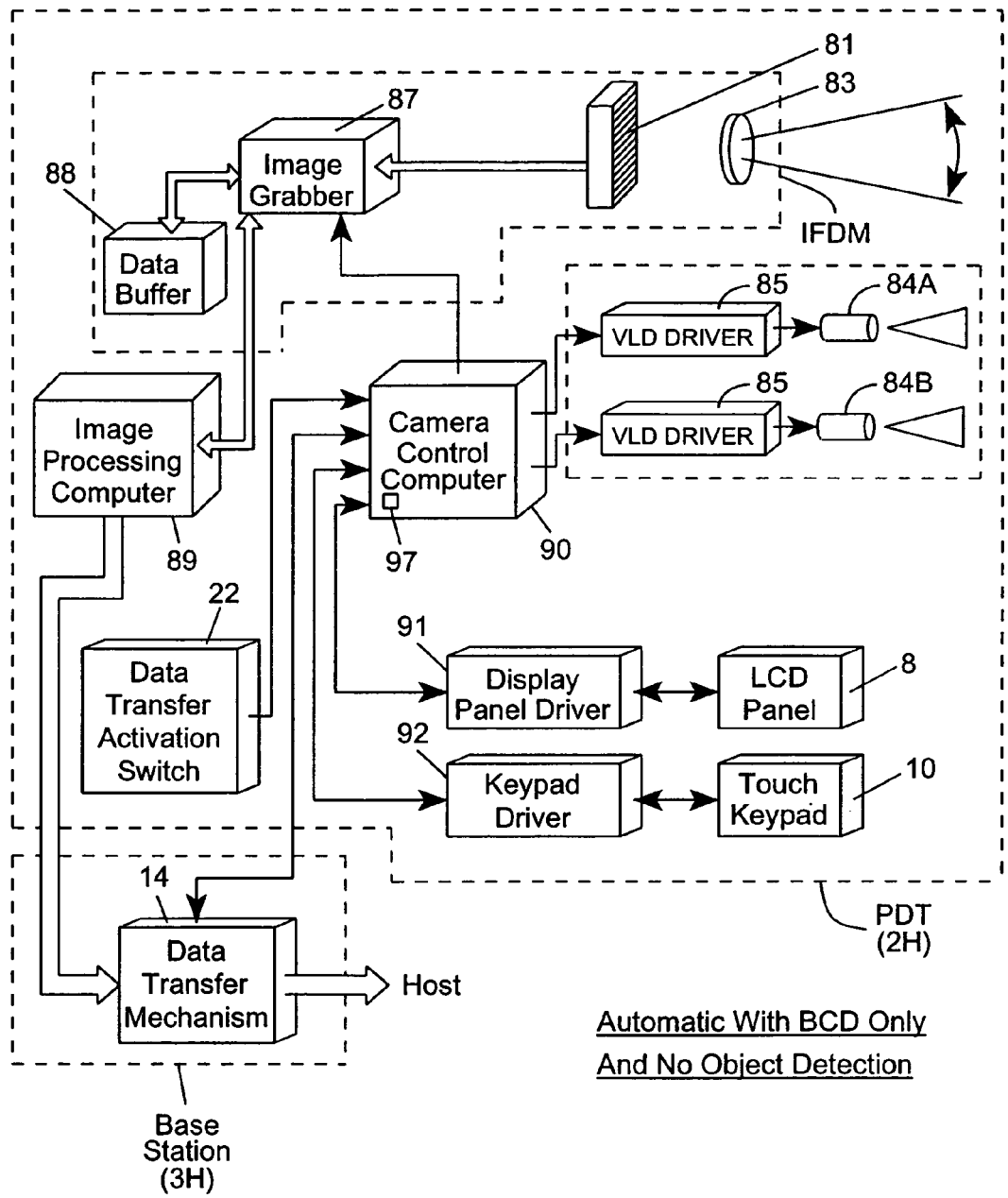
FIG. 14G is a schematic block system diagram showing the various subsystem blocks comprising the wireless portable data terminal shown in FIG. 14A, wherein the illumination and imaging of a bar code bearing object is carried out by an automatically-triggered linear-imaging engine (without automatic object detection) that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.
Figure 14H:
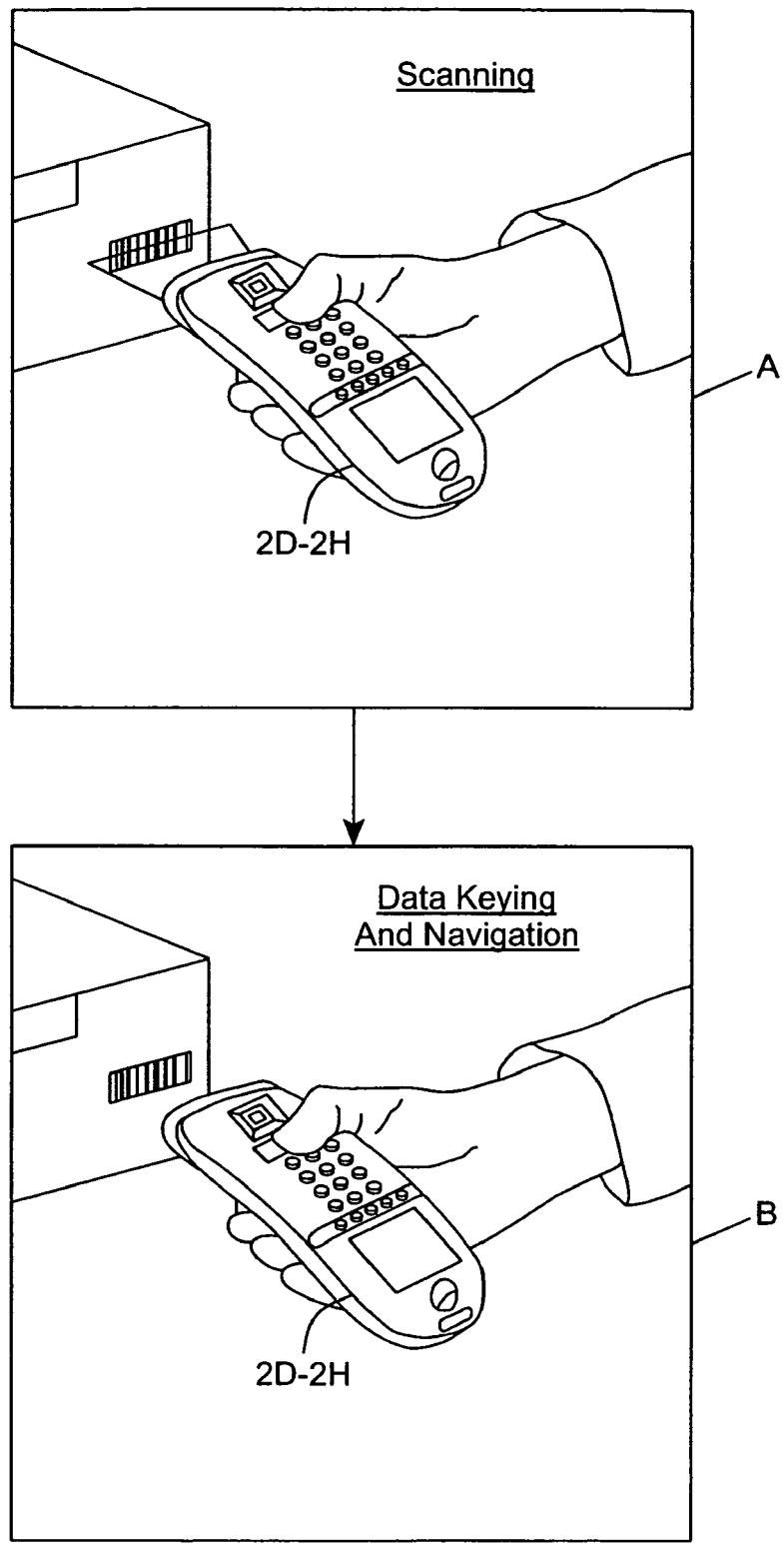
FIG. 14H is a schematic representation illustrating the improved single-handed operation of the wireless portable data terminal shown in FIGS. 14A through 14G.

In the system configuration shown in FIG. 14G, the illumination and imaging of a bar code bearing object is carried out by an automatically-triggered linear-imaging engine (without automatic object detection) that is integrated within the wireless portable data terminal 2H, and programmably configured for automatic image-based bar code reading operation and transmission of symbol character data to its remote base terminal when the operator manually depresses the data transmission button (i.e. switch) 22 provided on the user control console of the wireless portable data terminal.

As shown in FIG. 14G, the PDT 2H comprises: a planar laser illumination array (PLIA), including a set of VLD or LED driver circuits 85, PLIMs (i.e. VLD or LED) 84A, 84B, and a linear-type image formation and detection (IFD) module having a linear image detection array 81 with image detection elements, image formation optics 83, an image frame grabber 87, and image data buffer 88; an image processing computer 89; a camera control computer 90; a LCD panel 8 and a display panel driver 91; user control console 10 and associated driver 92; an automatic bar code symbol detection subsystem 97 embodied within camera control computer 90 for automatically activating the image processing computer for decode-processing in response to the automatic detection of a bar code symbol within its bar code symbol detection field by the linear image sensor within the IFD module so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 (aboard the base station 3H) and a manually-activatable data transmission switch 22 for enabling the transmission of symbol character data from the imager processing computer 89 to a host computer system, via the data transmission mechanism 14, in response to the manual activation of the data transmission switch 22 at about the same time as when a bar code symbol is automatically decoded and symbol character data representative thereof is automatically generated. This manually-activated symbol character data transmission scheme is described in greater detail in copending U.S. application Ser. No. 08/890,320, filed Jul. 9, 1997, and Ser. No. 09/513,601, filed Feb. 25, 2000, each said application being incorporated herein by reference in its entirety. Details regarding the operation of the linear imaging engine design employed in this illustrative embodiment are set forth in WIPO Publication No. WO 02/43195 A2 incorporated herein by reference.

The subsystems associated with the wireless PDT and its base station can be implemented in a straightforward manner using the hardware and software implementation platforms illustrated in FIGS. 6 through 9A.

In FIG. 14D, the wireless portable data terminal of the fourth illustrative embodiment is shown used in a truly single-handed manner in accordance with the principles of the present invention.

Figure 15A:
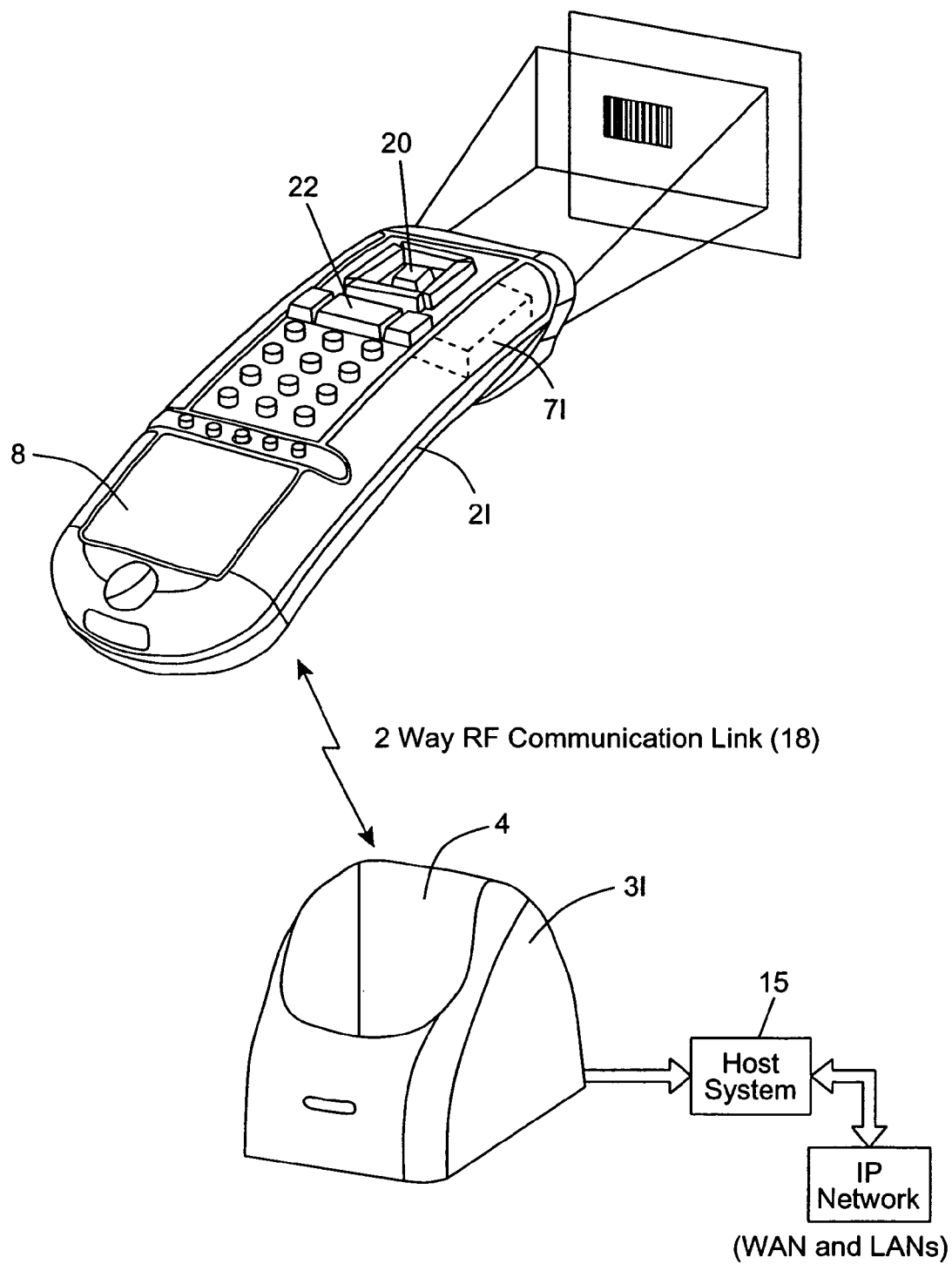
FIG. 15A is a perspective view of a fifth illustrative embodiment of the wireless bar code driven portable data terminal system of the present invention, wherein its area (2D) imaging engine is used to read a bar code symbol (or other graphical intelligence) on a package and the symbol character data representative of the read bar code is automatically transmitted to its cradle-providing base station by way of an RF-enabled 2-way data communication link.

Fifth Illustrative Embodiment of the Wireless Bar Code Driven Portable Data Terminal System of the Present Invention FIG. 15A is a perspective view of a fifth illustrative embodiment of the wireless bar code driven portable data terminal system of the present invention 71. As shown, the area (2D) imaging engine employed in the PDT is used to read a bar code symbol (or other graphical intelligence) on a package and the symbol character data representative of the read bar code is automatically transmitted to its cradle-providing base station 3F by way of an RF-enabled 2-way data communication link 18, when the operator depresses the image capture activation button 22 provided on the user control console panel 10.

Figure 15B:
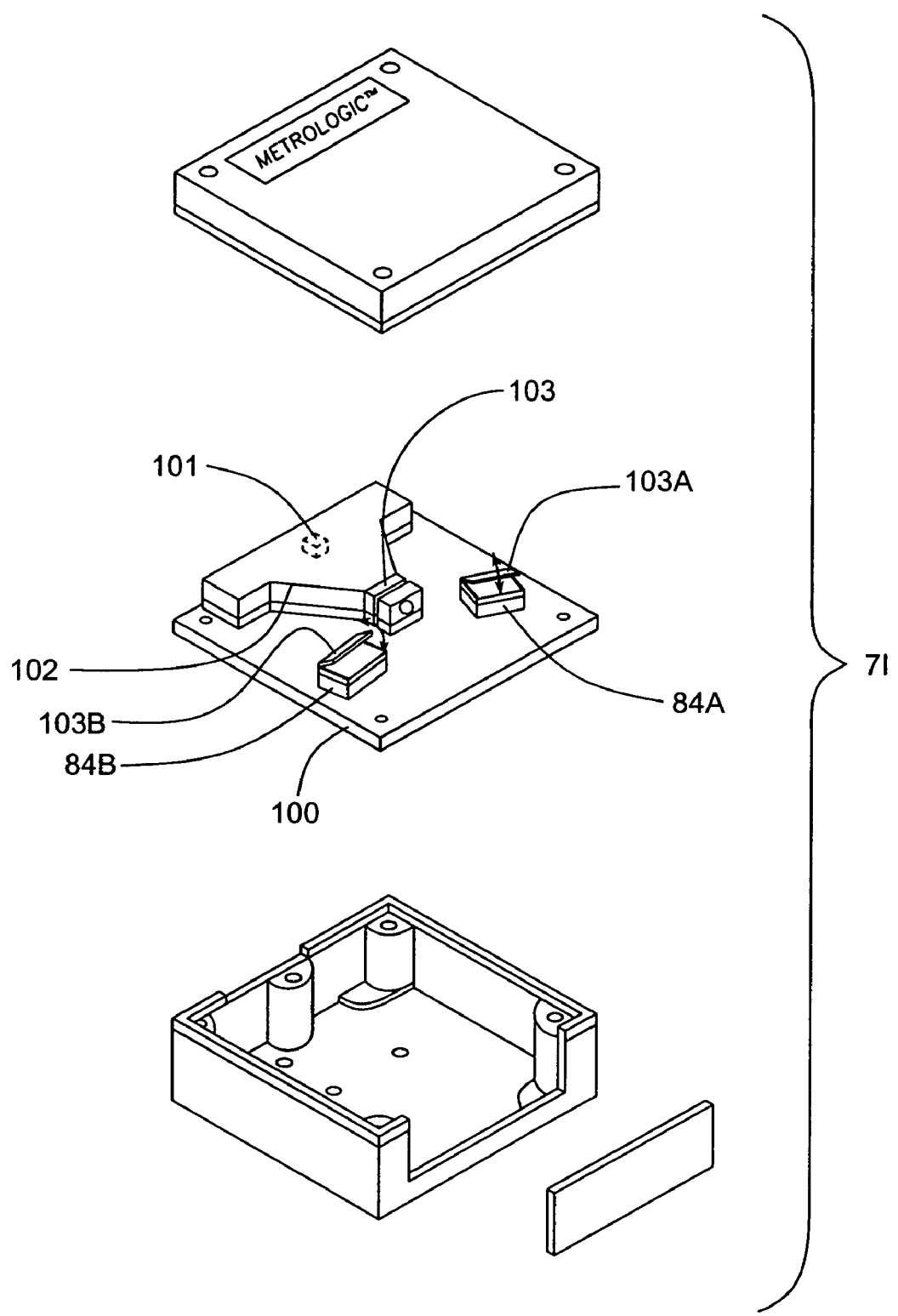
FIG. 15B is an exploded view of the components comprising laser (or VLD) illuminated linear-imaging engine embodied within the engine bay of the wireless bar code driven portable data terminal system depicted in FIG. 15A.

As shown in FIG. 15B, the laser (or VLD) illuminated linear-imaging engine 71 comprises a number of subcomponents, namely: an optical-bench/multi-layer PC board 100; an IFD (i.e. camera) subsystem mounted on the optical bench, and including 2-D (i.e. area) CCD image detection array 101 having image detection elements and being contained within a light-box 102 provided with image formation optics 103, through which laser light collected from the illuminated object along the 3-D field of view (FOV) is permitted to pass; a pair of PLIMs (i.e. comprising a dual-VLD or LED PLIA) 84A and 84B mounted on optical bench 100 on opposite sides of the IFD module, for producing a PLIB within the FOV; and a pair of beam sweeping mechanisms 103A and 103B for sweeping the planar laser illumination beam (PLIB) produced from the PLIA across the 3-D FOV. As shown in FIG. 15B, the 3-D field of view of the IFD 41 of 53 module spatially-overlaps and is coextensive (i.e. coplanar) with the PLIBs that are generated by the PLIMs 84A and 84B employed therein.

There are various ways in which to control the operation of the PDT illustrated in FIGS. 15A through 15B to produce differently configured image-capture driven PDTs of the present invention. Several different system configurations are specified in FIGS. 15C through 15G and described hereinbelow.

Figure 15C:
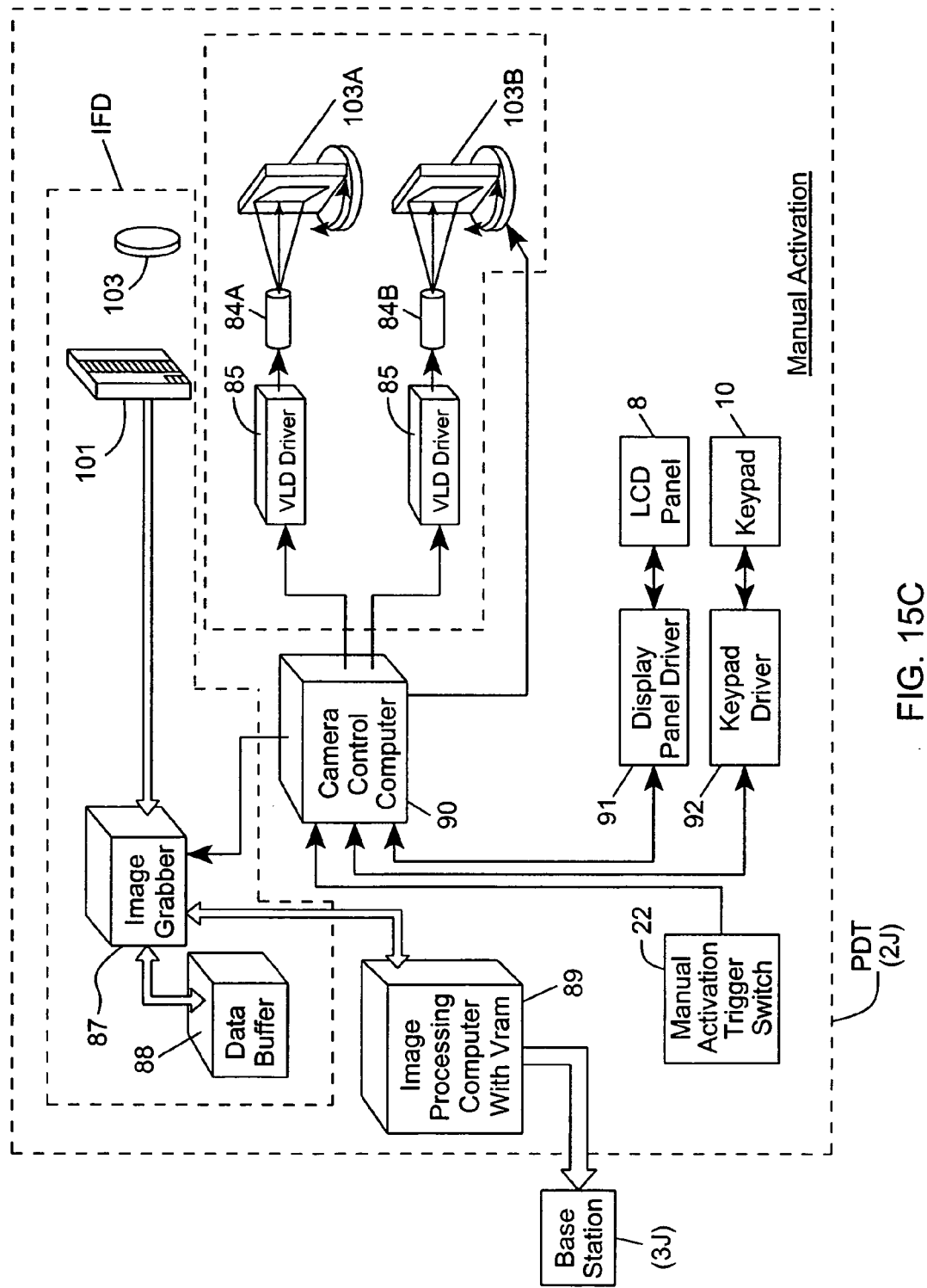
FIG. 15C is a schematic block system diagram showing the various subsystem blocks comprising the wireless portable data terminal shown in FIG. 15A, wherein the illumination and imaging of a bar code bearing object is carried out by a manually-triggered linear-imaging engine that is integrated within the wireless portable data terminal, and programmably configured for image-based bar code reading operation upon manually depressing the imager activation button (i.e. switch) provided on the user control console of the wireless portable data terminal.

In the system configuration shown in FIG. 15C, the illumination and imaging of a bar code bearing object is carried out by a manually-triggered 2-D-imaging engine 71 that is integrated within the wireless portable data terminal 2J, and programmably configured for image-based bar code reading operation upon manually depressing the imager activation button (i.e. switch) 22 provided on the user control console of the wireless portable data terminal. As shown, the PDT comprises: planar laser illumination array (PLIA), including a set of VLD driver circuits 85, PLIMs 84A, 84B (realized using VLDs or LEDs); an area-type image formation and detection (IFD) module having a 2-D image detection array 101 with image detection elements, image formation optics 103; a pair of beam sweeping mechanisms 103A and 103B for sweeping the planar laser illumination beam produced from the PLIA across the 3-D FOV; an image frame grabber 87, and an image data buffer 88; an image processing computer 89; a camera control computer 90; a LCD panel 8 and a display panel driver 91; user control console 10 and associated driver 92; and a manually-actuated trigger switch 22 for manually activating the planar laser illumination arrays, the linear-type image formation and detection (IFD) module, the image frame grabber, the image data buffer, and the image processing computer, via the camera control computer, in response to the manual activation of the trigger switch 22. Thereafter, the system control program carried out within the camera control computer 90 enables: (1) the automatic capture of digital images of objects (i.e. bearing bar code symbols and other graphical indicia) through the image formation optics provided within the PDT; (2) the automatic decode-processing of the bar code symbol represented therein; (3) the automatic generation of symbol character data representative of the decoded bar code symbol; (4) the automatic buffering of the symbol character data within the hand-supportable housing or transmitting the same to a host computer system; and (5) thereafter the automatic deactivation of the subsystem components described above. When using a manually-actuated trigger switch 22 having a single-stage operation, manually depressing the switch 22 with a single pull-action will thereafter initiate the above sequence of operations with no further input required by the user. Details regarding the operation of the are-type imaging engine design employed in this illustrative embodiment are set forth in WIPO Publication No. WO 02/43195 A2 incorporated herein by reference.

Figure 15D:
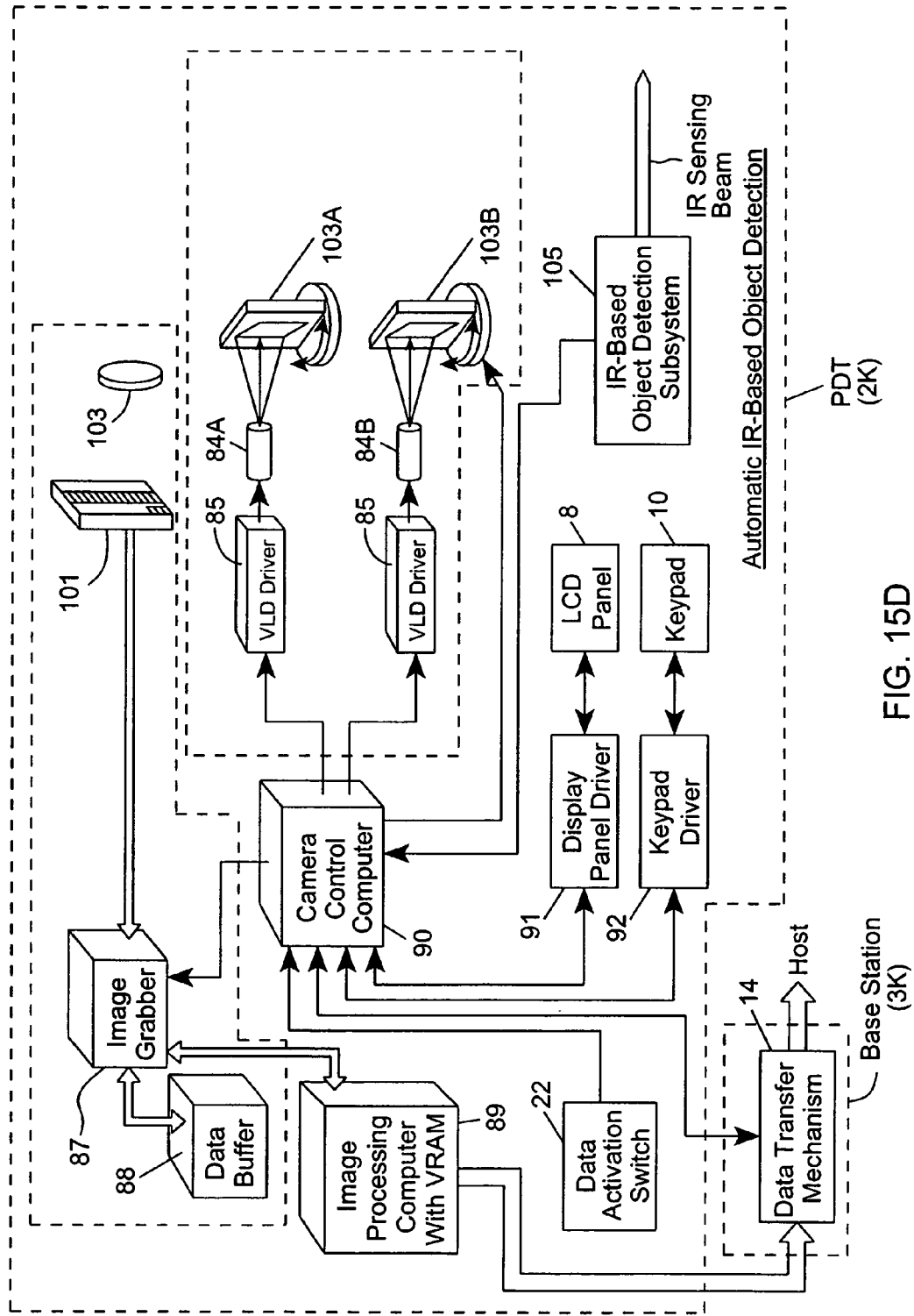
FIG. 15D is a schematic block system diagram showing the various subsystem blocks comprising the wireless portable data terminal shown in FIG. 15A, wherein the illumination and imaging of a bar code bearing object is carried out by an automatically-triggered linear-imaging engine with IR-based object detection that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.

In the system configuration shown in FIG. 15D, the illumination and imaging of a bar code bearing object is carried out by an automatically-triggered 2-D-imaging engine with IR-based object detection that is integrated within the wireless portable data terminal, and programmably configured for automatic image-based bar code reading operation and transmission of symbol character data to its remote base terminal when the operator manually depresses the data transmission button (i.e. switch) 22 provided on the user control console of the wireless portable data terminal.

As shown in system diagram of FIG. 15D, the PDT 2K comprises: planar laser illumination array (PLIA), including a set of VLD or LED driver circuits 85, PLIMs (VLD or LED) 84A, 84B, and an area-type image formation and detection (IFD) module having a 2-D image detection array 101 with image detection elements, image formation optics 103; a pair of beam sweeping mechanisms 103A and 103B for sweeping the planar laser illumination beam produced from the PLIA across the 3-D FOV; an image frame grabber 87, and an image data buffer 88; an image processing computer 89; a camera control computer 90; a LCD panel 8 and a display panel driver 91; user control console 10 and driver 92; an IR-based object detection subsystem 105 within its hand-supportable housing for automatically activating, upon detection of an object in its IR-based object detection field, the planar laser illumination arrays (driven by VLD driver circuits 85), the area-type image formation and detection (IFD) module, and the image processing computer, via the camera control computer, so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 and a manually-activatable data transmission switch 22, integrated with the hand-supportable housing, for enabling the transmission of symbol character data from the imager processing computer 89 to a host computer system 15, via the data transmission mechanism 14, in response to the manual activation of the data transmission switch 22 at about the same time as when a bar code symbol is automatically decoded and symbol character data representative thereof is automatically generated by the image processing computer 89. This manually-activated symbol character data transmission scheme is described in greater detail in copending U.S. application Ser. No. 08/890,320, filed Jul. 9, 1997, and Ser. No. 09/513,601, filed Feb. 25, 2000, each said application being incorporated herein by reference in its entirety. Details regarding the operation of the are-type imaging engine design employed in this illustrative embodiment are set forth in WIPO Publication No. WO 02/43195 A2 incorporated herein by reference.

Figure 15E:
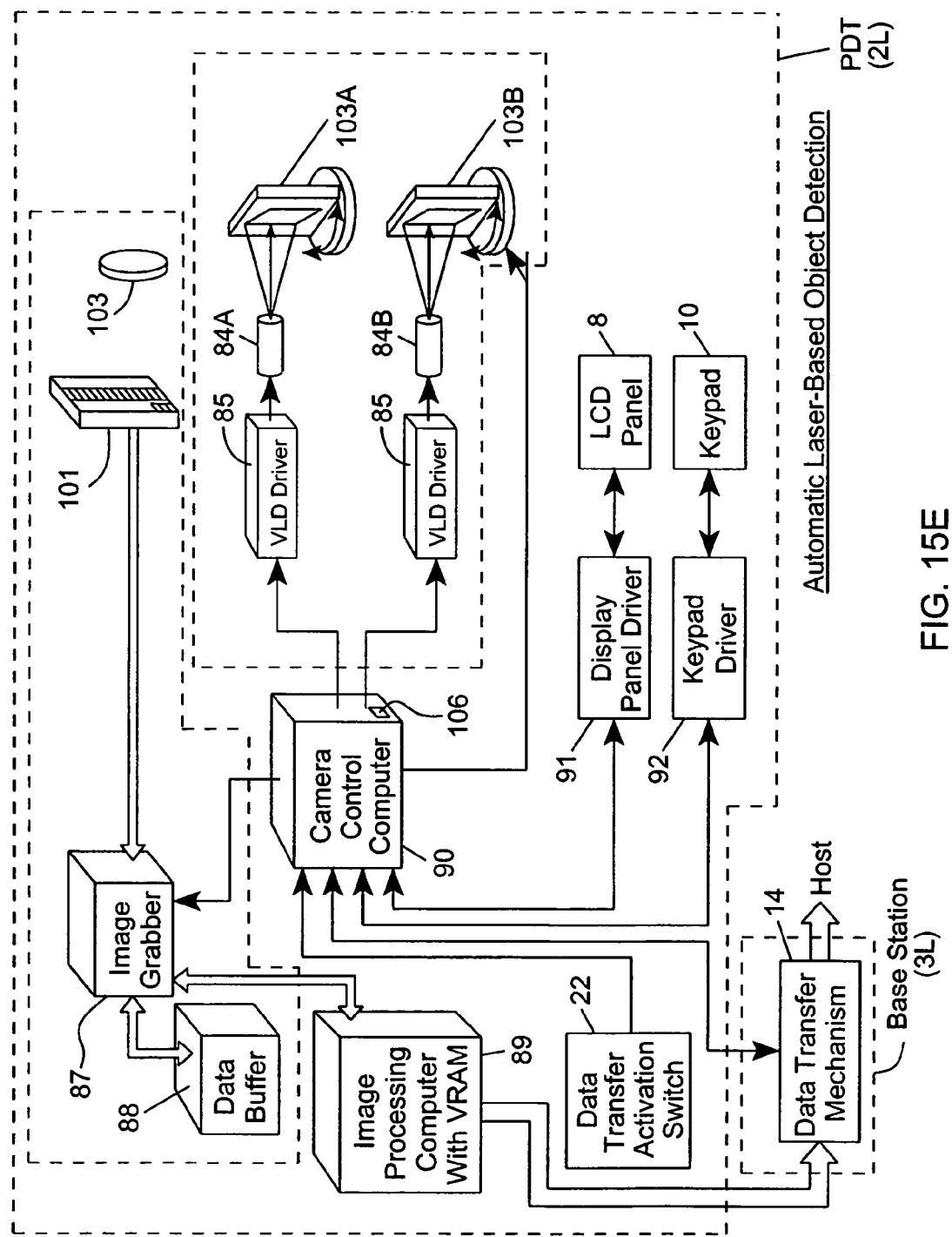
FIG. 15E is a schematic block system diagram showing the various subsystem blocks comprising the wireless portable data terminal shown in FIG. 15A, wherein the illumination and imaging of a bar code bearing object is carried out by an automatically-triggered linear-imaging engine with laser-based object detection that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.

In the system configuration shown in FIG. 15E, the illumination and imaging of a bar code bearing object is carried out by an automatically-triggered area-imaging engine with laser-based object detection that is integrated within the wireless portable data terminal 22, and programmably configured for automatic image-based bar code reading operation and transmission of symbol character data to its remote base terminal 3C when the operator manually depresses the data transmission button (i.e. switch) 22 provided on the user control console of the wireless portable data terminal.

As shown in the system diagram of FIG. 15E, the PDT 2C comprises: a planar laser illumination array (PLIA), including a set of VLD or LED driver circuits 85, PLIMs (comprising a VLD or LED) 84A, 84B, and an area-type image formation and detection (IFD) module having a 2-D image detection array 101 with image detection elements; a pair of beam sweeping mechanisms 103A and 103B for sweeping the planar laser illumination beam produced from the PLIA across the 3-D FOV; image formation optics 103, an image frame grabber 87 and an image data buffer 88; an image processing computer 89; a camera control computer 90; a LCD panel 8 and a display panel driver 91; user control console 10 and driver 92; a laser-based object detection subsystem 106 embodied within camera control computer 90 for automatically activating the planar laser illumination arrays into a full-power mode of operation, the area-type image formation and detection (IFD) module, and the image processing computer 89, via the camera control computer 90, in response to the automatic detection of an object in its laser-based object detection field, so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 and a manually-activatable data transmission switch 22 for enabling the transmission of symbol character data from the imager processing computer to a host computer system, via the data transmission mechanism 14, in response to the manual activation of the data transmission switch 22 at about the same time as when a bar code symbol is automatically decoded and symbol character data representative thereof is automatically generated by the image processing computer 89. This manually-activated symbol character data transmission scheme is described in greater detail in copending U.S. Application Ser. No. 08/890,320, filed Jul. 9, 1997, and U.S. Ser. No. 09/513,601, filed Feb. 25, 2000, each said application being incorporated herein by reference in its entirety. Details regarding the operation of the are-type imaging engine design employed in this illustrative embodiment are set forth in WIPO Publication No. WO 02/43195 A2 incorporated herein by reference.

Figure 15F:
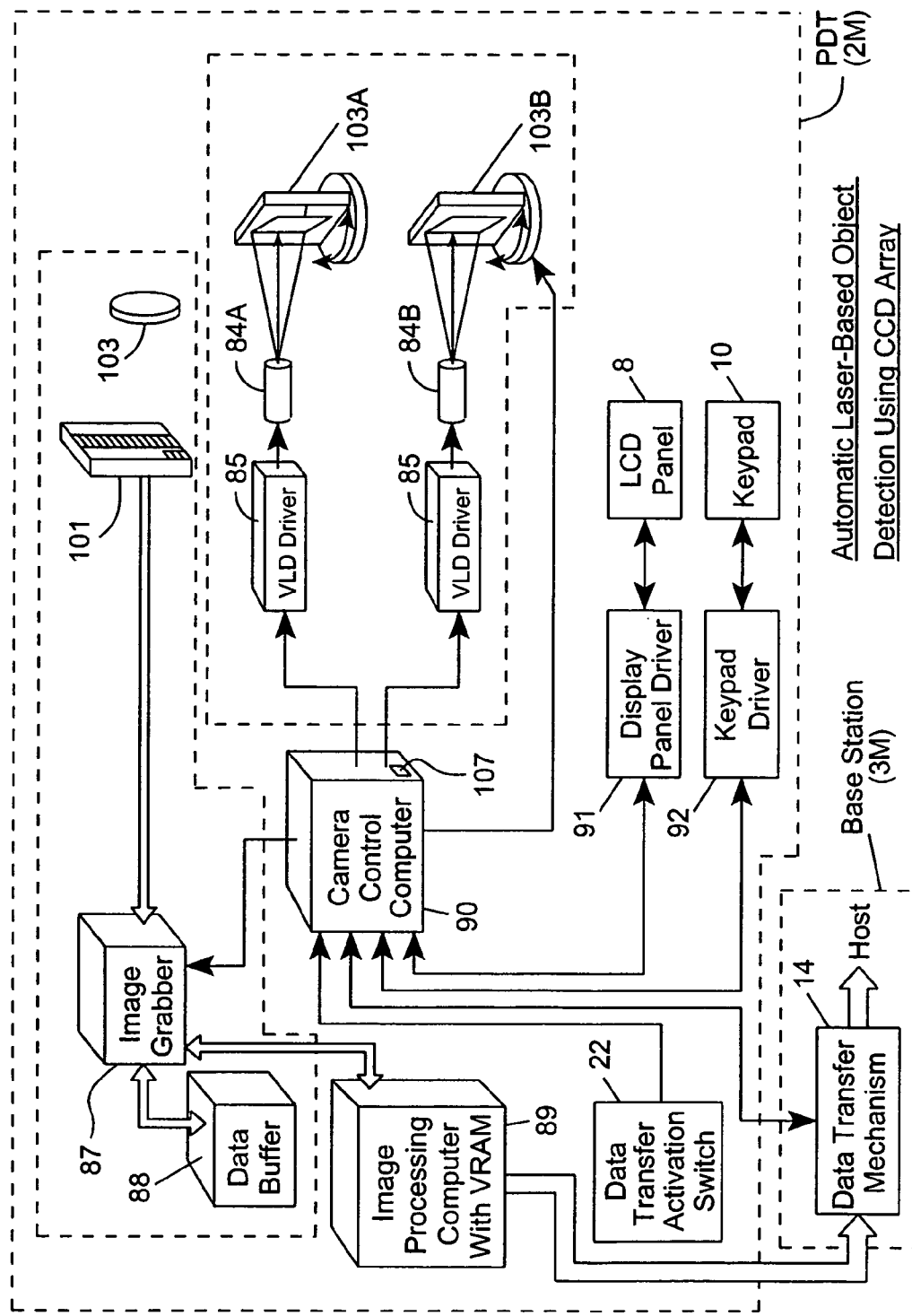
FIG. 15F is a schematic block system diagram showing the various subsystem blocks comprising the wireless portable data terminal shown in FIG. 15A, wherein the illumination and imaging of a bar code bearing object is carried out by an automatically-triggered linear-imaging engine with passive CCD-based object detection that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.

In the system configuration shown in FIG. 15F, the illumination and imaging of a bar code bearing object is carried out by an automatically-triggered area-imaging engine with passive CCD-based object detection that is integrated within the wireless portable data terminal 2M, and programmably configured for automatic image-based bar code reading operation and transmission of symbol character data to its remote base terminal 3M when the operator manually depresses the data transmission button (i.e. switch) 22 provided on the user control console of the wireless portable data terminal.

As shown in FIG. 15F, the PDT 2M comprises: planar laser illumination array (PLIA), including a set of VLD or LED driver circuits 85, PLIMs (i.e. VLD or LED) 84A, 84B, and an area-type image formation and detection (IFD) module having a 2-D image detection array 101 with image detection elements, image formation optics 103; a pair of beam sweeping mechanisms 103A and 103B for sweeping the planar laser illumination beam produced from the PLIA across the 3-D FOV; an image frame grabber 87 and an image data buffer 88; an image processing computer 89; a camera control computer 90; a LCD panel 8 and a display panel driver 91; user control console 10 and driver 92; an ambient-light driven object detection subsystem 107 embodied within the camera control computer 90, for automatically activating the planar laser illumination arrays (driven by VLD or LED driver circuits 85), the area-type image formation and detection (IFD) module, and the image processing computer, via the camera control computer, upon automatic detection of an object via ambient-light detected by object detection field enabled by the linear image sensor 101 within the IFD module, so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 (aboard the base station 3M) and a manually-activatable data transmission switch 22 for enabling the transmission of symbol character data from the imager processing computer 89 to a host computer system, via the data transmission mechanism 14, in response to the manual activation of the data transmission switch 22 at about the same time as when a bar code symbol is automatically decoded and symbol character data representative thereof is automatically generated by the image processing computer 89. This manually-activated symbol character data transmission scheme is described in greater detail in copending U.S. application Ser. No. 08/890,320, filed Jul. 9, 1997, and Ser. No. 09/513,601, filed Feb. 25, 2000, each said application being incorporated herein by reference in its entirety. Notably, in some applications, the passive-mode objection detection subsystem 107 employed in this wireless PDT system might require (i) using a different system of optics for collecting ambient light from objects during the object detection mode of the system, or (ii) modifying the light collection characteristics of the light collection system to permit increased levels of ambient light to be focused onto the CCD image detection array 101 in the IFD module (i.e. subsystem). In other applications, the provision of image intensification optics on the surface of the CCD image detection array should be sufficient to form images of sufficient brightness to perform object detection and/or bar code detection operations. Details regarding the operation of the are-type imaging engine design employed in this illustrative embodiment are set forth in WIPO Publication No. WO 02/43195 A2 incorporated herein by reference.

Figure 15G:
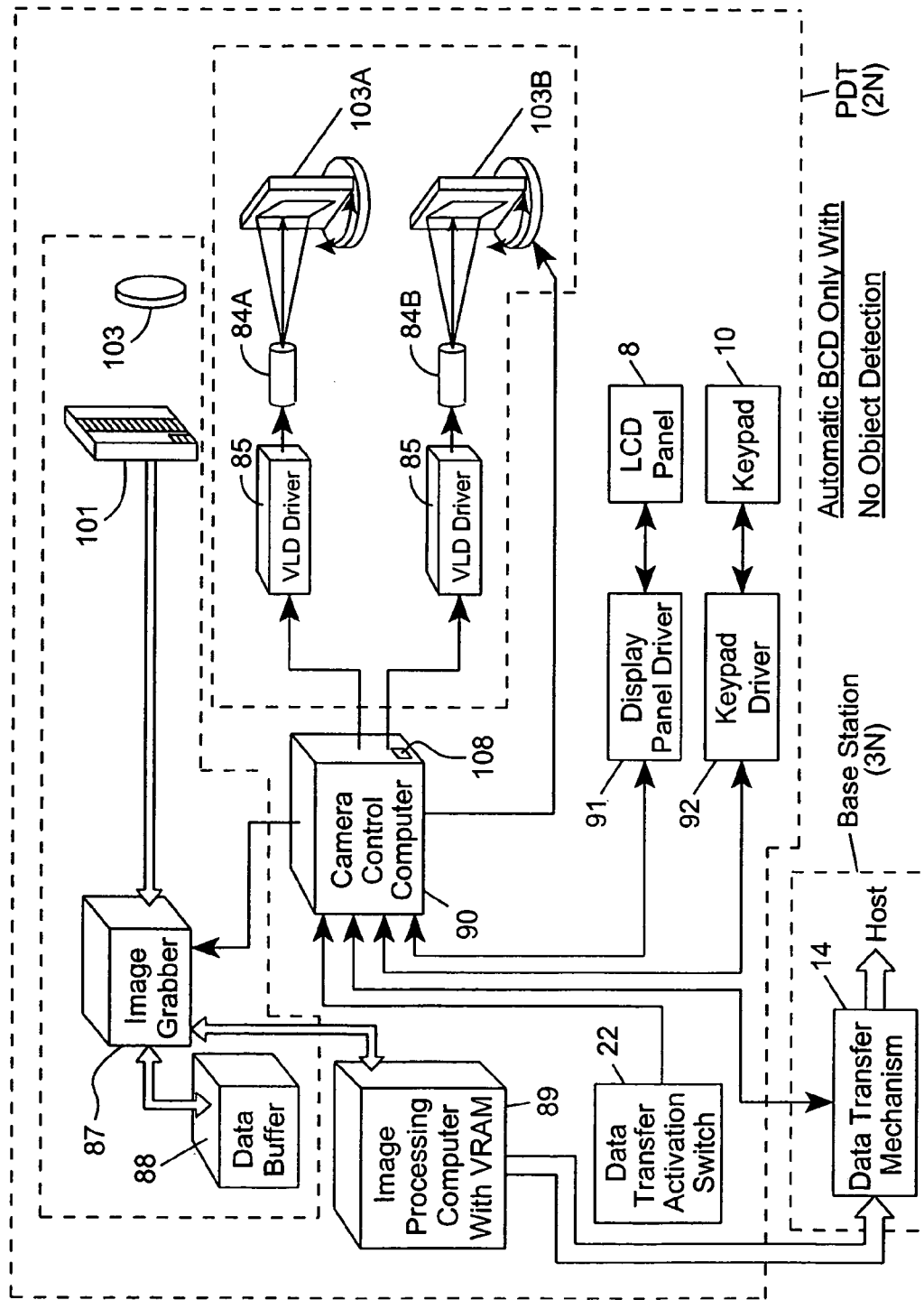
FIG. 15G is a schematic block system diagram showing the various subsystem blocks comprising the wireless portable data terminal shown in FIG. 15A, wherein the illumination and imaging of a bar code bearing object is carried out by an automatically-triggered linear-imaging engine (without automatic object detection) that is integrated within the wireless portable data terminal, and programmably configured for automatic image-based bar code reading operation and transmission of symbol character data to its remote base terminal upon manually depressing the data transmission button (i.e. switch) provided on the user control console of the wireless portable data terminal.
Figure 15H:
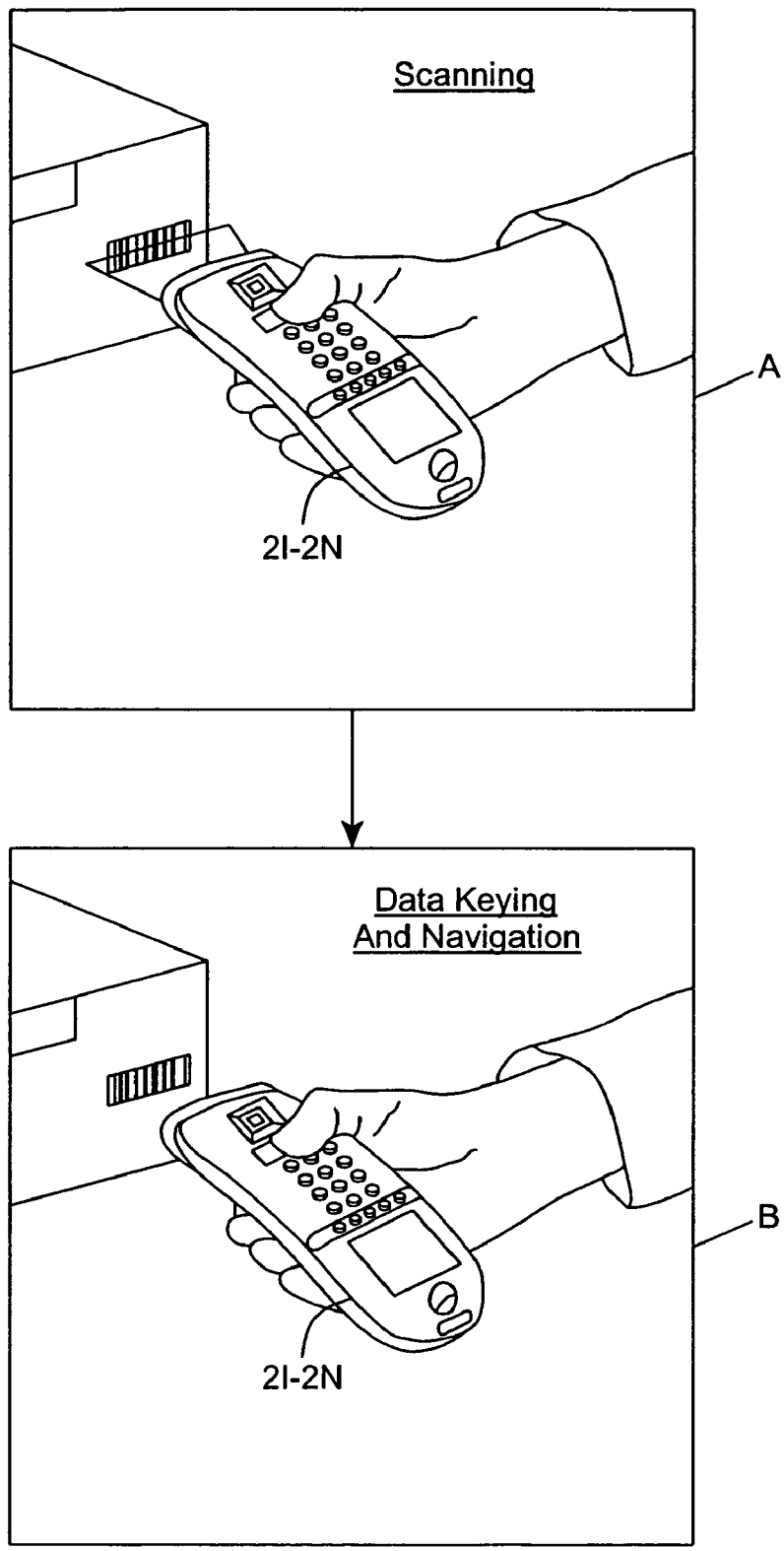
FIG. 15H is a schematic representation illustrating the improved single-handed operation of the wireless portable data terminal shown in FIGS. 15A through 15G.

In the system configuration shown in FIG. 15G, the illumination and imaging of a bar code bearing object is carried out by an automatically-triggered linear-imaging engine (without automatic object detection) that is integrated within the wireless portable data terminal 2N, and programmably configured for automatic image-based bar code reading operation and transmission of symbol character data to its remote base terminal when the operator manually depresses the data transmission button (i.e. switch) 22 provided on the user control console of the wireless portable data terminal 3N.

As shown in FIG. 15G, the PDT 2N comprises: a planar laser illumination array (PLIA), including a set of VLD or LED driver circuits 85, PLIMs (i.e. VLD or LED) 84A, 84B, and an area-type image formation and detection (IFD) module having a 2-D image detection array 101 with image detection elements, image formation optics 103; a pair of beam sweeping mechanisms 103A and 103B for sweeping the planar laser illumination beam produced from the PLIA across the 3-D FOV; an image frame grabber 87, and image data buffer 88; an image processing computer 89; a camera control computer 90; a LCD panel 8 and a display panel driver 91; user control console 10 and driver 92; an automatic bar code symbol detection subsystem 108 embodied within camera control computer 90 for automatically activating the image processing computer for decode-processing in response to the automatic detection of a bar code symbol within its bar code symbol detection field by the area image sensor within the IFD module so that (1) digital images of objects (i.e. bearing bar code symbols and other graphical indicia) are automatically captured, (2) bar code symbols represented therein are decoded, and (3) symbol character data representative of the decoded bar code symbol are automatically generated; and data transmission mechanism 14 (aboard the base station) and a manually-activatable data transmission switch 22 for enabling the transmission of symbol character data from the image processing computer 89 to a host computer system, via the data transmission mechanism 14, in response to the manual activation of the data transmission switch 22 at about the same time as when a bar code symbol is automatically decoded and symbol character data representative thereof is automatically generated. This manually-activated symbol character data transmission scheme is described in greater detail in copending U.S. application Ser. Nos. 08/890,320, filed Jul. 9, 1997, and Ser. No. 09/513,601, filed Feb. 25, 2000, each said application being incorporated herein by reference in its entirety. Details regarding the operation of the are-type imaging engine design employed in this illustrative embodiment are set forth in WIPO Publication No. WO 02/43195 A2 incorporated herein by reference.

The subsystems associated with the wireless PDT and its base station described above can be implemented in a straightforward manner using the hardware and software implementation platforms illustrated in FIGS. 6 through 9A.

In FIG. 15D, the wireless portable data terminal of the fifth illustrative embodiment is shown used in a truly single-handed manner in accordance with the principles of the present invention.

Several Modifications that Readily Come to Mind

Having described the preferred embodiments of the present invention, several modifications readily come to mind.

For example, in the illustrative embodiments of the present invention, particular types of bar code symbol reading engines disclosed herein have been suggested for incorporation into various types of wireless PDT systems differentiated primarily on the basis of data capture engines, system control configurations and the like. While various types of data capture mechanisms disclosed herein have been shown or realized in the form of an engine, having a separate housing or module, it is understood that each such mechanism need not have a separate housing or modular structure, but can be integrated directly into the structure of the hand-supportable housing of the wireless PDT.

While the illustrative embodiments of the present invention have been described in connection with various types of bar code symbol reading applications involving 1-D and 2-D bar code structures, it is understood that the present invention can be used in connection with any machine-readable indicia or graphical structures including, but not limited to bar code symbol structures. Hereinafter, the term code symbol shall be deemed to include such information carrying structures.

It is understood that the wireless PDTs, data capture engines, and base stations of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A wireless portable data terminal (PDT) system for use and communication with a base station by way of an electromagnetic-based radio-frequency (RF) 2-way digital data communication link, said wireless PDT system comprising:
  a hand-supportable housing;
  a rechargeable battery supported within said hand-supportable housing;
  a data capture engine mounted within said hand-supportable housing, for optically capturing data, about objects optically encoded in information structures such as bar code symbols;
  a LCD panel integrated with said hand-supportable housing;
  a micro-computing platform mounted within said hand-supportable housing, and capable of (i) running/executing application programs on a first kind of operating system (OS1) that is emulated on a virtual machine that is supported on a second kind of operating system (OS2) so that the application programs can be developed on developer computers-running the first kind of operating system OS1, and (ii) supporting a graphical user interface (GUI) on said LCD panel for graphically displaying and manipulating documents; and
  a user control console having a manual data-entry structure for manually entering data into said documents.

2. The wireless PDT system of claim 1, wherein said LCD panel has a backlighting structure which is automatically controlled in response to the brightness level of ambient light sensed by an ambient light sensor located on said hand-supportable housing adjacent said LCD panel.

3. The wireless PDT system of claim 1, wherein said hand-supportable housing has a bar-like geometry and a top surface.

4. The wireless PDT system of claim 3, wherein said user control console is disposed on the top surface of said hand-supportable housing and includes a multi-position cursor navigation control button, for controlling a cursor on said GUI by movement with the operator's thumb.

5. The wireless PDT system of claim 4, wherein said multi-position cursor navigation control button has LEFT, RIGHT, UP, DOWN and IN movements, surrounded by at least four cursor navigational control function buttons for BACKSPACE, ESCAPE, SPACE, and SYSTEM FUNCTION selection.

6. The wireless PDT system of claim 5, wherein said LCD panel is mounted beneath said manual data-entry structure, and wherein said multi-position cursor navigational control button and said cursor navigational control function buttons are located away from said data capture engine, and closest towards the user, to facilitate single-handed operation of said wireless PDT system.

7. The wireless PDT system of claim 4, which further comprises a first set of circuitry within said hand-supportable housing and said base station for enabling said electromagnetic-based RF 2-way digital data communication link between said wireless PDT and said base station; and a second set of circuitry within said base station for interfacing said base station with a host computer system or network by way of a standard digital communications interface.

8. The wireless PDT system of 7, wherein said base station comprises:
a base housing;
a first apparatus in the base housing for recharging said battery in said hand-supportable housing;
a second apparatus in the base housing for enabling said electromagnetic-based RF 2-way digital data communication link between hand-supportable housing and the base station either while said hand-supportable housing is located outside of or inside a cradle portion of said base station; and
a third apparatus in said base housing for implementing said digital data communications interface between said base station and said host computer system or network using either physical or electromagnetic-wave based communication media.

9. The wireless PDT system of claim 8, wherein said base station comprises:
a data receiver circuit for realizing the base side of said electromagnetic-based RF wireless 2-way digital data communication link;
a data transmission subsystem including a communication control module; and
a base station controller for controlling the operations of said base station;
wherein said data transmission subsystem interfaces with said host system or network by way of the standard communication interfaces, and when taken together, realize said wireless electromagnetic 2-way digital data communication link employed by said wireless PDT system.

10. The wireless PDT system of claim 4, wherein a rubberized membrane-switching structure is supported within said hand-supportable housing so that said multi-position cursor navigational control button is aligned with and is disposed under a central rubber button formed in said rubberized membrane switching structure.

11. The wireless PDT system of claim 1, wherein said manual data-entry structure is a membrane alpha-alphanumeric keypad.

* * * * *